US012587635B2

(12) United States Patent
Li et al.

(10) Patent No.: US 12,587,635 B2
(45) Date of Patent: Mar. 24, 2026

(54) AFFINE MERGE MODE WITH TRANSLATIONAL MOTION VECTORS

(71) Applicant: Tencent America LLC, Palo Alto, CA (US)

(72) Inventors: Guichun Li, San Jose, CA (US); Han Gao, San Diego, CA (US); Lien-Fei Chen, Hsinchu (TW); Xin Zhao, Santa Clara, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 237 days.

(21) Appl. No.: 17/982,938

(22) Filed: Nov. 8, 2022

(65) Prior Publication Data

US 2023/0412794 A1      Dec. 21, 2023

Related U.S. Application Data

(60) Provisional application No. 63/353,319, filed on Jun. 17, 2022.

(51) Int. Cl.
H04N 19/573      (2014.01)
H04N 19/105      (2014.01)
(Continued)

(52) U.S. Cl.
CPC ......... H04N 19/105 (2014.11); H04N 19/132 (2014.11); H04N 19/137 (2014.11);
(Continued)

(58) Field of Classification Search
CPC .. H04N 19/105; H04N 19/132; H04N 19/137; H04N 19/176; H04N 19/46; H04N 19/88
See application file for complete search history.

(56) References Cited

U.S. PATENT DOCUMENTS 12,355,950 B2 *   7/2025   Paluri ................... H04N 19/46
2019/0158870 A1   5/2019   Xu et al.
(Continued)

OTHER PUBLICATIONS

Muhammed Coban, et al., Algorithm description of Enhanced Compression Model 4 (ECM 4), Joint Video Experts Team (JVET) of ITU-T SG 16 WP 3 and ISO/IEC JTC 1/SC 29, 23rd Meeting, by teleconference, Jul. 7-16, 2021, Document: JVET-Y2025-v2, pp. 1-32.

(Continued)

*Primary Examiner* — James T Boylan
(74) *Attorney, Agent, or Firm* — ArentFox Schiff LLP

(57)      ABSTRACT

In some examples, an apparatus for video decoding includes processing circuitry. The processing circuitry determines, from a candidate list, a first affine-translational merge candidate for a prediction of a current block in a current picture. The first affine-translational merge candidate provides affine motion information associated with a first reference picture in a first reference list and translational motion information associated with a second reference picture in a second reference list. The processing circuitry generates a first prediction for a sample in the current block according to the affine motion information associated with the first reference picture, and generates a second prediction for the sample in the current block according to the translational motion information associated with the second reference picture. The processing circuitry reconstructs the sample of the current block according to a combination of the first prediction and the second prediction.

19 Claims, 33 Drawing Sheets

(51) Int. Cl.

| | |
|---|---|
| *H04N 19/132* | (2014.01) |
| *H04N 19/137* | (2014.01) |
| *H04N 19/176* | (2014.01) |
| *H04N 19/46* | (2014.01) |
| *H04N 19/88* | (2014.01) |

(52) U.S. Cl.
CPC ........... *H04N 19/176* (2014.11); *H04N 19/46* (2014.11); *H04N 19/88* (2014.11)

(56) References Cited

U.S. PATENT DOCUMENTS

| | | | |
|---|---|---|---|
| 2020/0204824 A1 | 6/2020 | Lai et al. | |
| 2021/0203922 A1* | 7/2021 | Zhang | H04N 19/503 |
| 2021/0227212 A1* | 7/2021 | Lee | H04N 19/52 |
| 2021/0392366 A1 | 12/2021 | Li et al. | |
| 2022/0094969 A1 | 3/2022 | Chen et al. | |
| 2022/0182657 A1* | 6/2022 | Yang | H04N 19/139 |
| 2022/0303571 A1* | 9/2022 | Zhang | H04N 19/70 |
| 2023/0388513 A1* | 11/2023 | Chen | H04N 19/137 |
| 2024/0380922 A1* | 11/2024 | Deng | H04N 19/176 |
| 2025/0220161 A1* | 7/2025 | Park | H04N 19/137 |

OTHER PUBLICATIONS

Jianle Chen, et al., Algorithm description for Versatile Video Coding and Test Model 10 (VTM 10), Joint Video Experts Team (JVET) of ITU-T SG 16 WP 3 and ISO/IEC JTC 1/SC 29/WG 11, 19th Meeting: by teleconference, Jun. 22-Jul. 1, 2020, Document: JVET-S2002-v1, pp. 1-97.

ITU-T Study Group. "High efficiency video coding, Series H: Audiovisual and multimedia systems: Infrastructure of audiovisual services—coding of moving video." in General Secretariat and Telecom Radiocommunication (ITU-R) Standardization (ITU-T), sec. H 265, Dec. 2016, pp. 1-664.

ITU-T Study Group. "Versatile video coding, Series H: Audiovisual and multimedia systems: Infrastructure of audiovisual services-coding of moving video." in General Secretariat and Telecom Radiocommunication (ITU-R) Standardization (ITU-T), sec. H 266, Aug. 2020, pp. 1-664.

International Search Report and Written Opinion issued in International Application No. PCT/US2022/079559, mailed Feb. 2, 2023, 10 pages.

* cited by examiner

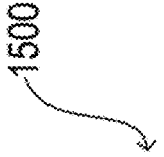
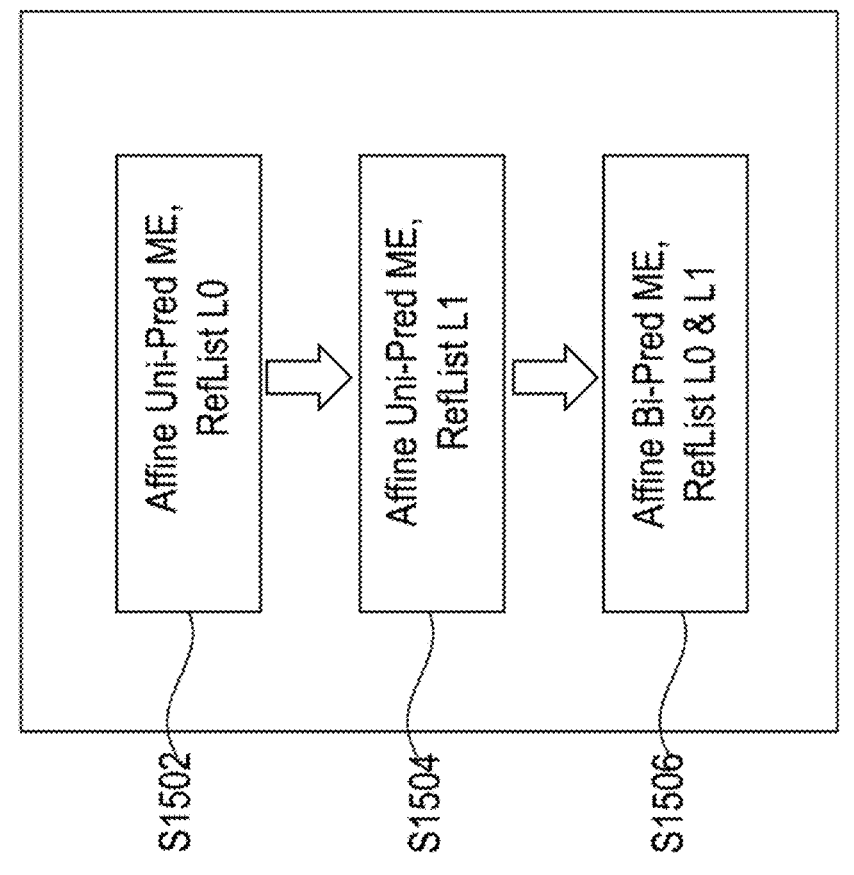
*FIG. 15*

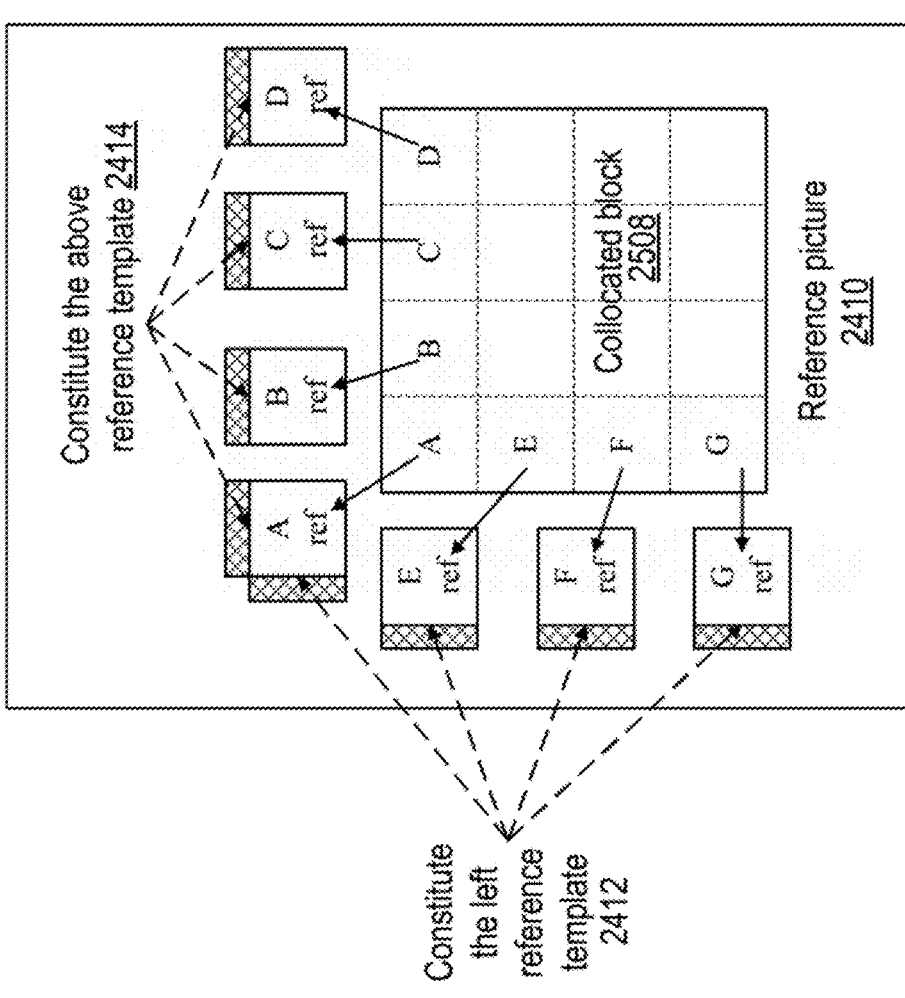
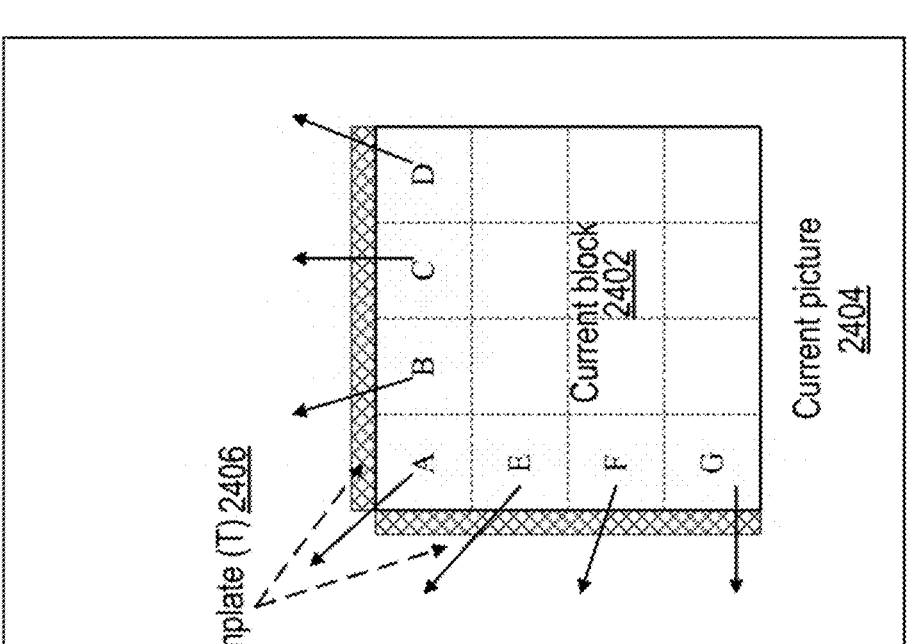
*FIG. 24*

■  Non-adjacent neighbor
□  Adjacent neighbor

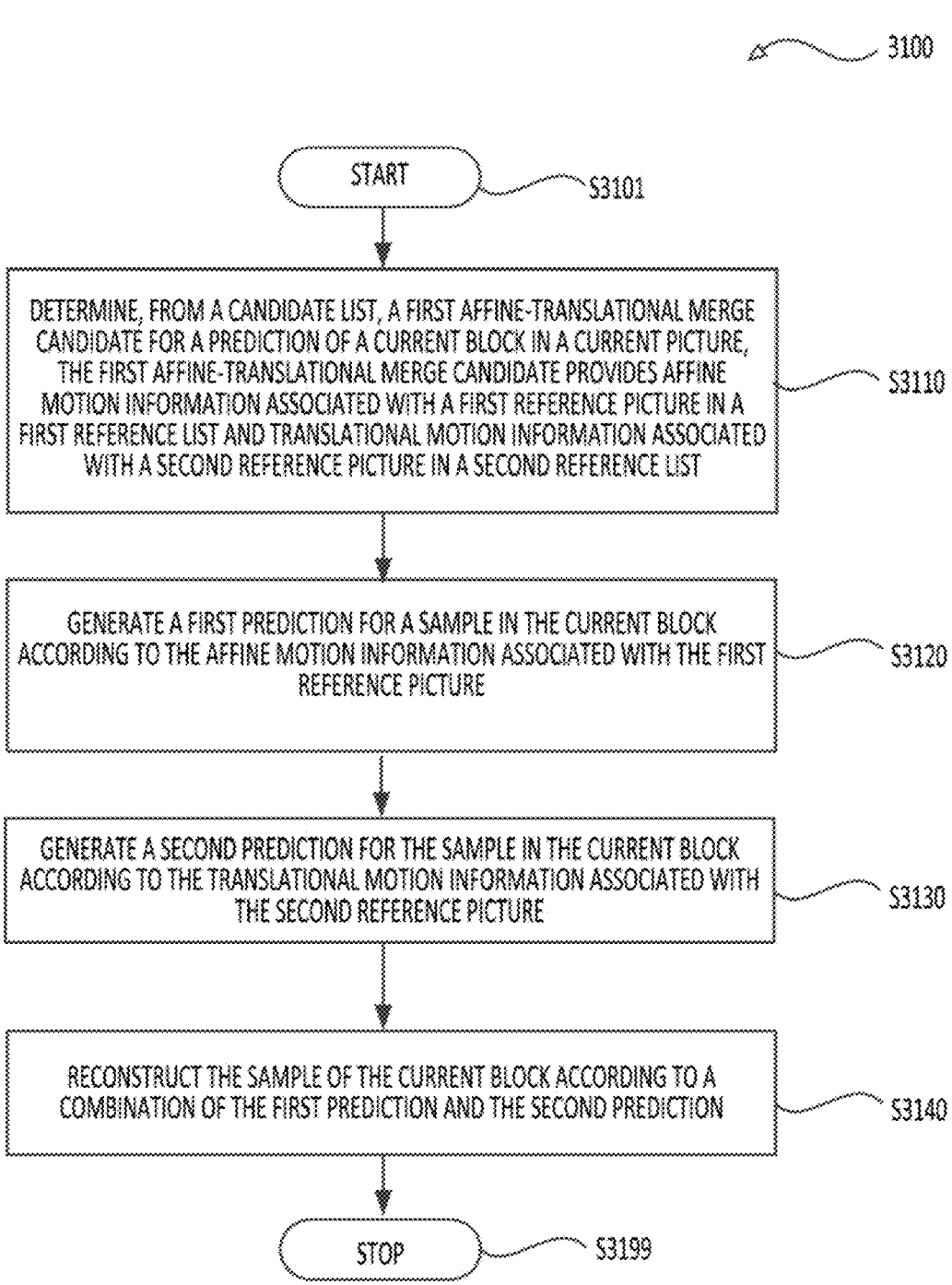

3100

START — S3101

DETERMINE, FROM A CANDIDATE LIST, A FIRST AFFINE-TRANSLATIONAL MERGE CANDIDATE FOR A PREDICTION OF A CURRENT BLOCK IN A CURRENT PICTURE, THE FIRST AFFINE-TRANSLATIONAL MERGE CANDIDATE PROVIDES AFFINE MOTION INFORMATION ASSOCIATED WITH A FIRST REFERENCE PICTURE IN A FIRST REFERENCE LIST AND TRANSLATIONAL MOTION INFORMATION ASSOCIATED WITH A SECOND REFERENCE PICTURE IN A SECOND REFERENCE LIST — S3110

GENERATE A FIRST PREDICTION FOR A SAMPLE IN THE CURRENT BLOCK ACCORDING TO THE AFFINE MOTION INFORMATION ASSOCIATED WITH THE FIRST REFERENCE PICTURE — S3120

GENERATE A SECOND PREDICTION FOR THE SAMPLE IN THE CURRENT BLOCK ACCORDING TO THE TRANSLATIONAL MOTION INFORMATION ASSOCIATED WITH THE SECOND REFERENCE PICTURE — S3130

RECONSTRUCT THE SAMPLE OF THE CURRENT BLOCK ACCORDING TO A COMBINATION OF THE FIRST PREDICTION AND THE SECOND PREDICTION — S3140

STOP — S3199

FIG. 31

AFFINE MERGE MODE WITH TRANSLATIONAL MOTION VECTORS

INCORPORATION BY REFERENCE

The present application claims the benefit of priority to U.S. Provisional Application No. 63/353,319, "Affine Merge Mode with Translational Motion Vectors" filed on Jun. 17, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry receives a coded video bitstream including a current block in a current picture. The processing circuitry determines, from a candidate list, a first affine-translational merge candidate for a prediction of the current block in the current picture. The first affine-translational merge candidate provides affine motion information associated with a first reference picture in a first reference list and translational motion information associated with a second reference picture in a second reference list. The processing circuitry generates a first prediction for a sample in the current block according to the affine motion information associated with the first reference picture, and generates a second prediction for the sample in the current block according to the translational motion information associated with the second reference picture. The processing circuitry reconstructs the sample of the current block according to a combination of the first prediction and the second prediction.

In some examples, the processing circuitry derives the affine motion information and the translational motion information of the first affine-translational merge candidate, and inserts the first affine-translational merge candidate in the candidate list.

In an example, the processing circuitry derives the affine motion information according to first affine motion information of a first affine merge candidate with uni-prediction. In another example, the processing circuitry derives the affine motion information according to according to second affine motion information of a second affine merge candidate with bi-prediction, the second affine motion information is associated with the first reference list.

In an example, the processing circuitry derives the translational motion information according to first translational motion information of a first translational merge candidate with uni-prediction. In another example, the processing circuitry derives the translational motion information according to second translational motion information of a second translational merge candidate with bi-prediction, the second translational motion information is associated with the second reference list.

In an example, to derive the translational motion information, for a merge candidate with a merge index in a translational merge candidate list, a first list is selected from the first reference list and the second reference list based on the merge index according to a predefined rule. The processing circuitry derives the translational motion information based on first translational motion information of the merge candidate associated with the first list in response to an existence of the first translational motion information, and derives the translational motion information based on second translation motion information of the merge candidate associated with another list different from the first list in response to an non existence of the first translational motion information.

In some examples, the translational motion information can be derived from affine merge candidates. In an example, the processing circuitry derives the translational motion information based on a control point motion vector of an affine merge candidate. In another example, the processing circuitry derives the translational motion information based on an average of a plurality of control point motion vectors of the affine merge candidate. In another example, the processing circuitry derives the translational motion information based on a motion vector at a center of the current block, the motion vector is determined according to an affine model for the affine merge candidate.

In an example, the processing circuitry inserts the first affine-translational merge candidate in an existing subblock based merge candidate list after a last inherited affine merge candidate. In another example, the processing circuitry inserts the first affine-translational merge candidate in the existing subblock based merge candidate list after a last constructed affine merge candidate. In another example, the processing circuitry inserts the first affine-translational merge candidate in the existing subblock based merge candidate list after a last affine merge candidate and before a zero motion vector candidate.

In an example, the processing circuitry inserts the first affine-translational merge candidate into an affine-translational merge list separate from the existing subblock based merge candidate list. In an example, in response to a decoded flag indicating a selection of the affine-translational merge list, the processing circuitry selects the first affine-translational merge candidate from the affine-translational merge list according to a decoded index. In response to the decoded flag indicating a selection of the subblock based merge candidate list, a merge candidate is selected from the subblock based merge candidate list according to the decoded index.

In some examples, candidates in the affine-translational merge list are reordered according to template matching costs of the candidates.

In some examples, the processing circuitry inserts the first affine-translational merge candidate in the candidate list in response to a counting number of affine-translational merge candidates in the candidate list is lower than a value. The value can be predefined or can be signaled from the encoder side to the decoder side at a high level.

In some examples, the processing circuitry derives the affine motion information from a subset of affine merge candidates in front of other affine merge candidates in an affine merge candidate list, a counting number of affine merge candidates in the subset is equal to a value. The value can be predefined or can be signaled from the encoder side to the decoder side at a high level.

In some examples, the processing circuitry derives the translational motion information from a subset of translational merge candidates in front of other translational merge candidate in a translational merge candidate list, a counting number of the translational merge candidates in the subset is equal to a value. The value can be predefined or can be signaled from the encoder side to the decoder side at a high level.

In some examples, the processing circuitry makes a determination that bi-prediction is allowed in the current picture and determines the first affine-translational merge candidate for the prediction of the current block in response to the determination.

In some examples, the processing circuitry makes a determination that reference pictures of the current picture are temporally before the current picture, and determines the first affine-translational merge candidate for the prediction of the current block in response to the determination.

In some examples, a high level syntax that indicates an allowance of the first affine-translational merge candidate for the prediction of the current block is determined (e.g., decoded from the bitstream).

In some examples, in response to local illumination compensation (LIC) being enabled but prohibited for bi-prediction, the processing circuitry sets a LIC flag associated with the first affine-translational merge candidate to false.

In an example, the processing circuitry sets a bi-prediction with coding unit level weighting (BCW) index to a default value for combining the first prediction and the second prediction with equal weighting.

In another example, only one of the affine motion information and the translational motion information has a bi-prediction with coding unit level weighting (BCW) index. The first prediction and the second prediction are combined according to the BCW index.

In another example, a first BCW index is associated with the affine motion information and a second BCW index is associated with the translational motion information. The first prediction and the second prediction are combined according to the first BCW index.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 15 shows a schematic illustration of an affine motion estimation process with another embodiment.

FIG. 24 shows a derivation of template and reference samples of the template for the current block with a sub-block-based merge candidate in some examples.

FIG. 31 shows a flow chart outlining another process according to some embodiments of the disclosure.

DETAILED DESCRIPTION OF EMBODIMENTS

Figure 1A:
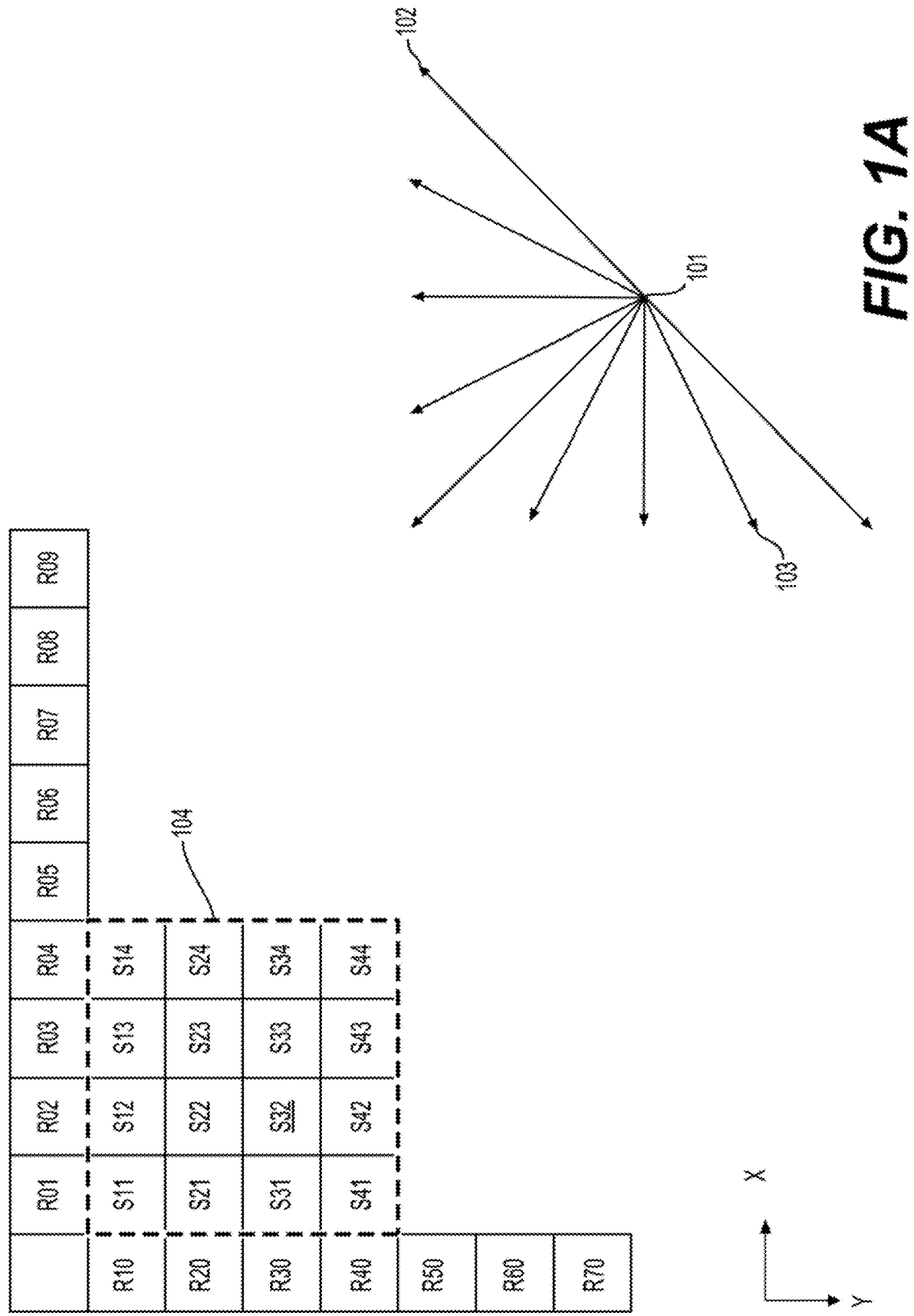
FIG. 1A is a schematic illustration of an exemplary subset of intra prediction modes.
Figure 1B:
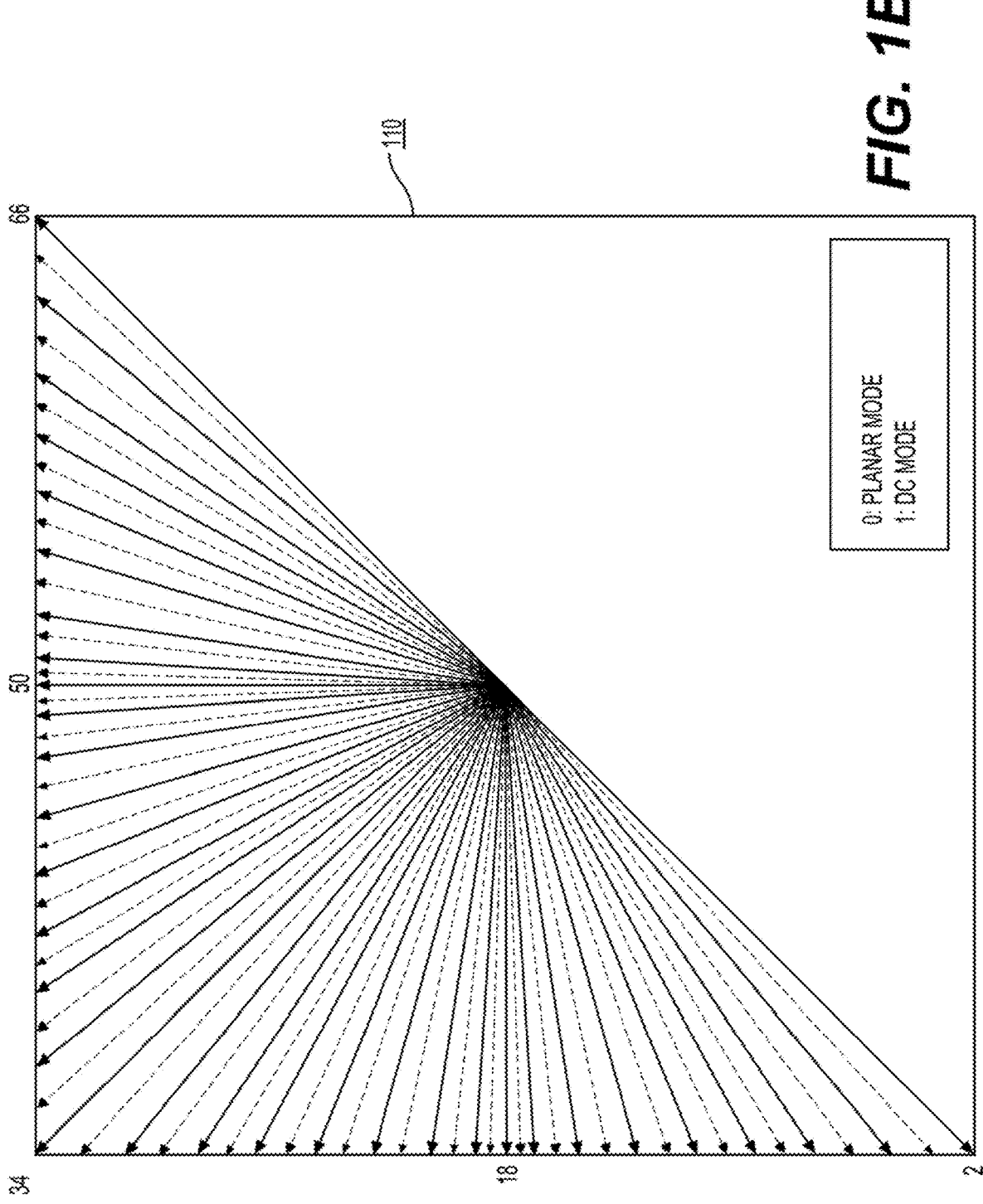
FIG. 1B is an illustration of exemplary intra prediction directions.
Figure 2:
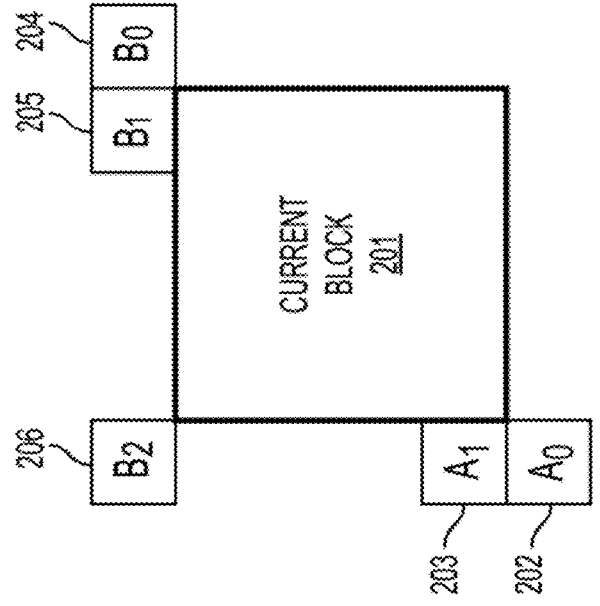
FIG. 2 is a schematic illustration of a current block and its surrounding spatial merge candidates in one example.
Figure 3:
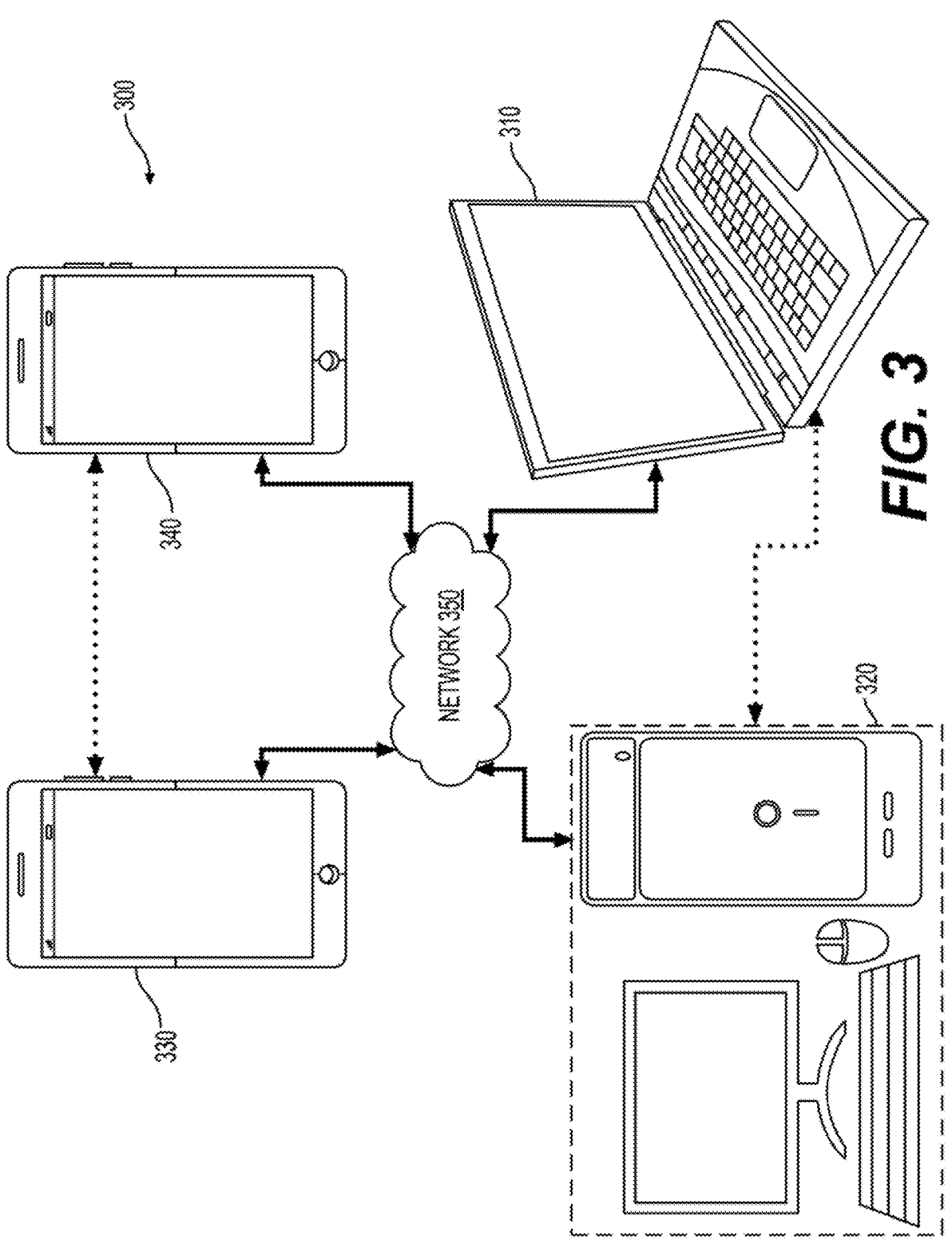
FIG. 3 is a schematic illustration of a simplified block diagram of a communication system (300) in accordance with an embodiment.

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
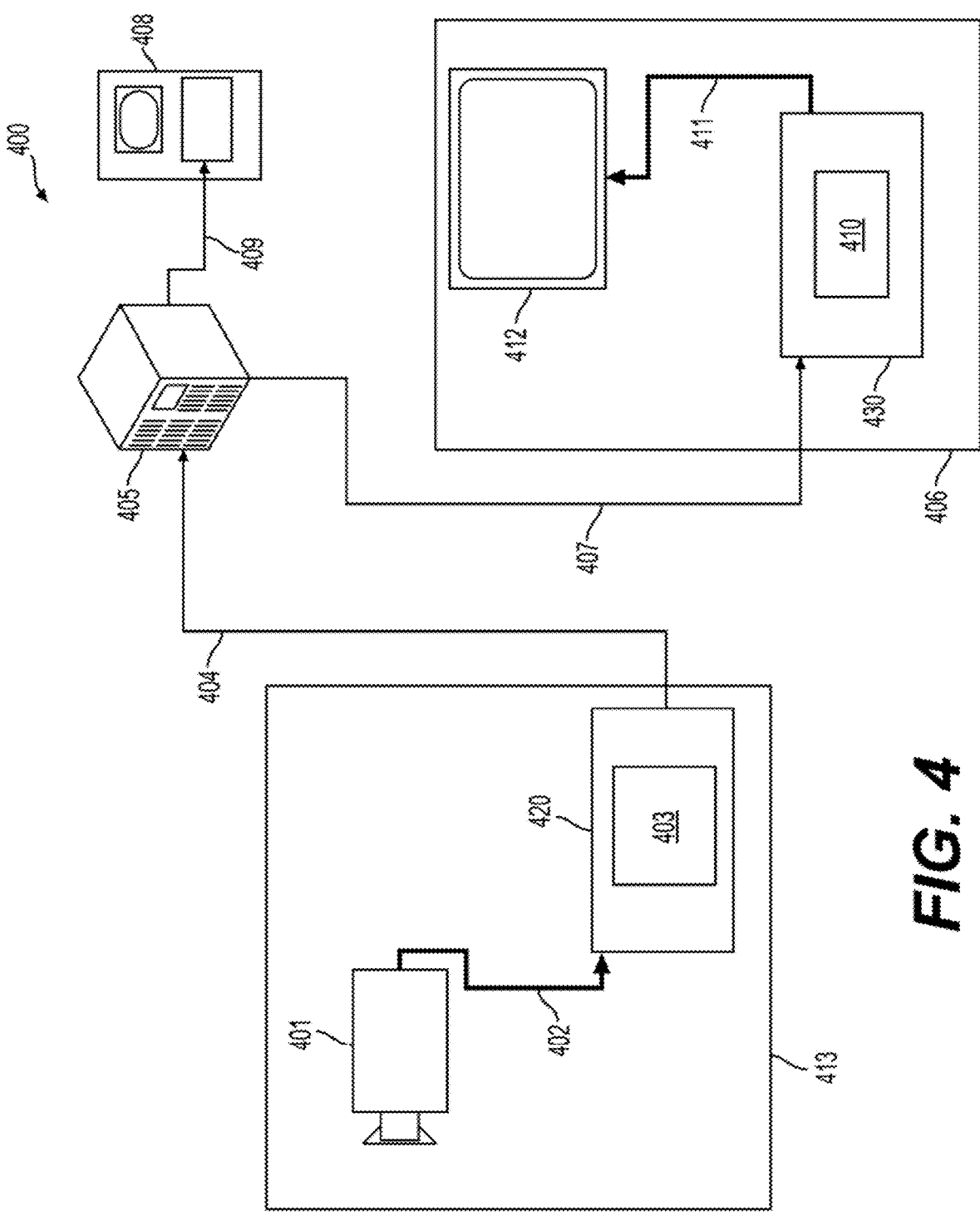
FIG. 4 is a schematic illustration of a simplified block diagram of a communication system (400) in accordance with an embodiment.

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
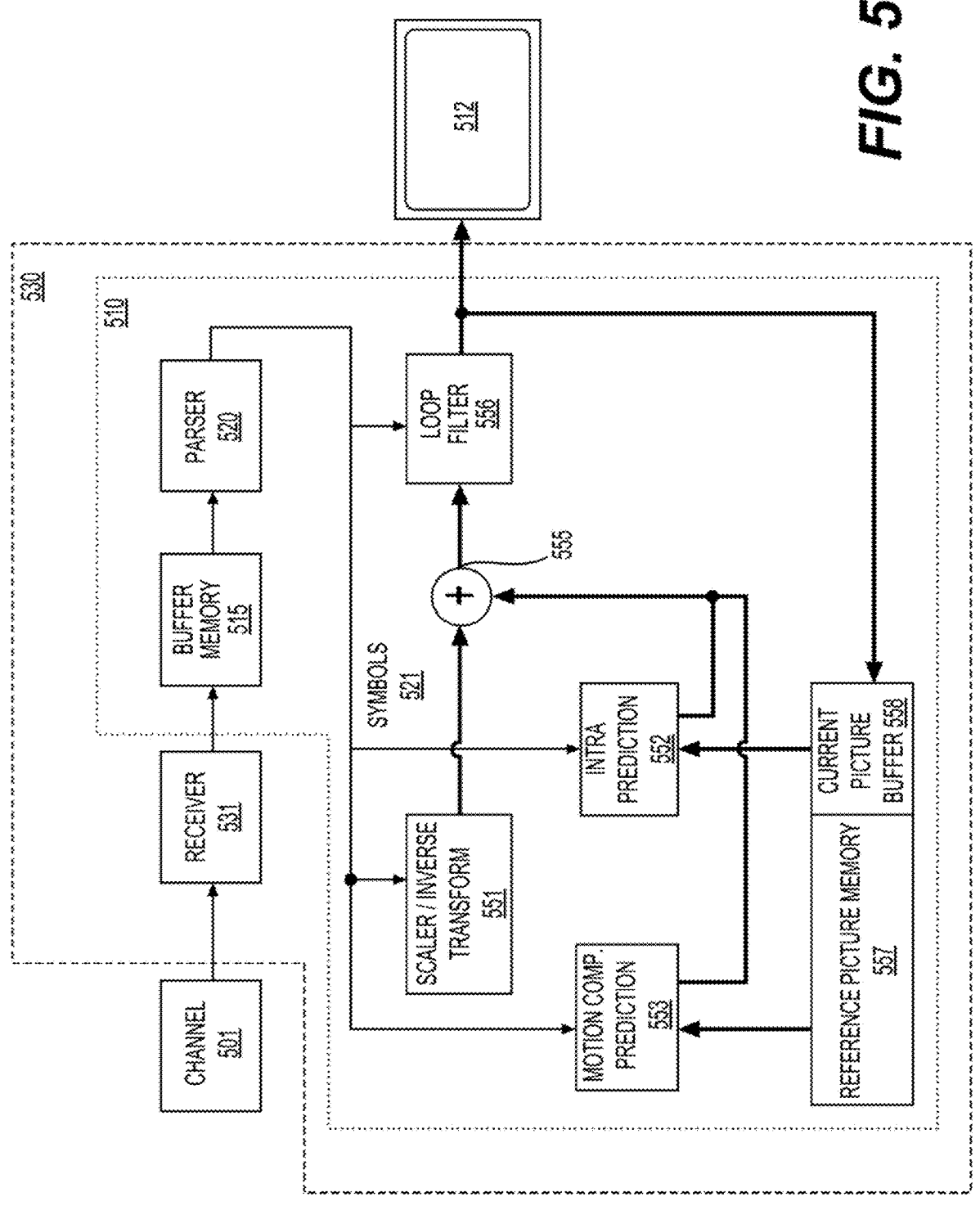
FIG. 5 is a schematic illustration of a simplified block diagram of a decoder in accordance with an embodiment.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
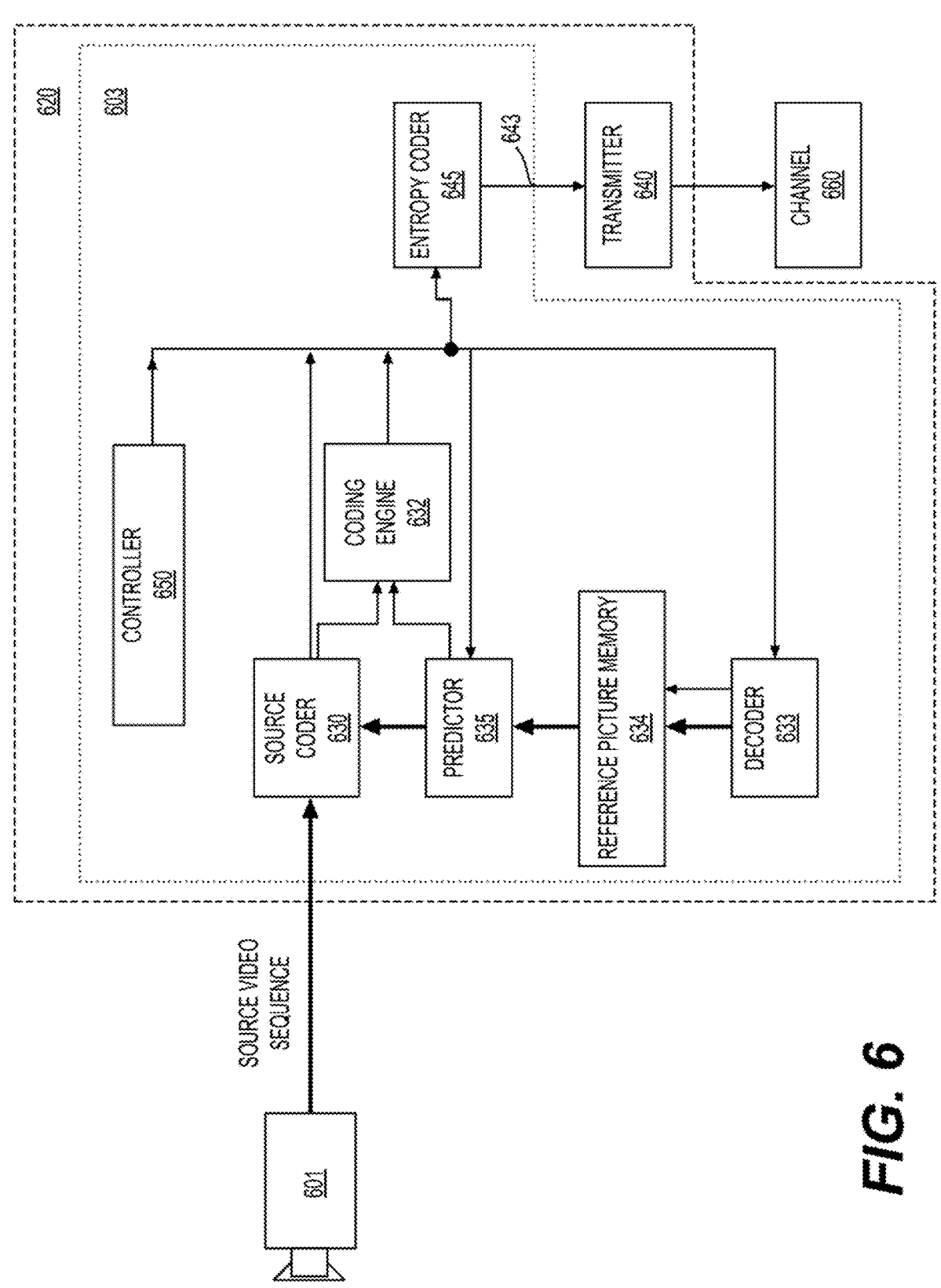
FIG. 6 is a schematic illustration of a simplified block diagram of an encoder in accordance with an embodiment.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
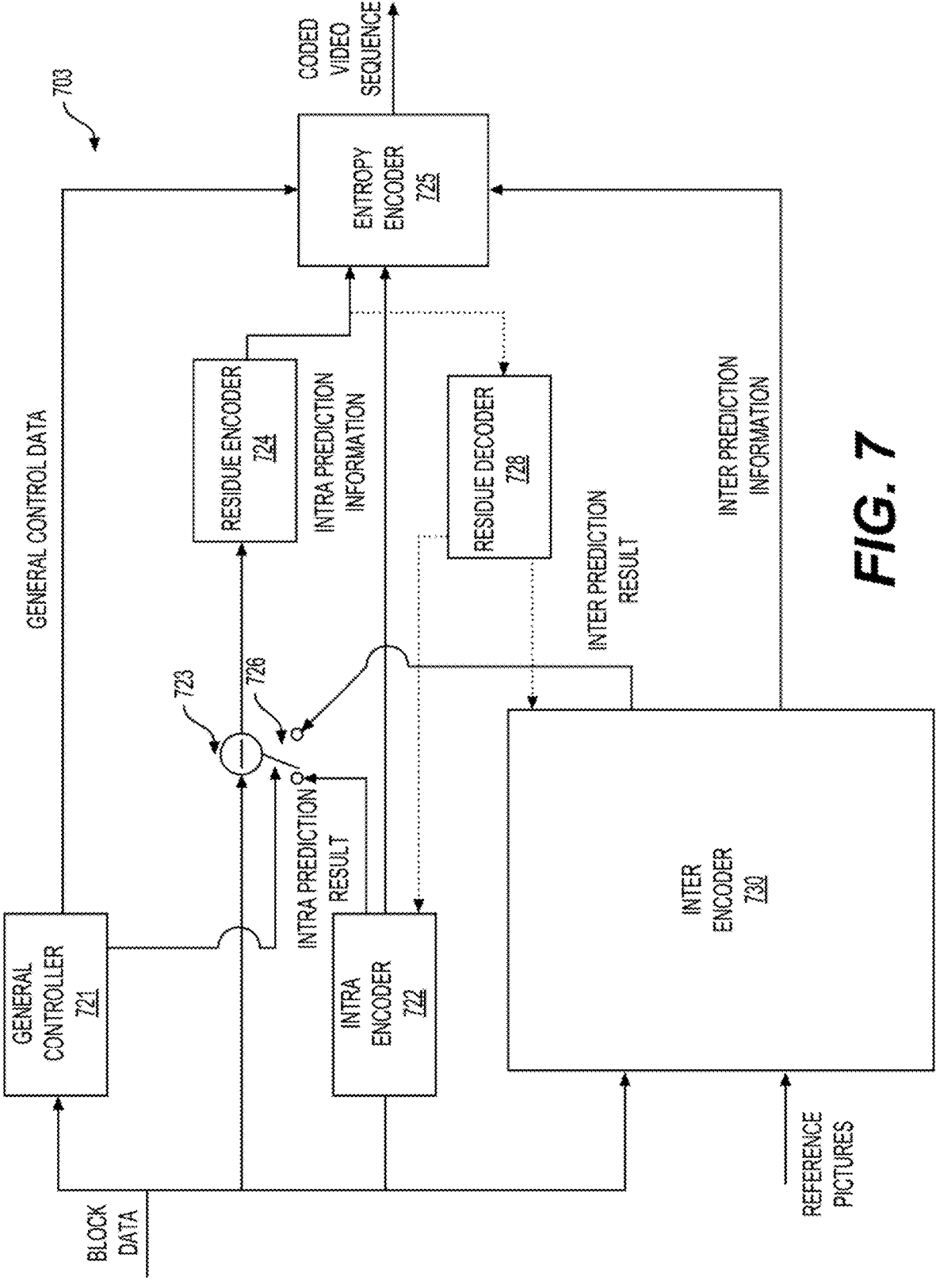
FIG. 7 shows a block diagram of an encoder in accordance with another embodiment.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
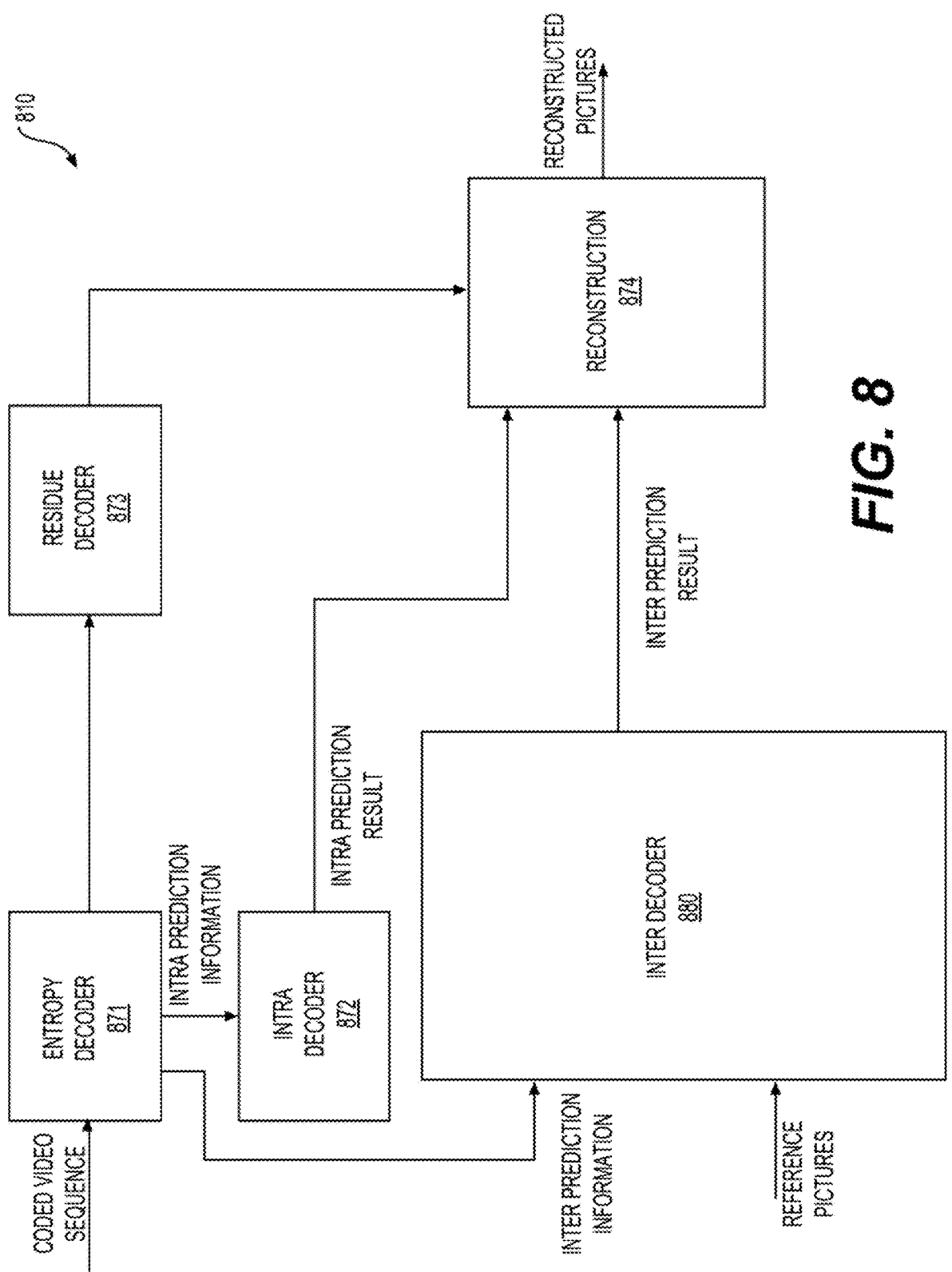
FIG. 8 shows a block diagram of a decoder in accordance with another embodiment.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Some aspects of the disclosure provide techniques for affine merge mode with translational motion vectors.

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). In 2015, the two standard organizations jointly formed JVET (Joint Video Exploration Team) to explore the potential of developing a next video coding standard beyond HEVC. In October 2017, the two standard organizations issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of the meeting, JVET formally launched a standardization process of next-generation video coding beyond HEVC. The new standard was named Versatile Video Coding (VVC), and JVET was renamed as Joint Video Experts Team. In 2020, ITU-T VCEG (Q6/16) and ISO/IEC MPEG (JTC 1/SC 29/WG 11) published the VVC video coding standard (version 1).

In inter prediction, for each inter-predicted coding unit (CU), motion parameters are required for coding features of VVC, for example, to be used for the inter-predicted sample generation. The motion parameters can include motion vectors, reference picture indices, a reference picture list usage index, and/or additional information. The motion parameters can be signaled in an explicit or implicit manner. When a CU is coded with a skip mode, the CU can be associated with one PU, and a significant residual coefficient, a coded motion vector delta, and/or a reference picture index may not be required. When a CU is coded with a merge mode, the motion parameters for the CU can be obtained from neighboring CUs. The neighboring CUs can include spatial and temporal candidates, and additional schedules (or additional candidates) such as introduced in VVC. The merge mode can be applied to any inter-predicted CU, not only to skip mode. An alternative to the merge mode is an explicit transmission of motion parameters, where a motion vector, a corresponding reference picture index for each reference picture list, a reference picture list usage flag, and/or other needed information can be signaled explicitly per CU.

In VVC, a VVC Test model (VTM) reference software can include a number of new and refined inter prediction coding tools, which can include one or more of the following:

(1) Extended merge prediction
   (2) Merge motion vector difference (MMVD)
   (3) AMVP mode with symmetric MVD signalling
   (4) Affine motion compensated prediction
   (5) Subblock-based temporal motion vector prediction (SbTMVP)
   (6) Adaptive motion vector resolution (AMVR)
   (7) Motion field storage: $\frac{1}{16}$th luma sample MV storage and 8×8 motion field compression
   (8) Bi-prediction with CU-level weights (BCW)
   (9) Bi-directional optical flow (BDOF)

(10) Decoder-side motion vector refinement (DMVR)
   (11) Combined inter and intra prediction (CIIP)
   (12) Geometric partitioning mode (GPM)

Figures 9A, 9B:
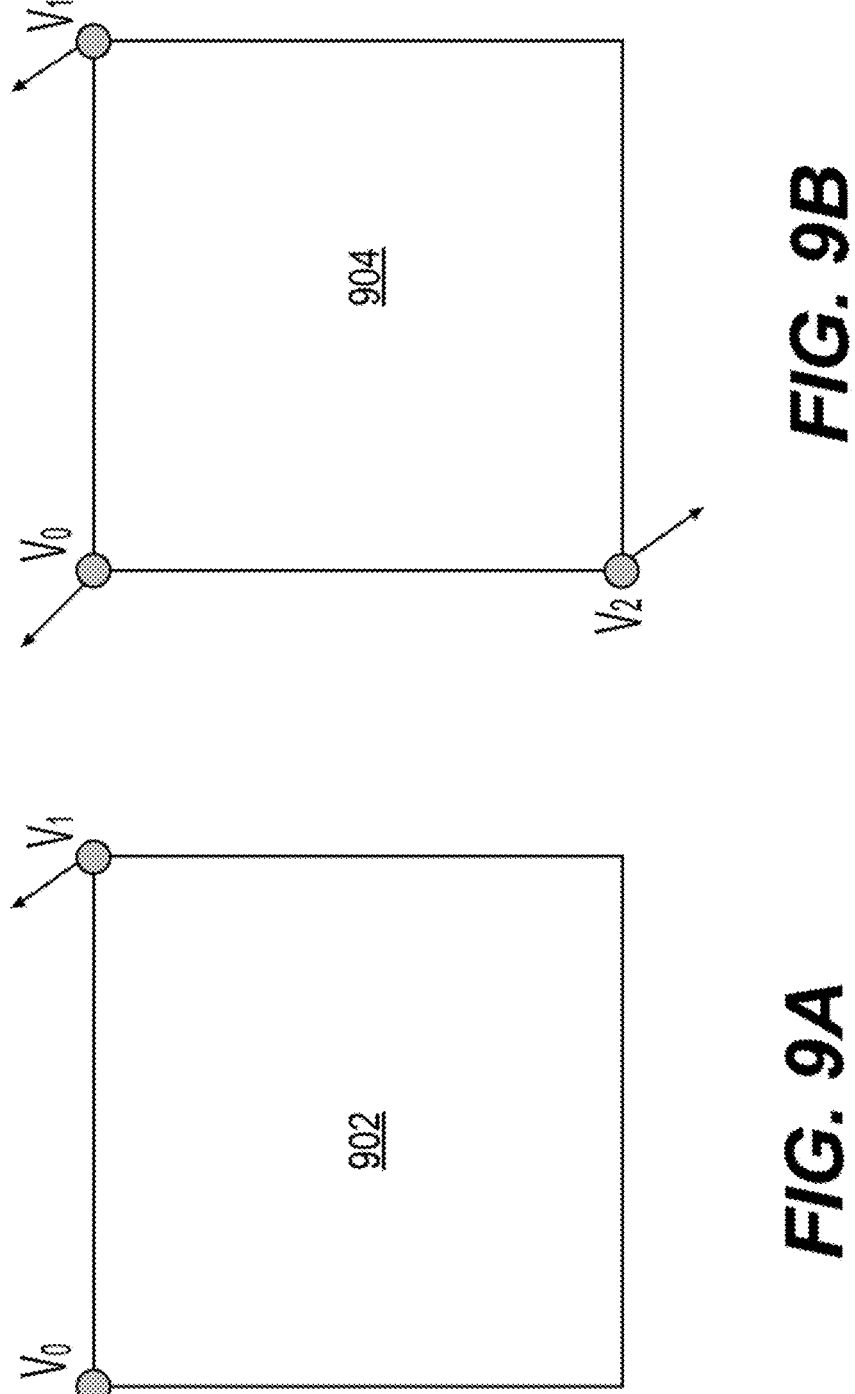
FIG. 9A shows a schematic illustration of a 4-parameter affine model in accordance with another embodiment.
FIG. 9B shows a schematic illustration of a 6-parameter affine model in accordance with another embodiment.

In HEVC, a translation motion model is applied for motion compensation prediction (MCP). While in the real world, many kinds of motions can exist, such as zoom in/out, rotation, perspective motions, and other irregular motions. A block-based affine transform motion compensation prediction can be applied, such as in VTM. FIG. 9A shows an affine motion field of a block (902) described by motion information of two control points (4-parameter). FIG. 9B shows an affine motion field of a block (904) described by three control point motion vectors (6-parameter).

As shown in FIG. 9A, in the 4-parameter affine motion model, a motion vector at a sample location (x, y) in the block (902) can be derived in equation (1) as follows:

$$\begin{cases} mv_x = \dfrac{mv_{1x} - mv_{0x}}{W}x + \dfrac{mv_{1y} - mv_{0y}}{W}y + mv_{0x} \\ mv_y = -\dfrac{mv_{1y} - mv_{0y}}{W}x + \dfrac{mv_{1x} - mv_{0x}}{W}y + mv_{0y} \end{cases} \qquad \text{Eq. (1)}$$

where $mv_x$ can be the motion vector in a first direction (or X direction) and $mv_y$ can be the motion vector in a second direction (or Y direction). The motion vector can also be described in equation (2):

$$\begin{cases} mv_x = ax + by + c \\ mv_y = -bx + ay + f \end{cases} \qquad \text{Eq. (2)}$$

As shown in FIG. 9B, in the 6-parameter affine motion model, a motion vector at a sample location (x, y) in the block (904) can be derived in equation (3) as follows:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \qquad \text{Eq. (3)}$$

The 6-parameter affine motion model can also described in equation (4) as follows:

$$\begin{cases} mv_x = ax + by + c \\ mv_y = dx + ey + f \end{cases} \qquad \text{Eq. (4)}$$

As shown in equations (1) and (3), $(mv_{0x}, mv_{0y})$ can be a motion vector of a top-left corner control point. $(mv_{1x}, mv_{1y})$ can be motion vector of a top-right corner control point. $(mv_{2x}, mv_{2y})$ can be a motion vector of a bottom-left corner control point.

Figure 10:
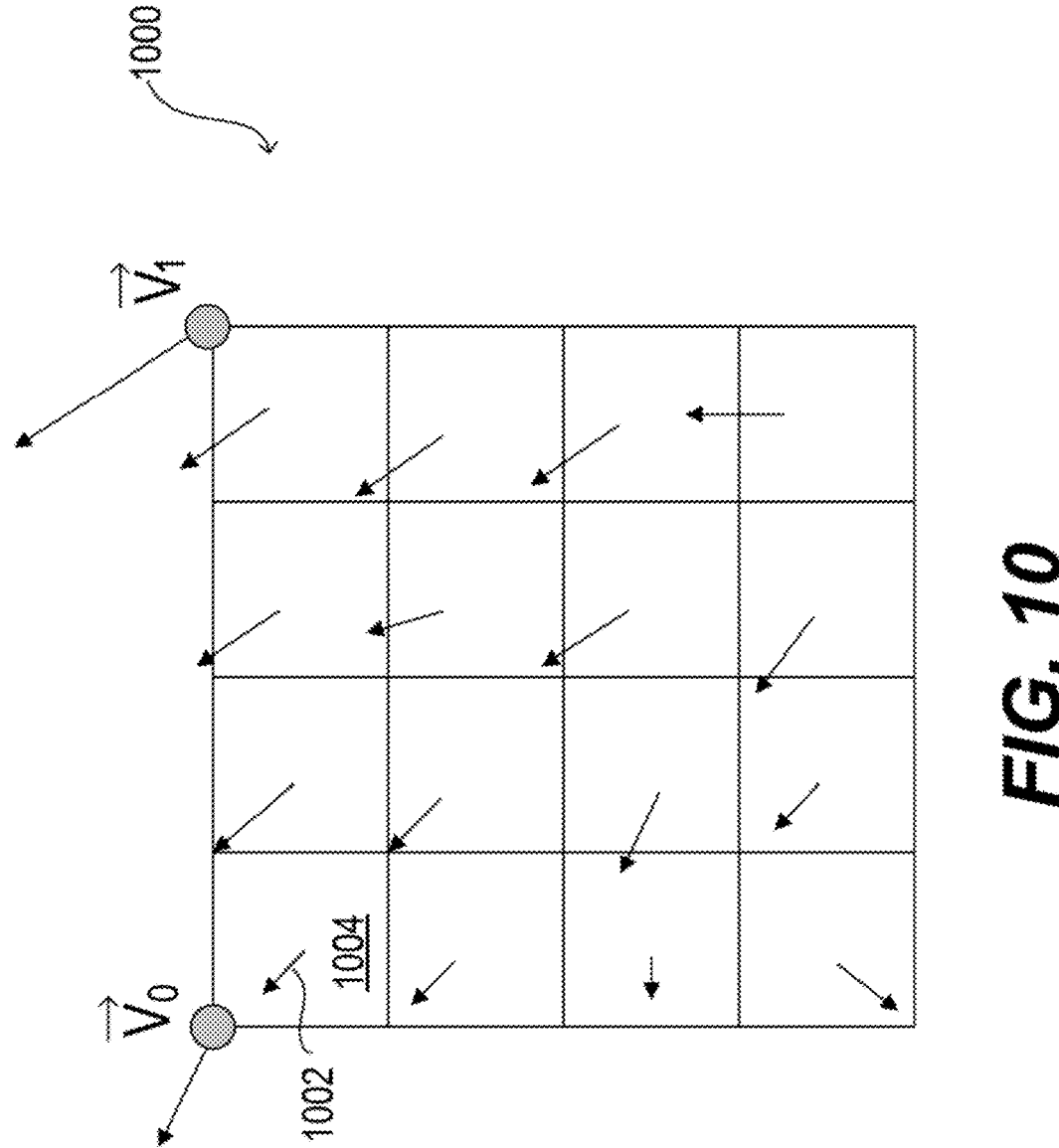
FIG. 10 shows a schematic illustration of an affine motion vector field associated with sub-blocks in a block in accordance with another embodiment.

As shown in FIG. 10, to simplify the motion compensation prediction, block based affine transform prediction can be applied. To derive a motion vector of each 4×4 luma sub-block, a motion vector of a center sample (e.g., (1002)) of each sub-block (e.g., (1004)) in a current block (1000) can be calculated according to the equations (1)-(4), and rounded to $\frac{1}{16}$ fraction accuracy. Motion compensation interpolation filters can then be applied to generate the prediction of each sub-block with the derived motion vector. A sub-block size of chroma-components can also be set as 4×4. The MV of a 4×4 chroma sub-block can be calculated as an average of MVs of four corresponding 4×4 luma sub-blocks.

In affine merge prediction, an affine merge (AF_MERGE) mode can be applied for CUs with both a width and a height larger than or equal to 8. CPMVs of a current CU can be generated based on motion information of spatial neighboring CUs. Up to five CPMVP candidates can be applied for the affine merge prediction and an index can be signalled to indicate which one of the five CPMVP candidates can be used for the current CU. In affine merge prediction, three types of CPMV candidate can be used to form the affine merge candidate list: (1) inherited affine merge candidates that are extrapolated from CPMVs of neighbour CUs, (2) constructed affine merge candidates with CPMVPs that are derived using translational MVs of neighbour CUs, and (3) Zero MVs.

Figure 11:
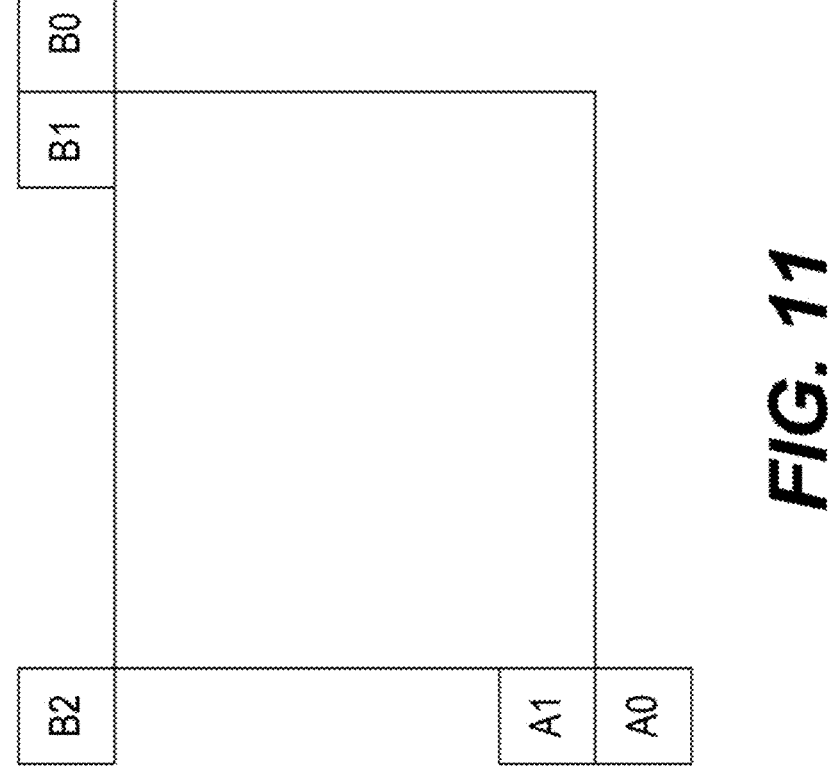
FIG. 11 shows a schematic illustration of exemplary positions of spatial merge candidates in accordance with another embodiment.
Figure 12:
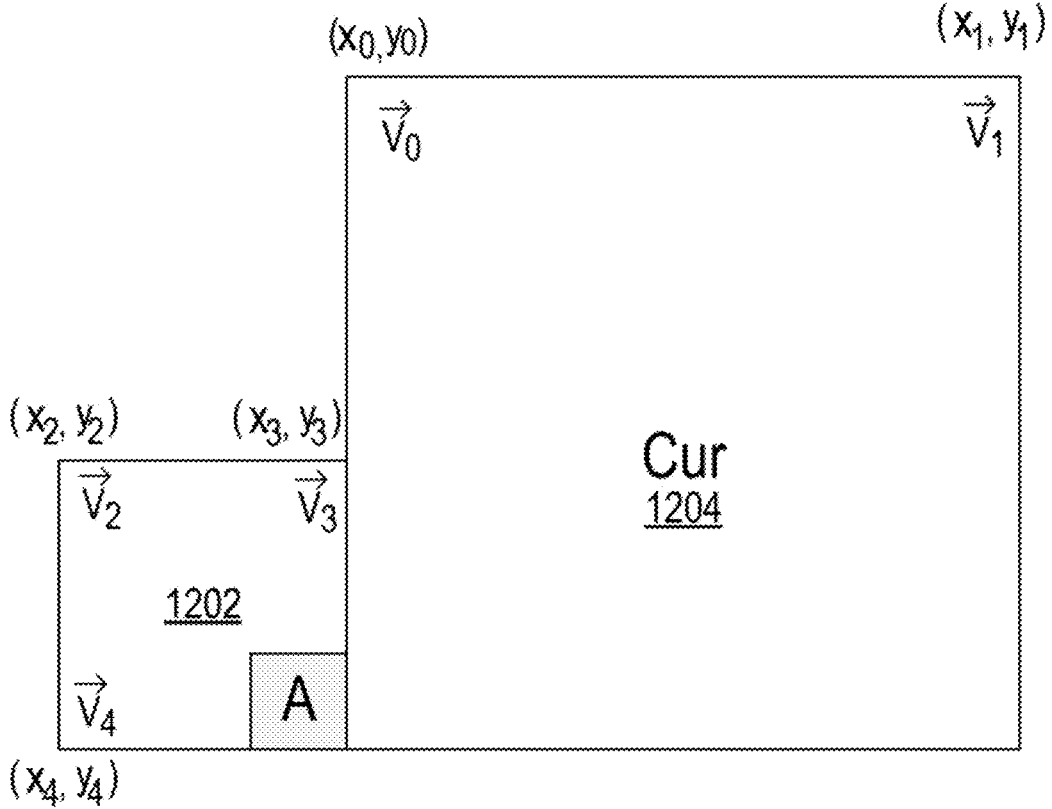
FIG. 12 shows a schematic illustration of control point motion vector inheritance in accordance with another embodiment.

In VTM3, a maximum of two inherited affine candidates can be applied. The two inherited affine candidates can be derived from an affine motion model of neighboring blocks. For example, one inherited affine candidate can be derived from left neighboring CUs and the other inherited affine candidate can be derived from above neighboring CUs. Exemplary candidate blocks can be shown in FIG. 11. As shown in FIG. 11, for a left predictor (or a left inherited affine candidate), a scan order can be A0→A1, and for an above predictor (or an above inherited affine candidate), a scan order can be B0→B1→B2. Thus, only the first available inherited candidate from each side can be selected. No pruning check may be performed between two inherited candidates. When a neighboring affine CU is identified, control point motion vectors of the neighboring affine CU can be used to derive the CPMVP candidate in the affine merge list of the current CU. As shown in FIG. 12, when a neighboring left bottom block A of a current block (1204) is coded in affine mode, motion vectors $v_2$, $v_3$ and $v_4$ of a top left corner, an above right corner, and a left bottom corner of a CU (1202) which contains the block A can be attained. When the block A is coded with 4-parameter affine model, two CPMVs of the current CU (1204) can be calculated according to $v_2$, and $v_3$ of the CU (1202). In a case that block A is coded with a 6-parameter affine model, three CPMVs of the current CU (1204) can be calculated according to $v_2$, $v_3$ and $v_4$ of the CU (1202).

Figure 13:
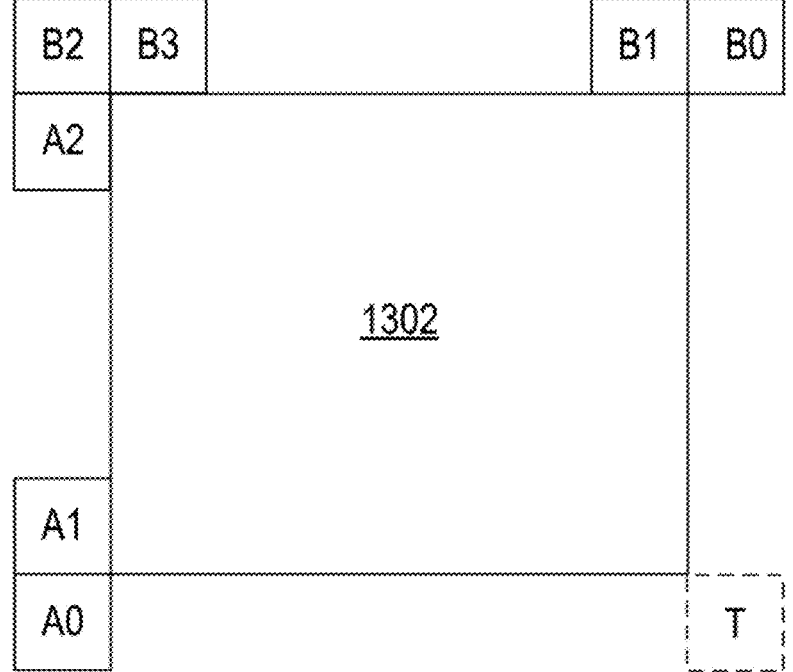
FIG. 13 shows a schematic illustration of locations of candidates for constructing affine merge mode in accordance with another embodiment.

A constructed affine candidate of a current block can be a candidate that is constructed by combining neighbor translational motion information of each control point of the current block. The motion information of the control points can be derived from specified spatial neighbors and a temporal neighbor that can be shown in FIG. 13. As shown in FIG. 13, $CPMV_k$ (k=1, 2, 3, 4) represents a k-th control point of a current block (1302). For $CPMV_1$, B2→B3→A2 blocks can be checked and an MV of the first available block can be used. For $CPMV_2$, B1→B0 blocks can be checked. For $CPMV_3$, A1→A0 blocks can be checked. TMVP can be used as $CPMV_4$ if $CPM_4$ is not available.

After MVs of four control points are attained, affine merge candidates can be constructed for the current block (1302) based on motion information of the four control points. For example, the affine merge candidates can be constructed based on combinations of the MVs of the four control points in an order as follows: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, and {$CPMV_1$, $CPMV_3$}.

The combination of 3 CPMVs can construct a 6-parameter affine merge candidate and the combination of 2 CPMVs can construct a 4-parameter affine merge candidate. To avoid a motion scaling process, if reference indices of control points are different, a related combination of control point MVs can be discarded.

After inherited affine merge candidates and constructed affine merge candidate are checked, if the list is still not full, zero MVs can be inserted to an end of the list.

In affine AMVP prediction, an affine AMVP mode can be applied for CUs with both a width and a height larger than or equal to 16. An affine flag in CU level can be signalled in the bitstream to indicate whether affine AMVP mode is used and then another flag can be signaled to indicate whether a 4-parameter affine or a 6-parameter affine is applied. In affine AMVP prediction, a difference of CPMVs of a current CU and predictors of the CPMVPs of the current CU can be signalled in the bitstream. A size of an affine AMVP candidate list can be 2 and the affine AMVP candidate list can be generated by using four types of CPMV candidate in an order as follows:

(1) Inherited affine AMVP candidates that are extrapolated from the CPMVs of the neighbour CUs, (2) Constructed affine AMVP candidates with CPMVPs that are derived using the translational MVs of the neighbour CUs, (3) Translational MVs from neighboring CUs, and (40 Zero MVs.

A checking order of inherited affine AMVP candidates can be the same as a checking order of inherited affine merge candidates. To determine an AVMP candidate, only an affine CU that has the same reference picture as the current block can be considered. No pruning process may be applied when an inherited affine motion predictor is inserted into the candidate list.

A constructed AMVP candidate can be derived from specified spatial neighbors. As shown in FIG. 13, the same checking order can be applied as the checking order in affine merge candidate construction. In addition, a reference picture index of a neighboring block can also be checked. A first block in the checking order can be inter coded and have the same reference picture as the current CU (1302). One constructed AMVP candidate can be determined when the current CU (1302) is coded with a 4-parameter affine mode, and $mv_0$ and $my_1$ are both available. The constructed AMPV candidate can further be added to the affine AMVP list. When the current CU (1302) is coded with a 6-parameter affine mode, and all three CPMVs are available, the constructed AMVP candidate can be added as one candidate in the affine AMVP list. Otherwise, the constructed AMVP candidate can be set as unavailable.

If candidates in the affine AMVP list are still less than 2 after the inherited affine AMVP candidates and the constructed AMVP candidate are checked, $mv_0$, $mv_1$ and $mv_2$ can be added, in order. The $mv_0$, $my_1$ and $mv_2$ can function as translational MVs to predict all control point MVs of the current CU (e.g., (1302)) when available. Finally, zero MVs can be used to fill the affine AMVP list if the affine AMVP is still not full.

Subblock-based affine motion compensation can save memory access bandwidth and reduce computation complexity compared to pixel based motion compensation, at the cost of a prediction accuracy penalty. To achieve a finer granularity of motion compensation, prediction refinement with optical flow (PROF) can be used to refine the subblock-based affine motion compensated prediction without increasing the memory access bandwidth for motion compensation. In VVC, after the subblock-based affine motion compensation is performed, a luma prediction sample can be refined by adding a difference derived by an optical flow equation. The PROF can be described in four steps as follows:

Step (1): the subblock-based affine motion compensation can be performed to generate subblock prediction I(i, j).

Step (2): spatial gradients $g_x(i, j)$ and $g_y(i, j)$ of the subblock prediction can be calculated at each sample location using a 3-tap filter [−1, 0, 1]. The gradient calculation can be the same as gradient calculation in BDOF. For example, the spatial gradients $g_x(i,j)$ and $g_y(i,j)$ can be calculated based on equations (5) and (6) respectively.

$$g_x(i,j)=(I(i+1,j)>>shift1)-(I(i-1,j)>>shift1) \qquad \text{Eq. (5)}$$

$$g_y(i,j)=(I(i,j+1)>>shift1)-(1(i,j-1)>>shift1) \qquad \text{Eq. (6)}$$

As shown in equations (5) and (6), shift1 can be used to control a precision of the gradient. Subblock (e.g., 4×4) prediction can be extended by one sample on each side for the gradient calculation. To avoid additional memory bandwidth and additional interpolation computation, extended samples on extended borders can be copied from a nearest integer pixel position in the reference picture.

Figure 14:
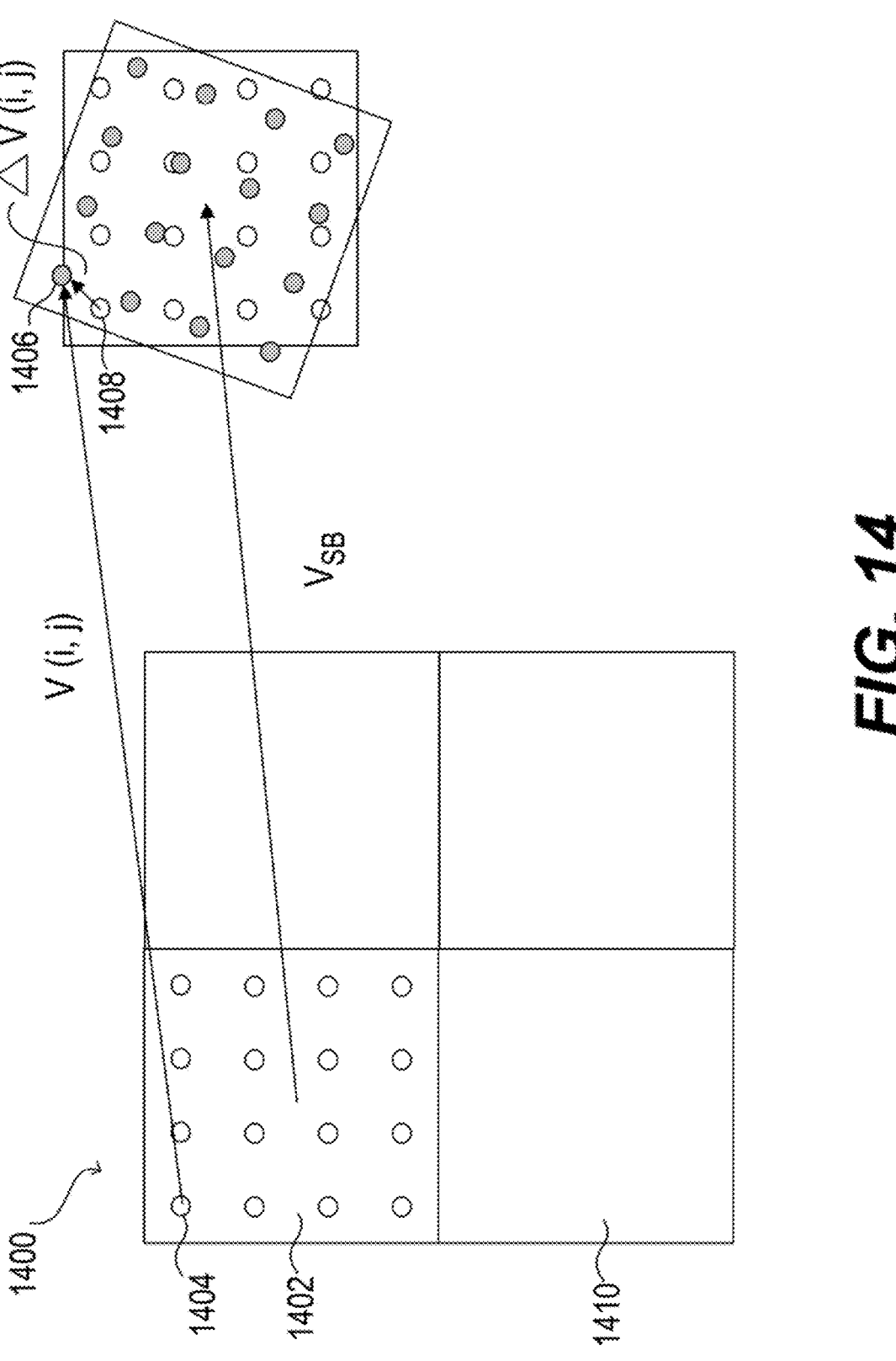
FIG. 14 shows a schematic illustration of a prediction refinement with optical flow (PROF) in accordance with another embodiment.

Step (3): luma prediction refinement can be calculated by an optical flow equation as shown in equation (7).

$$\Delta I(i,j)=g_x(i,j)*\Delta v_x(i,j)+g_y(i,j)*\Delta v_y(i,j) \qquad \text{Eq. (7)}$$

where $\Delta v(i,j)$ can be a difference between a sample MV computed for a sample location (i,j), denoted by $v(i,j)$, and a subblock MV, denoted by $v_{SB}$, of a subblock to which the sample (i,j) belongs. FIG. 14 shows an exemplary illustration of the difference between the sample MV and the subblock MV. As shown in FIG. 14, a subblock (1402) can be included in a current block (1400) and a sample (1404) can be included in the subblock (1402). The sample (1404) can include a sample motion vector $v(i,j)$ that corresponds to a reference pixel (1406). The subblock (1402) can include a subblock motion vector $v_{SB}$. Based on the subblock motion vector $v_{SB}$, the sample (1404) can correspond to a reference pixel (1408). A difference between the sample MV and the subblock MV, denoted by $\Delta v(i,j)$, can be indicated by a difference between the reference pixel (1406) and the reference pixel (1408). The $\Delta v(i, j)$ can be quantized in a unit of 1/32 luma sample precision.

Since affine model parameters and a sample location relative to a subblock center may not be changed from a subblock to another subblock, $\Delta v(i,j)$ can be calculated for a first subblock (e.g., (1402)), and reused for other subblocks (e.g., (1410)) in the same CU (e.g., (1400)). Let $d_x(i,j)$ be a horizontal offset and $d_y(i,j)$ be a vertical offset from a sample location (i, j) to a center of a subblock $(x_{SB}, y_{SB})$, $\Delta v(x, y)$ can be derived by equations (8) and (9) as follows:

$$\begin{cases} dx(i, j) = i - x_{SB} \\ dy(i, j) = j - y_{SB} \end{cases} \qquad \text{Eq. (8)}$$

$$\begin{cases} \Delta v_x(i, j) = C*dx(i, j) + D*dy(i, j) \\ \Delta v_y(i, j) = E*dx(i, j) + F*dy(i, j) \end{cases} \qquad \text{Eq. (9)}$$

In order to keep accuracy, the center of the subblock $(x_{SB}, y_{SB})$ can be calculated as $((W_{SB}-1)/2, (H_{SB}-1)/2)$, where $W_{SB}$ and $H_{SB}$ are the subblock width and height, respectively.

Once $\Delta v(x, y)$ is obtained, parameters of the affine model can be obtained. For example, for a 4-parameter affine model, the parameters of the affine model can be shown in equation (10).

$$\begin{cases} C = F = \dfrac{v_{1x} - v_{0x}}{w} \\ E = -D = \dfrac{v_{1y} - v_{0y}}{w} \end{cases} \qquad \text{Eq. (10)}$$

For a 6-parameter affine model, the parameters of the affine model can be shown in equation (11).

$$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \qquad \text{Eq. (11)}$$

where $(v_{0x}, v_{0y})$, $(v_{1x}, v_{1y})$, $(v_{2x}, v_{2y})$ can be a top-left control point motion vector, a top-right control point motion vector, and a bottom-left control point motion vector respectively, and w and h can be a width and a height of the CU respectively.

Step (4): finally, the luma prediction refinement $\Delta I(i,j)$ can be added to the subblock prediction I(i,j). A final prediction I′ can be generated as shown in equation (12).

$$I'(i,j)=1(i,j)+\Delta I(i,j) \qquad \text{Eq. (12)}$$

PROF may not be applied in two cases for an affine coded CU: (1) all control point MVs are the same, which indicates that the CU only has translational motion, and (2) the affine motion parameters are greater than a specified limit because the subblock-based affine MC is degraded to CU-based MC to avoid a large memory access bandwidth requirement.

It is noted that when coded in the affine AMVP mode, each control point of an affine coding block has a motion vector difference (MVD). For each reference picture, the MVD of control points are calculated from the actual CPMV values and the affine AMVP predictor's CPMV values.

In an example, for 4-parameter affine, two MVDs (denoted by $MVD_0$, and $MVD_1$) are coded for each reference list according to Eq. (13) and Eq. (14):

$$MVD_0=MV_0-MVP_0 \qquad \text{Eq. (13)}$$

$$MVD_1=MV_1-MVP_1-MVD_0 \qquad \text{Eq. (14)}$$

where $MV_0$ and $MV_1$ denote the actual CPMV values of two control points, and $MVP_0$ and $MVP_1$ denote the affine AMVP predictor's CPMV values of two control points.

In another example, for 6-parameter affine, three MVDs (denoted by $MVD_0$, $MVD_1$ and $MVD_2$) are coded for each reference list according to Eq. (15), Eq. (16) and Eq. (17):

$$MVD_0=MV_0-MVP_0 \qquad \text{Eq. (15)}$$

$$MVD_1=MV_1-MVP_1-MVD_0 \qquad \text{Eq. (16)}$$

$$MVD_2=MV_2-MVP_2-MVD_0 \qquad \text{Eq. (17)}$$

where $MV_0$, $MV_1$ and $MV_2$ denote the actual CPMV values of three control points, and $MVP_0$, $MVP_1$ and $MVP_2$ denote the affine AMVP predictor's CPMV values of three control points.

Affine Motion Estimation (ME), such as in VVC reference software VTM, can be operated for both Uni-prediction and Bi-prediction. The Uni-prediction can be performed on one of a reference list L0 and a reference list L1 and the Bi-prediction can be performed on both the reference list L0 and the reference list L1.

Affine Motion Estimation (ME), such as in VVC reference software VTM, can be operated for both Uni-prediction and Bi-prediction. The Uni-prediction can be performed on one of a reference list L0 and a reference list L1 and the Bi-prediction can be performed on both the reference list L0 and the reference list L1.

FIG. 15 shows a schematic illustration of affine ME (1500). As shown in FIG. 15, in affine ME (1500), an affine Uni-prediction (S1502) can be performed on the reference list L0 to obtain a prediction P0 of a current block based on an initial reference block in the reference list L0. An affine Uni-prediction (S1504) can also be performed on the reference list L1 to obtain a prediction P1 of the current block based on an initial reference block in the reference list L1. At (S1506), an affine Bi-prediction can be performed. The affine Bi-prediction (S1506) can start with an initial prediction residue (2I-P0)-P1, where I can be initial values of the current block. The affine Bi-prediction (S1506) can search candidates in the reference list L1 around the initial reference block in the reference list L1 to find a best (or selected) reference block that has a minimum prediction residue (2I-P0)-Px, where Px is prediction of the current block based on the selected reference block.

With a reference picture, for a current coding block, the Affine ME process can first pick a set of control point motion vectors (CPMVs) as a base. An iterative method can be used to generate a prediction output of a current affine model that corresponds to the set of CPMVs, calculate gradients of prediction samples, and then solve a linear equation to determine delta CPMVs to optimize affine prediction. The iterations can stop when all the delta CPMVs are 0, or a maximum number of iterations is reached. The CPMVs obtained from the iterations can be final CPMVs for the reference picture.

After the best affine CPVMs on both the reference list L0 and L1 are determined for affine Uni-prediction, affine Bi-prediction searching can be performed using the best Uni-prediction CPMVs and a reference list on one side, and searching for best CPMVs on the other reference list to optimize affine Bi-prediction output. The affine Bi-prediction search can be performed iteratively on the two reference lists to obtain optimal results.

Figure 16:
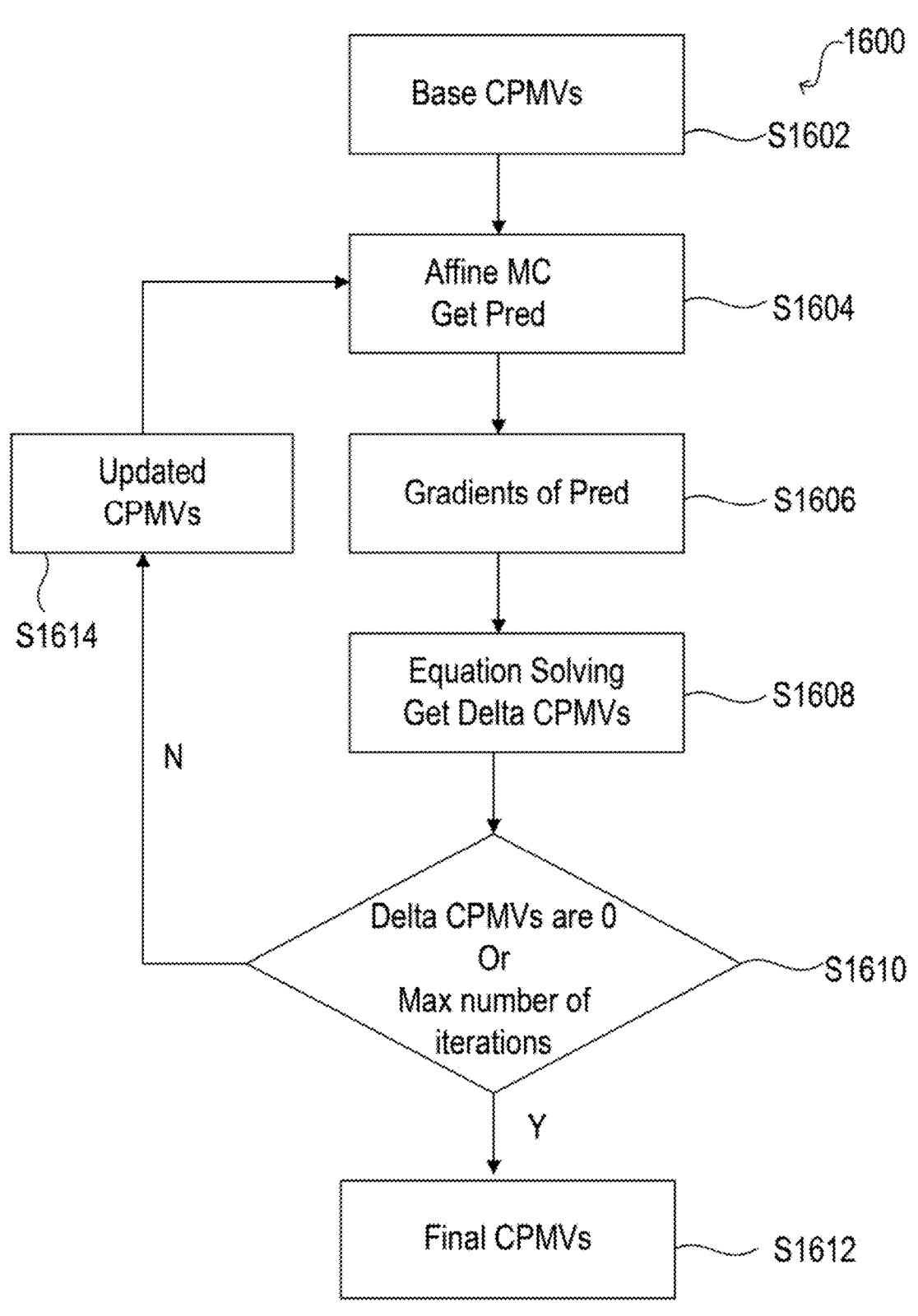
FIG. 16 shows a flow chart of affine motion estimation search in accordance with another embodiment.

FIG. 16 shows an exemplary affine ME process (1600) in which final CPMVs associated with a reference picture can be calculated. The affine ME process (1600) can start with (S1602). At (S1602), base CPMVs of a current block can be determined. The base CPMVs can be determined based on one of a merge index, an advanced motion vector prediction (AMVP) predictor index, an affine merge index, or the like.

At (S1604), an initial affine prediction of the current block can be obtained based on the base CPMVs. For example, according to the base CPMVs, a 4-parameter affine motion model of a 6-parameter affine motion model can be applied to generate the initial affine prediction.

At (S1606), gradients of the initial affine prediction can be obtained. For example, the gradients of the initial affine prediction can be obtained based on equations (5) and (6).

At (S1608), delta CPMVs can be determined. In some embodiments, the delta CPMVs can be associated with a displacement between the initial affine prediction and a subsequent affine prediction, such as a first affine prediction. Based on the gradients of the initial affine prediction and the delta CPMVs, first affine prediction can be obtained. The first affine prediction can correspond to first CPMVs.

At (S1610), a determination can be made to check whether the delta CPMVs are zero or an iteration number is equal to or larger than a threshold value. When the delta CPMVs are zero or the iteration number is equal to or larger than the threshold value, final (or selected) CPMVs can be determined at (S1612). The final (or selected) CPMVs can be the first CPMVs that are determined based on the gradients of the initial affine prediction and the delta CPMVs.

Still referring to (S1610), when the delta CPMVs are not zero or the iteration number is less than the threshold value, a new iteration can start. In the new iteration, updated CPMVs (e.g., the first CPMVs) can be provided to (S1604) to generate an updated affine prediction. The affine ME process (1600) can then proceed to (S1606), where gradients of the updated affine prediction can be calculated. The affine ME process (1600) can then proceed to (S1608) to continue the new iteration.

In an affine motion model, a 4-parameter affine motion model can further be described by formulas that include motions of rotation and zooming. For example, a 4-parameter affine motion model can be rewritten in equations (18) as follows:

$$\begin{cases} mv_x = ax + by + c = (r \cdot \cos\theta - 1) \cdot x + r \cdot \sin\theta \cdot y + c \\ mv_y = -bx + ay + f = -r \cdot \sin\theta \cdot x + (r \cdot \cos\theta - 1) \cdot y + f \end{cases} \quad \text{Eq. (18)}$$

where r and $\theta$ can be a zooming factor and a rotation angle, respectively. When a current frame is temporally in a middle of two reference frames, and if the motion is constant and continuous, the zooming factor can be exponential while the rotation angle can be constant. Therefore, equation (18) can be applied to formulate an affine motion to one reference, such as an affine motion to a reference list 0. An affine motion to another reference frame that is temporally on another side of the current frame, such as a reference list 1, can be described in equation (19).

$$\begin{cases} mv_x = \left(\frac{1}{r} \cdot \cos(-\theta) - 1\right) \cdot x + \frac{1}{r} \cdot \sin(-\theta) \cdot y - c \\ mv_y = -\frac{1}{r} \cdot \sin(-\theta) \cdot x + \left(\frac{1}{r} \cdot \cos(-\theta) - 1\right) \cdot y - f \end{cases} \quad \text{Eq. (19)}$$

Equations (18) and (19) can be called a symmetric affine motion model. The symmetric affine motion model can be applied to further improve coding efficiency. It should be noted that relationships between a, b, r, and $\theta$ can be described in equation (20) as follows:

$$\begin{cases} r^2 = (a+1)^2 + b^2 \\ \tan\theta = \dfrac{b}{a+1} \end{cases} \quad \text{Eq. (20)}$$

Bi-directional optical flow (BDOF) in VVC, was previously referred to as BIO in the JEM. Compared to the JEM version, the BDOF in VVC can be a simpler version that requires less computation, especially in terms of the number of multiplications and the size of the multiplier.

BDOF can be used to refine a bi-prediction signal of a CU at a 4×4 subblock level. BDOF can be applied to a CU if the CU satisfies conditions as follows:

(1) The CU is coded using "true" bi-prediction mode, i.e., one of the two reference pictures is prior to the current picture in display order and the other is after the current picture in display order, (2) The distances (e.g., POC difference) from two reference pictures to the current picture are the same, (3) Both reference pictures are short-term reference pictures, (4) The CU is not coded using affine mode or the SbTMVP merge mode, (5) CU has more than 64 luma samples, (6) Both CU height and CU width are larger than or equal to 8 luma samples, (7) BCW weight index indicates equal weight, (8) Weighted position (WP) is not enabled for the current CU, and (9) CIIP mode is not used for the current CU.

BDOF may be only applied to a luma component. As the name of BDOF indicates, the BDOF mode can be based on an optical flow concept, which assumes that a motion of an object is smooth. For each 4×4 subblock, a motion refinement $(v_x, v_y)$ can be calculated by minimizing a difference between L0 and L1 prediction samples. The motion refinement can then be used to adjust the bi-predicted sample values in the 4×4 subblock. BDOF can include steps as follows:

$$\frac{\partial I^{(k)}}{\partial x}(i, j) \text{ and } \frac{\partial I^{(k)}}{\partial y}(i, j), k = 0,1,$$

First, horizontal and vertical gradients, (i,j) and (i,j), k=0,1, of the two prediction signals from the reference list L0 and the reference list L1 can be computed by directly calculating a difference between two neighboring samples. The horizontal and vertical gradients can be provided in equations (21) and (22) as follows:

$$\frac{\partial I^{(k)}}{\partial x}(i, j) = \left( \left( I^{(k)}(i + 1, j) \gg shift1 \right) - \left( I^{(k)}(i - 1, j) \gg shift1 \right) \right) \quad \text{Eq. (21)}$$

$$\frac{\partial I^{(k)}}{\partial y}(i, j) = \left( \left( I^{(k)}(i, j + 1) \gg shift1 \right) - \left( I^{(k)}(i, j - 1) \gg shift1 \right) \right) \quad \text{Eq. (22)}$$

where $I^{(k)}(i,j)$ can be a sample value at coordinate (i,j) of the prediction signal in list k, k=0,1, and shift1 can be calculated based on a luma bit depth, bitDepth, as shift1=max(6, bitDepth−6).

Then, an auto- and cross-correlation of the gradients, $S_1$, $S_2$, $S_3$, $S_5$ and $S_6$, can be calculated according to equations (23)-(27) as follows:

$$S_1 = \Sigma_{(i,j) \in \Omega} Abs(\psi_x(i,j)), \quad \text{Eq. (23)}$$

$$S_2 = \Sigma_{(i,j) \in \Omega} \psi_x(i,j) \cdot Sign(\psi_y(i,j)) \quad \text{Eq. (24)}$$

$$S_3 = \Sigma_{(i,j) \in \Omega} \theta(i,j) \cdot Sign(\psi_x(i,j)) \quad \text{Eq. (25)}$$

$$S_5 = \Sigma_{(i,j) \in \Omega} Abs(\psi_y(i,j)) \quad \text{Eq. (26)}$$

$$S_6 = \Sigma_{(i,j) \in \Omega} \theta(i,j) \cdot Sign(\psi_y(i,j)) \quad \text{Eq. (27)}$$

where $\psi_x(i,j)$, $\psi_y(i,j)$, and $\theta(i,j)$ can be provided in equations (28)-(30) respectively.

$$\psi_x(i, j) = \left( \frac{\partial I^{(1)}}{\partial x}(i, j) + \frac{\partial I^{(0)}}{\partial x}(i, j) \right) \gg n_a \quad \text{Eq. (28)}$$

$$\psi_y(i, j) = \left( \frac{\partial I^{(1)}}{\partial y}(i, j) + \frac{\partial I^{(0)}}{\partial y}(i, j) \right) \gg n_a \quad \text{Eq. (29)}$$

$$\theta(i, j) = \left( I^{(1)}(i, j) \gg n_b \right) - \left( I^{(0)}(i, j) \gg n_b \right) \quad \text{Eq. (30)}$$

where $\Omega$ can be a 6×6 window around the 4×4 subblock, and the values of $n_a$ and $n_b$ can be set equal to min (1, bitDepth−11) and min (4, bitDepth−8), respectively.

The motion refinement $(v_x, v_y)$ can then be derived using the cross- and auto-correlation terms using equations (31) and (32) as follows:

$$v_x = S_1 > 0?clip3(-th'_{BIO}, th'_{BIO}, -((S_3 \cdot 2^{nb-na}) \gg \lfloor \log_2 S_1 \rfloor)):0 \quad \text{Eq. (31)}$$

$$v_y = S_5 > 0?clip3(-th'_{BIO}, th'_{BIO}, -((S_6 \cdot 2^{nb-na} - ((v_x S_{2,m}) \ll n_{S_2} + v_x S_{2,s})/2) \gg \lfloor \log_2 S_5 \rfloor)):0 \quad \text{Eq. (32)}$$

where $S_{2,m} = S_2 \gg n_{S_2}$, $s_{2,s} = S_2 \& (2^{n_{S_2}} - 1)$, $th'_{BIO} = 2^{max(5, BD-7)}$. $\lfloor \bullet \rfloor$ is a floor function, and $n_{S_2} = 12$. Based on the motion refinement and the gradients, an adjustment can be calculated for each sample in the 4×4 subblock based on equation (33):

$$b(x, y) = rnd\left( \left( v_x \left( \frac{\partial I^{(1)}(x, y)}{\partial x} - \frac{\partial I^{(0)}(x, y)}{\partial x} \right) + v_y \left( \frac{\partial I^{(1)}(x, y)}{\partial y} - \frac{\partial I^{(0)}(x, y)}{\partial y} \right) + 1 \right) /2 \right) \quad \text{Eq. (33)}$$

Finally, the BDOF samples of the CU can be calculated by adjusting the bi-prediction samples in equation (34) as follows:

$$pred_{BDOF}(x,y) = (I^{(0)}(x,y) + I^{(1)}(x,y) + b(x,y) + o_{offset}) \gg shift \quad \text{Eq. (34)}$$

Values can be selected such that multipliers in the BDOF process do not exceed 15-bits, and a maximum bit-width of the intermediate parameters in the BDOF process can be kept within 32-bits.

Figure 17:
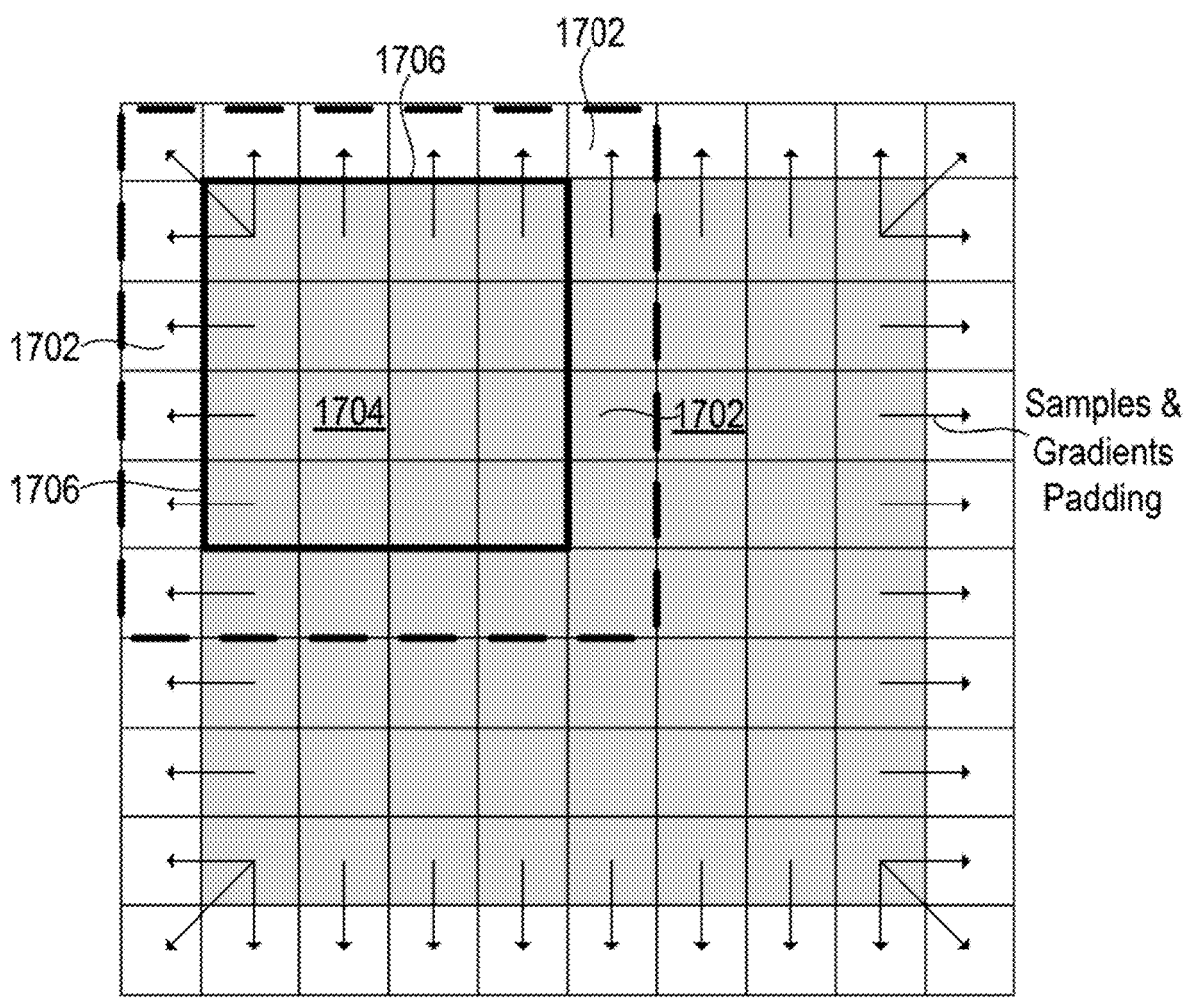
FIG. 17 shows a schematic illustration of an extended coding unit (CU) region for bi-directional optical flow (BDOF) in accordance with another embodiment.

In order to derive the gradient values, some prediction samples $I^{(k)}(i,j)$ in the list k (k=0,1) outside of the current CU boundaries need to be generated. As shown in FIG. 17, BDOF in VVC can use one extended row/column (1702) around boundaries (1706) of a CU (1704). In order to control the computational complexity of generating the out-of-boundary prediction samples, prediction samples in an extended area (e.g., unshaded region in FIG. 17) can be generated by taking the reference samples at the nearby integer positions (e.g., using a floor( ) operation on the coordinates) directly without interpolation, and a normal 8-tap motion compensation interpolation filter can be used to generate prediction samples within the CU (e.g., the shaded region in FIG. 17). The extended sample values can be used in gradient calculation only. For the remaining steps in the BDOF process, if any samples and gradient values outside of the CU boundaries are needed, the samples and gradient values can be padded (e.g., repeated) from nearest neighbors of the samples and gradient values.

When a width and/or a height of a CU is larger than 16 luma samples, the CU can be split into subblocks with a width and/or a height equal to 16 luma samples, and the subblock boundaries can be treated as CU boundaries in the BDOF process. A maximum unit size for BDOF process can be limited to 16×16. For each subblock, the BDOF process can be skipped. When a sum of absolute difference (SAD) between the initial L0 and L1 prediction samples is smaller than a threshold, the BDOF process may not be applied to the subblock. The threshold can be set equal to (8*W* (H>>1), where W can indicate the width of the subblock, and H can indicate the height of the subblock. To avoid the additional complexity of a SAD calculation, the SAD between the initial L0 and L1 prediction samples calculated in DMVR process can be reused in the BDOF process.

If BCW is enabled for a current block, i.e., the BCW weight index indicates unequal weight, then bi-directional optical flow can be disabled. Similarly, if WP is enabled for the current block, i.e., a luma weight flag (e.g., luma_weight_lx_flag) is 1 for either of the two reference pictures, then BDOF may also be also disabled. When a CU is coded with symmetric MVD mode or CIIP mode, BDOF may also be disabled.

In order to increase the accuracy of the MVs of the merge mode, a bilateral-matching (BM)-based decoder side motion vector refinement can be applied, such as in VVC. In a bi-prediction operation, a refined MV can be searched around initial MVs in a reference picture list L0 and a reference picture list L1. The BM method can calculate a distortion between two candidate blocks in the reference picture list L0 and list L1.

Figure 18:
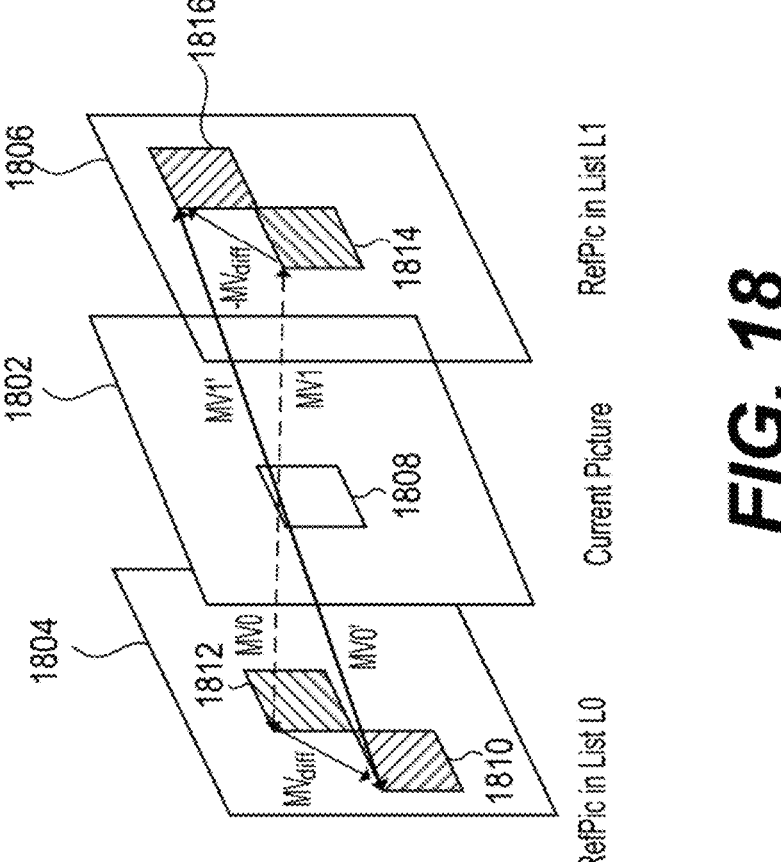
FIG. 18 shows an exemplary schematic view of a decoder side motion vector refinement.

FIG. 18 shows an exemplary schematic view of a BM-based decoder side motion vector refinement. As show in FIG. 18, a current picture (1802) can include a current block (1808). The current picture can include a reference picture list L0 (1804) and a reference picture list L1 (1806). The current block (1808) can include an initial reference block (1812) in the reference picture list L0 (1804) according to an initial motion vector MV0 and an initial reference block (1814) in the reference picture list L1 (1806) according to an initial motion vector MV1. A searching process can be performed around the initial MV0 in the reference picture list L0 (1804) and the initial MV1 in the reference picture list L1 (1806). For example, a first candidate reference block (1810) can be identified in the reference picture list L0 (1804) and a first candidate reference block (1816) can be identified in the reference picture list L1 (1806). A SAD between candidate reference blocks (e.g., (1810) and (1816)) based on each MV candidate (e.g., MV0' and MV1') around the initial MV (e.g., MV0 and MV1) can be calculated. A MV candidate with the lowest SAD can become the refined MV and used to generate a bi-predicted signal to predict the current block (1808).

The application of DMVR can be restricted and may only be applied for CUs which are coded based on modes and features, such as in VVC, as follows:

(1) CU level merge mode with bi-prediction MV,
(2) One reference picture is in the past and another reference picture is in the future with respect to the current picture,
(3) The distances (e.g., POC difference) from two reference pictures to the current picture are the same,
(4) Both reference pictures are short-term reference pictures,
(5) CU has more than 64 luma samples,
(6) Both CU height and CU width are larger than or equal to 8 luma samples,
(7) BCW weight index indicates equal weight,
(8) WP is not enabled for the current block, and
(9) CIIP mode is not used for the current block.

The refined MV derived by the DMVR process can be used to generate inter prediction samples and be used in temporal motion vector prediction for future pictures coding. While the original MV can be used in the deblocking process and be used in spatial motion vector prediction for future CU coding.

In DVMR, search points can surround the initial MV and the MV offset can obey a MV difference mirroring rule. In other words, any points that are checked by DMVR, denoted by a candidate MV pair (MV0, MV1), can obey the MV difference mirroring rule that is shown in equations (35) and (36):

$$MV0'=MV0+MV\_offset \qquad \text{Eq. (35)}$$

$$MV1'=MV1-MV\_offset \qquad \text{Eq. (36)}$$

Where MV_offset can represent a refinement offset between the initial MV and the refined MV in one of the reference pictures. The refinement search range can be two integer luma samples from the initial MV. The searching can include an integer sample offset search stage and a fractional sample refinement stage.

For example, a 25 points full search can be applied for integer sample offset searching. The SAD of the initial MV pair can first be calculated. If the SAD of the initial MV pair is smaller than a threshold, the integer sample stage of DMVR can be terminated. Otherwise SADs of the remaining 24 points can be calculated and checked in a scanning order, such as a raster scanning order. The point with the smallest SAD can be selected as an output of integer sample offset searching stage. To reduce the penalty of the uncertainty of DMVR refinement, the original MV during the DMVR process can have a priority to be selected. The SAD between the reference blocks referred by the initial MV candidates can be decreased by ¼ of the SAD value.

The integer sample search can be followed by fractional sample refinement. To save the calculational complexity, the fractional sample refinement can be derived by using a parametric error surface equation, instead of an additional search with SAD comparison. The fractional sample refinement can be conditionally invoked based on the output of the integer sample search stage. When the integer sample search stage is terminated with a center having the smallest SAD in either the first iteration search or the second iteration search, the fractional sample refinement can further be applied.

In a parametric error surface-based sub-pixel offsets estimation, the center position cost and the costs at four neighboring positions from the center can be used to fit a 2-D parabolic error surface equation based on equation (37):

$$E(x,y)=A(x-x_{min})^2+B(y-y_{min})^2+C \qquad \text{Eq. (37)}$$

where $(x_{min}, y_{min})$ can correspond to a fractional position with the least cost and C can correspond to a minimum cost value. By solving the equation (37) using the cost value of the five search points, the $(x_{min}, y_{min})$ can be computed in equations (38) and (39):

$$x_{min}=(E(-1,0)-E(1,0))/(2(E(-1,0)+E(1,0)-2E(0,0))) \qquad \text{Eq. (38)}$$

$$y_{min}=(E(0,-1)-E(0,1))/(2((E(0,-1)+E(0,1)-2E(0,0))) \qquad \text{Eq. (39)}$$

The value of $x_{min}$ and $y_{min}$ can be automatically constrained to be between −8 and 8 since all cost values are positive and the smallest value is E(0,0). The constraints of the value of $x_{min}$ and $y_{min}$ can correspond to a half pel (or pixel) offset with ¹⁄₁₆th-pel MV accuracy in VVC. The computed fractional $(x_{min}, y_{min})$ can be added to the integer distance refinement MV to get the sub-pixel accurate refinement delta MV.

Bilinear-interpolation and sample padding can be applied, such as in VVC. A resolution of MVs can be ¹⁄₁₆ luma samples, for example. Samples at a fractional position can be interpolated using an 8-tap interpolation filter. In DMVR, search points can surround an initial fractional-pel MV with an integer sample offset, therefore the samples of the fractional position need to be interpolated for DMVR search process. To reduce the calculation complexity, a bi-linear interpolation filter can be used to generate the fractional samples for the searching process in DMVR. In another important effect, by using the bi-linear filter with a 2-sample search range, the DVMR does not access more reference samples compared to a normal motion compensation process. After the refined MV is attained with a DMVR search process, the normal 8-tap interpolation filter can be applied to generate a final prediction. In order not to access more reference samples compared to a normal MC process, the samples, which may not be needed for the interpolation process based on the original MV but may be needed for the interpolation process based on the refined MV, can be padded from samples that are available.

When a width and/or a height of a CU is larger than 16 luma samples, the CU can be further split into subblocks with a width and/or a height equal to 16 luma samples. A maximum unit size for DMVR searching process can be limit to 16×16.

In an embodiment, a merge with motion vector difference (MMVD) mode is used, such as in VVC, where implicitly derived motion information can be used to predict samples of a CU (e.g., a current CU). MMVD mode is used for either skip or merge modes with a motion vector expression method. A MMVD merge flag can be signaled to specify whether the MMVD mode is used for the CU, for example, after signaling a skip flag or a merge flag.

In some examples, MMVD re-uses merge candidate. Among the merge candidates, a candidate can be selected, and is further expanded by the motion vector expression method. MMVD provides motion vector expression with simplified signaling. In some examples, the motion vector expression method includes starting point, motion magnitude, and motion direction.

In some examples (e.g., VVC), MMVD technique can use a merge candidate list to select the candidate for the starting point. However, in an example, only candidates which are default merge type (MRG_TYPE_DEFAULT N) are considered for MMVD's expansion.

In some examples, a base candidate index is used to define the starting point. The base candidate index indicates the best candidate among candidates in the list as shown in Table 1. For example, the list is a merge candidate list with motion vector predictors (MVP). The base candidate index can indicate the best candidate in the merge candidate list.

TABLE 1

| A example of a base candidate index (IDX) | | | | |
|---|---|---|---|---|
| Base candidate IDX | 0 | 1 | 2 | 3 |
| N$^{th}$ MVP | | 1$^{st}$ MVP | 2$^{nd}$ MVP | 3$^{rd}$ MVP  4$^{th}$ MVP |

It is noted that in an example, the number of base candidate is equal to 1, then base candidate IDX is not signaled.

In the MMVD mode, after a merge candidate (also referred to as an MV basis or an MV starting point) is selected, the merge candidate can be refined by additional information, such as signaled MVD information. The additional information can include an index (such as a distance index, e.g., mmvd_distance_idx[x0][y0] used to specify a motion magnitude and an index (such as a direction index, e.g., mmvd_direction_idx[x0][y0]) used to indicate a motion direction. In the MMVD mode, one of the first two candidates in the merge list can be selected as an MV basis. For example, a merge candidate flag (e.g., mmvd_cand_flag[x0][y0]) indicates the one of the first two candidates in the merge list. The merge candidate flag can be signaled to indicate (e.g., specify) which one of the first two candidates is selected. The additional information can indicate a MVD (or a motion offset) to the MV basis. For example, the motion magnitude indicates a magnitude of the MVD, the motion direction indicates a direction of the MVD.

Figure 19:
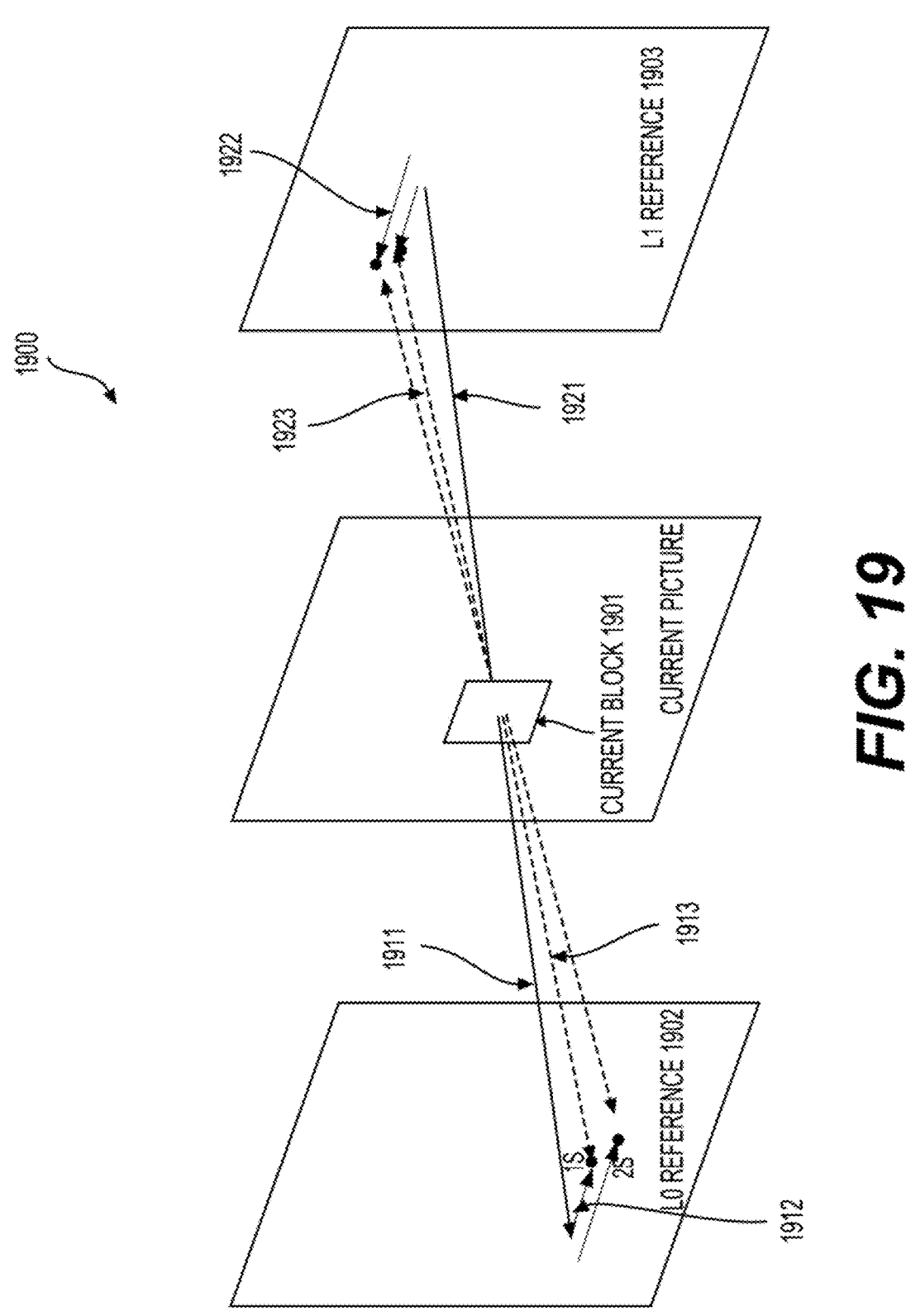
FIG. 19 shows an example of a search process in an example.

In an example, the merge candidate selected from the merge candidate list is used to provide the starting point or the MV starting point at a reference picture. A motion vector of the current block can be expressed with the starting point and a motion offset (or MVD) including a motion magnitude and a motion direction with respect to the starting point. At an encoder side, selection of the merge candidate and determination of the motion offset can be based on a search process (an evaluation process), such as shown in FIG. 19. At a decoder side, the selected merge candidate and the motion offset can be determined based on signaling from the encoder side.

Figure 20:
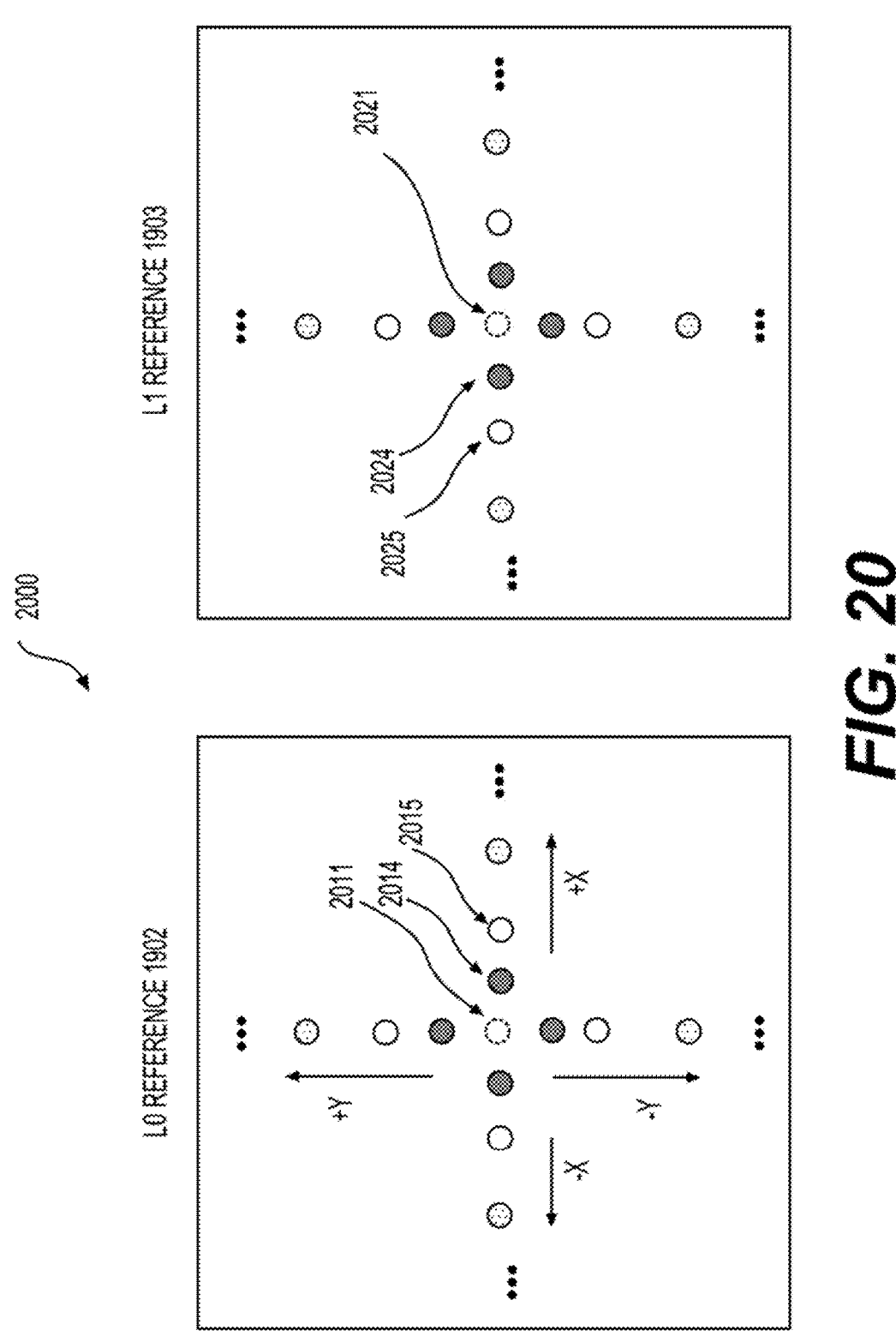
FIG. 20 shows examples of search points in an example.

FIG. 19 shows an example of a search process (1900) in a MMVD mode. FIG. 20 shows examples of search points in a MMVD mode. In some examples, a subset or an entire set of the search points in FIG. 20 are used in the search process (1900) in FIG. 19. By performing the search process (1900), for example, at the encoder side, the additional information including the merge candidate flag (e.g., mmvd_cand_flag[x0][y0]), the distance index (e.g., mmvd_distance_idx[x0][y0]), and the direction index (e.g., mmvd_direction_idx[x0][y0]) can be determined for a current block (1901) in a current picture (or a current frame).

A first motion vector (1911) and a second motion vector (1921) belonging to a first merge candidate are shown. The first motion vector (1911) and the second motion vector (1921) are MV starting points used in the search process (1900). The first merge candidate can be a merge candidate on a merge candidate list constructed for the current block (1901). The first and second motion vectors (1911) and (1921) can be associated with two reference pictures (1902) and (1903) in reference picture lists L0 and L1, respectively. Referring to FIGS. 19-20, the first and second motion vectors (1911) and (1921) can point to two starting points (2011) and (2021) in the reference pictures (1902) and (1903), respectively, as shown in FIG. 20.

Referring to FIG. 20, the two starting points (2011) and (2021) in FIG. 20 can be determined at the reference pictures (1902) and (1903). In an example, based on the starting points (2011) and (2021), multiple predefined points extending from the starting points (2011) and (2021) in vertical directions (represented by +Y, or −Y) or horizontal directions (represented by +X and −X) in the reference pictures (1902) and (1903) can be evaluated. In one example, a pair of points mirroring each other with respect to the respective starting point (2011) or (2021), such as the pair of points (2014) and (2024) (e.g., indicated by a shift of 1S in FIG. 19), or the pair of points (2015) and (2025) (e.g., indicated by a shift of 2S in FIG. 19), can be used to determine a pair of motion vectors (e.g., MVs (1913) and (1923) in FIG. 19) which may form a motion vector predictor candidate for the current block (1901). The motion vector predictor candidates (e.g., MVs (1913) and (1923) in FIG. 19) determined based on the predefined points surrounding the starting points (2011) or (2021) can be evaluated.

The distance index (e.g., mmvd_distance_idx[x0][y0]) can specify motion magnitude information and indicate a pre-defined offset (e.g., 1S or 2S in FIG. 19) from the starting point that is indicated by the merge candidate flag. It is noted that the predefined offset is also referred to as MMVD step in an example.

Referring to FIG. 19, an offset (e.g., a MVD (1912)) or a MVD (1922)) can be applied (e.g., added) to a horizontal component or a vertical component of the starting MV (e.g., the MV (1911) or (1921)). An exemplary relationship of the distance index (IDX) and the pre-defined offset is specified in Table 2. When a full-pel MMVD is off, for example, a full-pel MMVD flag (e.g., slice_fpel_mmvd_enabled_flag) is equal to 0, a range of MMVD pre-defined offsets can be from ¼ luma samples to 32 luma samples. When the full-pel MMVD is off, the pre-defined offset can have a non-integer value, such as a fraction of a luma sample (e.g., ¼ pixel or ½ pixel). When the full-pel MMVD is on, for example, the full-pel MMVD flag (e.g., slice_fpel_mmvd_enabled_flag) is equal to 1, the range of MMVD pre-defined offsets can be from 1 luma sample to 128 luma samples. In an example, when the full-pel MMVD is on, the pre-defined offset only has an integer value, such as one or more luma samples.

TABLE 2

An exemplary relationship of a distance index and
an offset (e.g., a pre-defined offset)

| Distance IDX | 0 | 1 | 2 | 3 | 4 | 5 | 6 | 7 |
|---|---|---|---|---|---|---|---|---|
| Offset (in unit of luma sample) Full-pel MMVD off | 1/4 | 1/2 | 1 | 2 | 4 | 8 | 16 | 32 |
| Offset (in unit of luma sample) Full-pel MMVD on | 1 | 2 | 4 | 8 | 16 | 32 | 64 | 128 |

The direction index can represent a direction (or a motion direction) of the MVD relative to the starting point. In an example, the direction index represents one of the four directions shown in Table 3. The meaning of MVD sign(s) in Table 3 can vary according to information of starting MV(s). In an example, when the starting MV is a uni-prediction MV or the starting MVs are bi-prediction MVs with both reference lists point to a same side of the current picture (e.g., POCs of two reference pictures are both larger than a POC of the current picture or the POCs of the two reference pictures are both smaller than the POC of the current picture), the MVD sign(s) in Table 3 specifies the sign of the MV offset (or the MVD) that is added to the starting MV.

When the starting MVs are the bi-prediction MVs with the two MVs pointing to different sides of the current picture (e.g., the POC of one reference picture is larger than the POC of the current picture, and the POC of the other reference picture is smaller than the POC of the current picture), the MVD sign in Table 3 specifies the sign of the MV offset (or the MVD) added to the list0 MV component of the starting MV and the MVD sign for the list1 MV has an opposite value. Referring to FIG. 19, the starting MVs (1911) and (1921) are the bi-prediction MVs with the two MVs (1911) and (1921) point to different sides of the current picture. The POC of the L1 reference picture (1903) is larger than the POC of the current picture, and the POC of the L0 reference picture (1902) is smaller than the POC of the current picture. The MVD sign (e.g., the sign "+" for the x-axis) indicated by the direction index (e.g., 00) in Table 2 specifies the sign (e.g., the sign "+" for the x-axis) of the MVD (e.g., the MVD (1912)) added to the list0 MV component of the starting MV (e.g., (1911)) and the MVD sign of the MVD (1922) for the list1 MV component of the starting MV (e.g., (1921)) has an opposite value, such as a sign "–" that is opposite to the sign "+" of the MVD (1912).

Referring to Table 3, the direction index 00 indicates a positive direction in the x-axis, the direction index 01 indicates a negative direction in the x-axis, the direction index 10 indicates a positive direction in the y-axis, and the direction index 11 indicates a negative direction in the y-axis.

TABLE 3

An exemplary relationship between a sign
of an MV offset and a direction index

| Direction IDX | 00 | 01 | 10 | 11 |
|---|---|---|---|---|
| x-axis | + | – | N/A | N/A |
| y-axis | N/A | N/A | + | – |

A syntax element mmvd_merge_flag[x0][y0] can be used to represent the MMVD merge flag of the current CU. In an example, the MMVD merge flag (e.g., mmvd_merge_flag [x0][y0]) equal to 1 specifies that the MMVD mode is used to generate the inter prediction parameters of the current CU. The MMVD merge flag (e.g., mmvd_merge_flag[x0][y0]) equal to 0 specifies that the MMVD mode is not used to generate the inter prediction parameters. The array indices x0 and y0 can specify a location (x0, y0) of a top-left luma sample of the considered coding block (e.g., the current CB) relative to a top-left luma sample of the picture (e.g., the current picture).

When the MMVD merge flag (e.g., mmvd_merge_flag [x0][y0]) is not present for the current CU, the MMVD merge flag (e.g., mmvd_merge_flag[x0][y0]) can be inferred to be equal to 0 for the current CU.

In some examples, such as in VVC specification, a single context is used to signal the MMVD merge flag (e.g., mmvd_merge_flag). For example, the single context is used to code (e.g., encode and/or decode) the MMVD merge flag in a context-adaptive binary arithmetic coding (CABAC).

A syntax element mmvd_cand_flag[x0][y0] can represent the merge candidate flag. In an example, the merge candidate flag (e.g., mmvd_cand_flag[x0][y0]) specifies whether the first (0) or the second (1) candidate in the merging candidate list is used with the MVD derived from the distance index (e.g., mmvd_distance_idx[x0][y0]) and the direction index (e.g., mmvd_direction_idx[x0][y0]). The array indices x0 and y0 can specify the location (x0, y0) of the top-left luma sample of the considered coding block (e.g., the current CB) relative to the top-left luma sample of the picture (e.g., the current picture).

When the merge candidate flag (e.g., mmvd_cand_flag [x0][y0]) is not present, the merge candidate flag (e.g., mmvd_cand_flag[x0][y0]) can be inferred to be equal to 0.

A syntax element mmvd_distance_idx[x0][y0] can represent the distance index. In an example, the distance index (e.g., mmvd_distance_idx[x0][y0]) specifies the index used to derive MmvdDistance[x0][y0], such as specified in Table 4. The array indices x0 and y0 can specify the location (x0, y0) of the top-left luma sample of the considered coding block (e.g., the current CB) relative to the top-left luma sample of the picture (e.g., the current picture).

TABLE 4

| mmvd_distance_idx[ | MmvdDistance[ x0 ][ y0 ] | |
| --- | --- | --- |
| An exemplary relationship between a MmvdDistance[ x0 ][ y0 ] and a mmvd_distance_idx[ x0 ][ y0 ] | | |
| x0 ][ y0 ] | slice_fpel_mmvd_enabled_flag = = 0 | slice_fpel_mmvd_enabled_flag = = 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

The first column in Table 4 indicates the distance index (e.g., mmvd_distance_idx[x0][y0]). The second column in Table 4 indicates the motion magnitude (e.g., the MmvdDistance[x0][y0]) when the full-pel MMVD is off, for example, the full-pel MMVD flag (e.g., slice_fpel_mmvd_enabled_flag) is equal to 0. The third column in Table 4 indicates the motion magnitude (e.g., the MmvdDistance [x0][y0]) when the full-pel MMVD is on, for example, the full-pel MMVD flag (e.g., slice_fpel_mmvd_enabled_flag) is equal to 1.

In an example, the units of the second column and the third column in Table 4 are ¼ luma samples. Referring to the first row of Table 4, when the distance index (e.g., mmvd_distance_idx[x0][y0]) is 0, the motion magnitude (e.g., the MmvdDistance[x0][y0]) is 1 when the full-pel MMVD is off (e.g., slice_fpel_mmvd_enabled_flag being 0). The motion magnitude (e.g., the MmvdDistance[x0][y0]) is 1×¼ luma samples or ¼ luma samples. When the distance index (e.g., mmvd_distance_idx[x0][y0]) is 0, the motion magnitude (e.g., the MmvdDistance[x0][y0]) is 4 when the full-pel MMVD is on (e.g., slice_fpel_mmvd_enabled_flag being 1). The motion magnitude (e.g., the MmvdDistance [x0][y0]) is 4×¼ luma samples or 1 luma sample.

In an example, the second column (in units of ¼ luma samples) in Table 4 corresponds to the second row (in units of a luma sample) in Table 1, and the third column (in units of ¼ luma samples) in Table 4 corresponds to the third row (in units of a luma sample) in Table 2.

A syntax element mmvd_direction_idx[x0][y0] can represent the direction index. In an example, the direction index (e.g., mmvd_direction_idx[x0][y0]) specifies the index used to derive the motion direction (e.g., MmvdSign[x0][y0]) as specified in Table 5. The array indices x0 and y0 specify the location (x0, y0) of the top-left luma sample of the considered coding block (e.g., the current CB) relative to the top-left luma sample of the picture (e.g., the current picture). The first column in Table 4 indicates the direction index (e.g., mmvd_distance_idx[x0][y0]). The second column in Table 5 indicates a first sign (e.g., MmvdSign[x0][y0][0]) of a first component (e.g., MVD_x or MmvdOffset[x0][y0][0]) of the MVD. The third column in Table 5 indicates a second sign (e.g., MmvdSign[x0][y0][1]) of a second component (e.g., MVD_y or MmvdOffset[x0][y0][1]) of the MVD.

TABLE 5

| An exemplary relationship between MmvdSign[ x0 ][ y0 ] and mmvd_direction_idx[ x0 ][ y0 ] | | |
| --- | --- | --- |
| mmvd_direction_idx[ x0 ][ y0 ] | MmvdSign[ x0 ][ y0 ][0] | MmvdSign[ x0 ][ y0 ][1] |
| 0 | +1 | 0 |
| 1 | −1 | 0 |
| 2 | 0 | +1 |
| 3 | 0 | −1 |

The first component (e.g., MmvdOffset[x0][y0][0]) and the second component (e.g., MmvdOffset[x0][y0][1]) of the MVD or the offset MmvdOffset[x0][y0] can be derived as follows:

$$MmvdOffset[x0][y0][0]=(MmvdDistance[x0][y0]<<2)\times MmvdSign[x0][y0][0] \qquad (Eq\ 40)$$

$$MmvdOffset[x0][y0][1]=(MmvdDistance[x0][y0]<<2)\times MmvdSign[x0][y0][1] \qquad (Eq.\ 41)$$

In an example, the distance index (e.g., mmvd_distance_idx[x0][y0]) is 3, and the direction index (e.g., mmvd_distance_idx[x0][y0]) is 2. Based on Table 5 and the direction index (e.g., mmvd_direction_idx[x0][y0]) being 2, the first sign (e.g., MmvdSign[x0][y0][0]) of the first component (e.g., MVD_x or MmvdOffset[x0][y0][0]) of the MVD is 0, and the second sign (e.g., MmvdSign[x0][y0][1]) of the second component (e.g., MVD_y or MmvdOffset[x0][y0][1]) of the MVD is "+1". In this example, the MVD is along the positive vertical direction (+y) and has no horizontal component.

When the full-pel MMVD flag (e.g., slice_fpel_mmvd_enabled_flag) is equal to 0 and the full-pel MMVD is off, based on Table 4 and the distance index (e.g., mmvd_distance_idx[x0][y0]) being 3, the motion magnitude indicated by MmvdDistance[x0][y0] is 8. Based on Eqs. 10-11, the first component (e.g., MmvdOffset[x0][y0][0]) of the MVD is (8<<2)×0=0, and the second component (e.g., MmvdOffset[x0][y0][1]) of the MVD is (8<<2)×(+1)=2 (luma samples).

When the full-pel MMVD flag (e.g., slice_fpel_mmvd_enabled_flag) is equal to 1 and the full-pel MMVD is on, based on Table 4 and the distance index (e.g., mmvd_distance_idx[x0][y0]) being 3, the motion magnitude indicated by MmvdDistance[x0][y0] is 32. Based on Eq. (40) and Eq. (41), the first component (e.g., MmvdOffset[x0][y0][0]) of the MVD is (32<<2)×0=0, and the second component (e.g., MmvdOffset[x0][y0][1]) of the MVD is (32<<2)×(+1)=8 (luma samples).

According to an aspect of the disclosure, affine merge with motion vector difference (affine MMVD) can be used in video coding. The affine MMVD selects an available affine merge candidate from the sub-block based merge list as a base predictor. The affine MMVD applies a motion vector offset to each control point's motion vector value from the base predictor. In an example, when no affine merge candidate is available, the affine MMVD will not be used. In some examples, a distance index and an offset direction index can be subsequently signaled.

In some examples, the distance index is signaled to indicate which distance offset to use from an offset table, such as shown in Table 6:

TABLE 6

| An Example of Offset Table | | | | | |
|---|---|---|---|---|---|
| Distance IDX | 0 | 1 | 2 | 3 | 4 |
| Distance-offset | ½-pel | 1-pel | 2-pel | 4-pel | 8-pel |

In some examples, the direction index can represent four directions as shown in Table 7, where only x or y direction may have an MV difference, but not in both directions.

TABLE 7

| An Example Of Direction Table | | | | |
|---|---|---|---|---|
| Offset Direction IDX | 00 | 01 | 10 | 11 |
| x-dir-factor | +1 | −1 | 0 | 0 |
| y-dir-factor | 0 | 0 | +1 | −1 |

In some examples, the inter prediction is Uni-prediction, the signaled distance offset is applied on the offset direction for each control point predictor to generate the results that include the MV value of each control point.

In some examples, the inter prediction is bi-prediction, the signaled distance offset can be applied on the signaled offset direction for control point predictor's L0 motion vector, and the offset to be applied on L1 MV can be applied on a mirrored or a scaled basis as in following specified example.

In a specific example, the inter prediction is bi-prediction, the signaled distance offset is applied on the signaled offset direction for control point predictor's L0 motion vector. For L1 CPMV, the offset is applied on a mirrored basis, which means the same amount of distance offset with the opposite direction is applied.

In another specific example, a POC distance based offset mirroring method is used for Bi-prediction. When the base candidate is bi-predicted, the offset applied to L0 is as signaled, and the offset on L1 depends on the temporal position of the reference pictures on the list L0 and list L1. For example, when both reference pictures are on the same temporal side of the current picture, the same distance offset and same offset directions are applied for CPMVs of both L0 and L1. In another example, when the two reference pictures are on different sides of the current picture, the CPMVs of L1 can have the distance offset applied on the opposite offset direction.

In another specific example, a POC distance based offset scaling method is used for Bi-prediction. When the base candidate is bi-predicted, the offset applied to L0 is as signaled, and the offset on L1 can be scaled based on the temporal distance of reference pictures on list 0 and list 1.

In some examples, the distance offset value range is extended. For example, 3 sets of distance offset values can be provided, and a set of distance offset values can be adaptively selected based on the picture resolution. In one example, the offset table is selected based on picture resolution. Table 8 shows an example of an extended distance offset table that includes 3 sets of distance offset values respectively associated with different picture resolutions. A set of distance offset values can be selected based on the picture resolution.

TABLE 8

| An Example of Extended Distance-offset Table | | | | | | |
|---|---|---|---|---|---|---|
| Distance IDX | 0 | 1 | 2 | 3 | 4 | Condition |
| Distance-offset 1 | 1/2-pel | 1-pel | 2-pel | 4-pel | 8-pel | Picture Height >= 1080 |
| Distance-offset 2 | 1/8-pel | 1/4-pel | 1/2-pel | 1-pel | 2-pel | 720 <= Picture Height < 1080 |
| Distance-offset 3 | 1/16-pel | 1/8-pel | 1/4-pel | 1/2-pel | 1-pel | Picture Height < 720 |

A template matching (TM) technique can be used in video/image coding. To further improve the compression efficiency of VVC standard, for example, TM can be used to refine an MV. In an example, the TM is used at a decoder side. With the TM mode, an MV can be refined by constructing a template (e.g., a current template) of a block (e.g., a current block) in a current picture and determine the closest matching between the template of the block in the current picture and a plurality of possible templates (e.g., a plurality of possible reference templates) in a reference picture. In an embodiment, the template of the block in the current picture can include left neighboring reconstructed samples of the block and above neighboring reconstructed samples of the block. The TM can be used in video/image coding beyond VVC.

Figure 21:
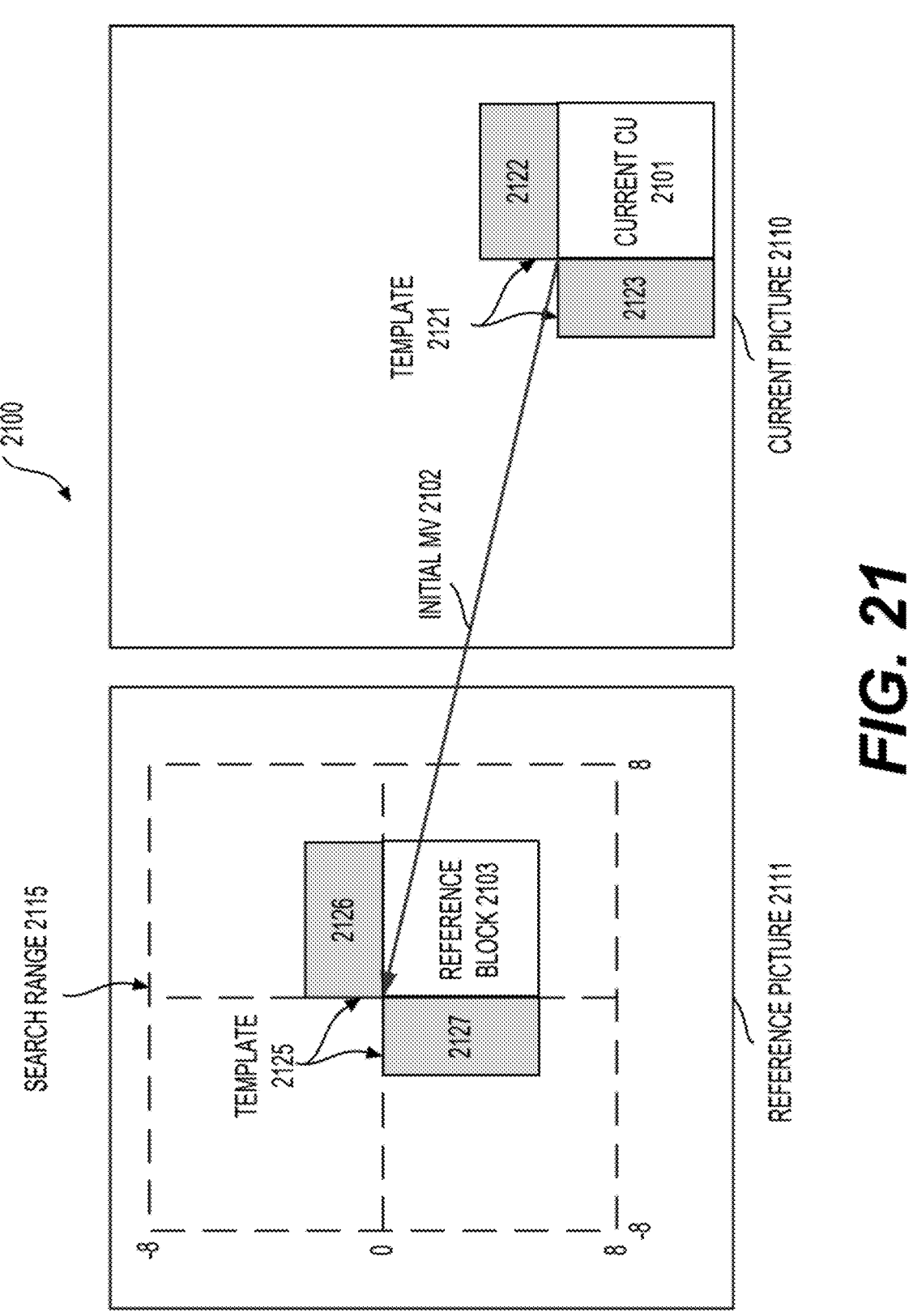
FIG. 21 shows an example of template matching in some examples.

FIG. 21 shows an example of template matching (2100). The TM can be used to derive motion information (e.g., deriving final motion information from initial motion information, such as an initial MV 2102) of a current CU (e.g., a current block) (2101) by determining the closest match between a template (e.g., a current template) (2121) of the current CU (2101) in a current picture (2110) and a template (e.g., a reference template) of a plurality of possible templates (e.g., one of the plurality of possible templates being a template (2125)) in a reference picture (2111). The template (2121) of the current CU (2101) can have any suitable shape and any suitable size.

In an embodiment, the template (2121) of the current CU (2101) includes a top template (2122) and a left template (2123). Each of the top template (2122) and the left template (2123) can have any suitable shape and any suitable size.

The top template (2122) can include samples in one or more top neighboring blocks of the current CU (2101). In an example, the top template (2122) includes four rows of samples in one or more top neighboring blocks of the current CU (2101). The left template (2123) can include samples in one or more left neighboring blocks of the current CU (2101). In an example, the left template (2123) includes four columns of samples in the one or more left neighboring blocks of the current CU (2101).

Each one (e.g., the template (2125)) of the plurality of possible templates in the reference picture (2111) corresponds to the template (2121) in the current picture (2110). In an embodiment, the initial MV (2102) points from the current CU (2101) to a reference block (2103) in the reference picture (2111). Each one (e.g., the template (2125)) of the plurality of possible templates in the reference picture (2111) and the template (2121) in the current picture (2110) can have an identical shape and an identical size. For example, the template (2125) of the reference block (2103) includes a top template (2126) in the reference picture (2111) and a left template (2127) in the reference picture (2111). The top template (2126) can include samples in one or more top neighboring blocks of the reference block (2103). The left template (2127) can include samples in one or more left neighboring blocks of the reference block (2103).

A TM cost can be determined based on a pair of templates, such as the template (e.g., the current template) (2121) and the template (e.g., the reference template) (2125). The TM cost can indicate matching between the template (2121) and the template (2125). An optimized MV (or a final MV) can be determined based on a search around the initial MV (2102) of the current CU (2101) within a search range (2115). The search range (2115) can have any suitable shape and any suitable number of reference samples. In an example, the search range (2115) in the reference picture (2111) includes a [–L, L]-pel range where L is a positive integer, such as 8 (e.g., 8 samples). For example, a difference (e.g., [0, 1]) is determined based on the search range (2115), and an intermediate MV is determined by a summation of the initial MV (2102) and the difference (e.g., [0, 1]). An intermediate reference block and a corresponding template in the reference picture (2111) can be determined based on the intermediate MV. A TM cost can be determined based on the template (2121) and the intermediate template in the reference picture (2111). The TM costs can correspond to the differences (e.g., [0, 0] corresponding to the initial MV (2102), [0, 1], and the like) that are determined based on the search range (2115). In an example, the difference corresponding to the smallest TM cost is selected, and the optimized MV is the summation of the difference corresponding to the smallest TM cost and the initial MV (2102). As described above, the TM can derive the final motion information (e.g., the optimized MV) from the initial motion information (e.g., the initial MV 2102).

In the FIG. 21 example, a better MV can be searched around the initial motion vector of the current CU within a search range, such as [–8pel, +8pel].

Figure 22:
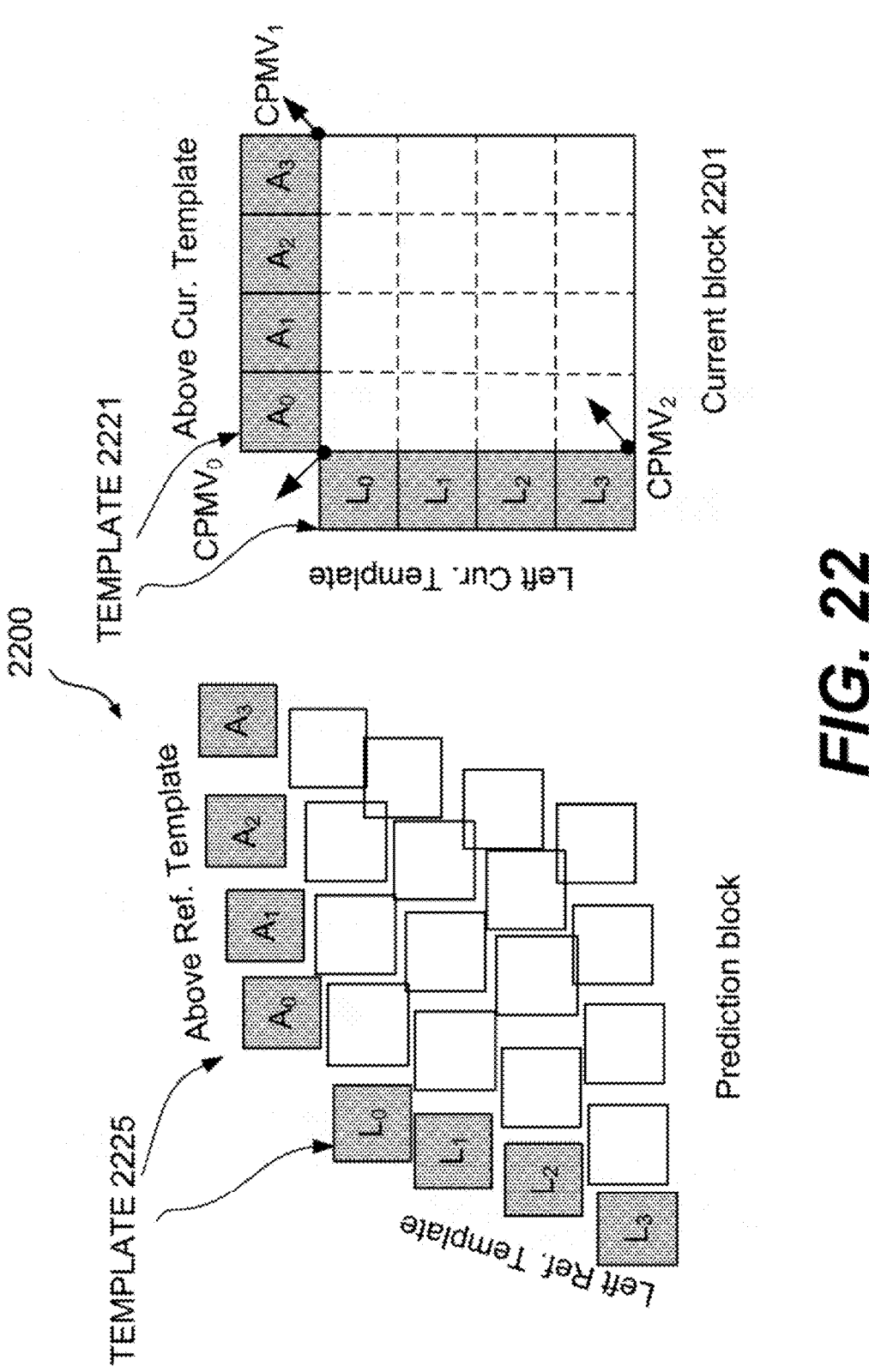
FIG. 22 shows an example of template matching in an affine merge mode in an example.

A TM can be applied in an affine mode, such as the affine AMVP mode, the affine merge mode, and can be referred to as an affine TM. FIG. 22 shows an example of TM (2200), such as in an affine merge mode. A template (2221) of a current block (e.g., a current CU) (2201) can correspond to a template (e.g., the template (2121) in FIG. 21) in a TM applied to a translational motion model. A reference template (2225) of a reference block in a reference picture can include multiple subblock templates (e.g., 4×4 subblocks) that are pointed by control point MV (CPMV)-derived MVs of neighboring subblocks (e.g., $A_0$-$A_3$ and $L_0$-$L_3$ as shown in FIG. 22) at block boundaries.

A search process of the TM that is applied in the affine mode (e.g., the affine merge mode) can start from a CPMV0, while keeping other CPMV(s) (e.g., (i) CPMV1 if a 4-parameter model is used or (ii) CPMV1 and CPMV2 if a 6-parameter model is used) constant. The search can be performed toward a horizontal direction and a vertical direction. In an example, the search is followed by diagonal direction(s) only if a zero vector is not the best difference vector found from the horizontal search and the vertical search. The affine TM can repeat the same search process for the CPMV1. The affine TM can repeat the same search process for CPMV2 if a 6-parameter model is used. Based on the refined CPMVs, the whole search process can restart from the refined CPMV0, if the zero vector is not the best difference vector from the previous iteration and the search process has iterated less than 3 times.

According to an aspect of disclosure, template matching based candidate reordering techniques can be used to reduce signaling overhead. For example, techniques that are referred to as adaptive reordering of merge candidates with template matching (ARMC-TM) can be used.

In some examples, using ARMC-TM, the merge candidates are adaptively reordered with template matching (TM). The ARMC-TM can be applied to regular merge mode, template matching (TM) merge mode, and affine merge mode (excluding the SbTMVP candidate). For the TM merge mode, merge candidates are reordered before the refinement process.

In some examples, using ARMC-TM, after a merge candidate list is constructed, merge candidates are divided into several subgroups. In an example, the subgroup size is set to 5 for regular merge mode and TM merge mode. In another example, the subgroup size is set to 3 for affine merge mode. Merge candidates in each subgroup are reordered ascendingly according to cost values based on template matching. For simplification, merge candidates in the last but not the first subgroup are not reordered in some examples.

The template matching cost of a merge candidate is measured by the sum of absolute differences (SAD) between samples of a template of the current block and the corresponding reference samples to the template (also referred to as reference template in an example). The template comprises a set of reconstructed samples neighboring to the current block. Reference samples of the template are located according to the motion information of the merge candidate.

When a merge candidate utilizes bi-directional prediction, the reference samples of the template of the merge candidate are also generated by bi-prediction.

Figure 23:
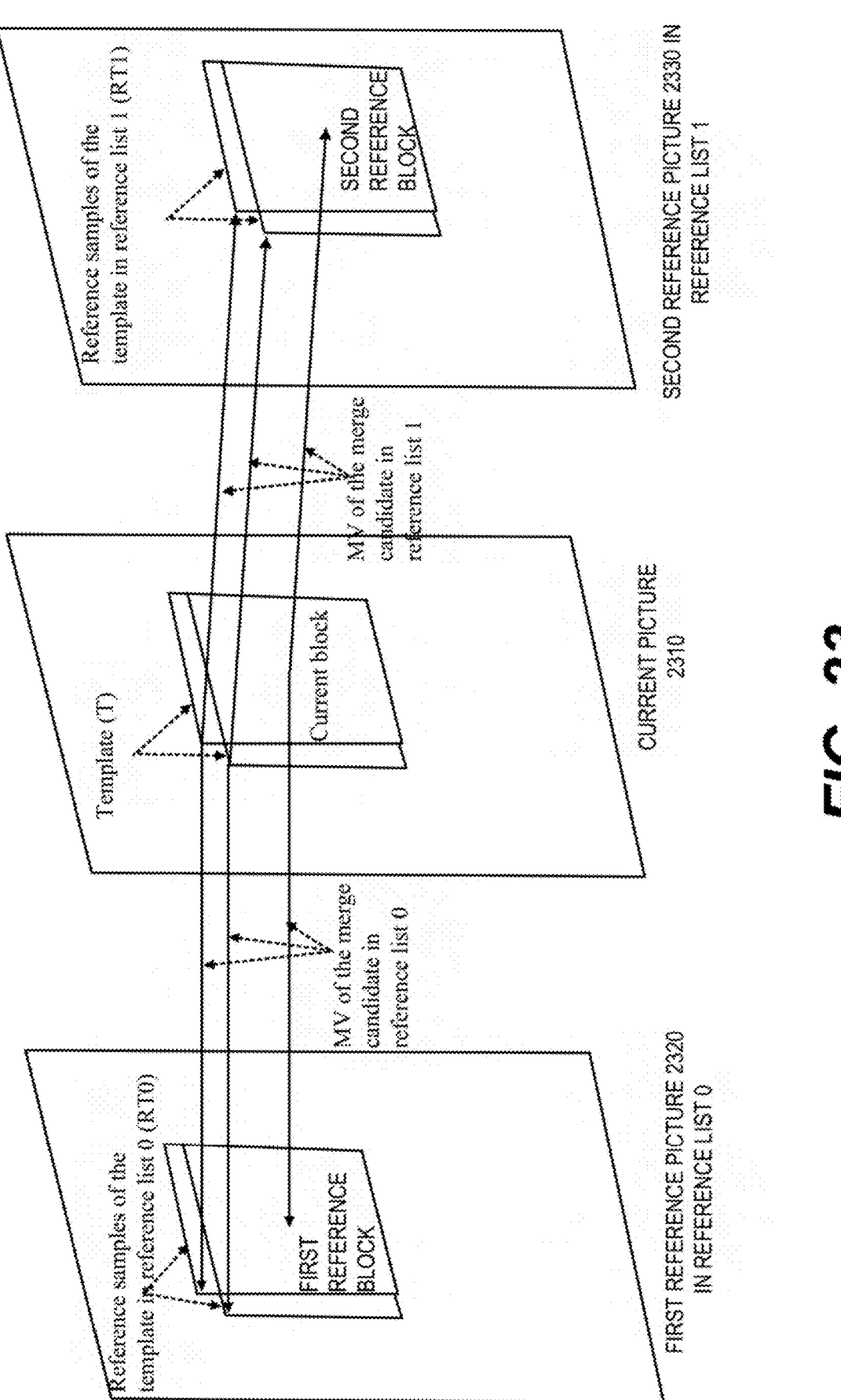
FIG. 23 shows a diagram illustrate reference samples of the template of the current block for a merge candidate of bi-prediction.

FIG. 23 shows a diagram illustrate reference samples of the template of the current block for a merge candidate of bi-prediction. In FIG. 23, the current picture (2310) includes the current block for coding. When a merge candidate is bi-prediction merge candidate, the MV of the merge candidate can point to a first reference block in a reference picture (2320), and a second reference block in a second reference picture (2330). The template of the current block is denoted by (T), and the template includes a set of reconstructed samples neighboring to the current block. A first set of reference samples of the template is in the first reference picture (2320) neighboring to the first reference block, and a second set of reference samples of the template is in the second reference picture (2330) neighboring to the second reference block. In an example, the template matching cost of the merge candidate of bi-prediction is calculated by an addition of a first sum of absolute differences (SAD) between samples of the template of the current block and the first set of reference samples of the template and a second sum of absolute differences (SAD) between samples of the template of the current block and the second set of reference samples of the template.

In some examples, the merge candidates can be subblock-based merge candidates. In an examples, for a subblock-based merge candidate with a subblock size equal to Wsub× Hsub, an above template can include several sub-templates with the size of Wsub×1, and a left template can include several sub-templates with a size of 1×Hsub. Wsub can be a width of the subblock and Hsub can be a height of the subblock.

An exemplary derivation of template and reference samples of the template for the current block with a sub-block-based merge candidate can be shown in FIG. 24. As shown in FIG. 24, a current block (2402) can be included in a current picture (2404). The current block (2402) can include subblocks A-G in a first row and a first column. The current block (2402) can include templates (2406) adjacent to a top side and a left side of the current block (2402). A collocated block (2408) for the current block (2402) is in a reference picture (2410). The collocated block (2408) can include subblocks A-G in a first row and a first column that correspond to the subblocks A-G in the current block (2402). Subblock motion information (e.g., corresponding to affine motion vector) of the subblocks A-G in the first row and the first column of the current block (2402) can be used to derive reference samples of sub-templates (or sub reference templates) of the collocated block (2408). For example, the motion information of the subblocks A, E, F, and G of the current block (2402) can be applied to derive the reference samples of the sub-templates that are positioned adjacent to left sides of the subblocks A, E, F, and G of the collocated block (2408). The sub-templates adjacent to the left sides of the subblocks A, E, F, and G of the collocated block (2408) can form a left reference template of the collocated block (2408). The motion information of the subblocks A, B, C, and D of the current block (2402) can be applied to derive the reference samples of the sub-templates that are positioned adjacent to top sides of the subblocks A, B, C, and D of the collocated block (2408). The sub-templates adjacent to the top sides of the subblocks A, B, C, and D of the collocated block (2408) can further form an above reference template of the collocated block (2408).

In some examples, MV candidate type based ARMC can be used. For example, merge candidates of one single candidate type, e.g., TMVP or non-adjacent MVP (NA-MVP), are reordered based on the ARMC TM cost values. The reordered candidates are then added into the merge candidate list. For example, the TMVP candidate type ARMC can add more TMVP candidates with more temporal positions and different inter prediction directions to perform the reordering and the selection. Moreover, NA-MVP candidate type ARMC extends the non-adjacent MVPs with more spatially non-adjacent positions. The target reference picture of the TMVP candidate can be selected from any one of reference pictures in the list according to a scaling factor. For example, the selected reference picture is the one whose scaling factor is the closest to 1.

According to an aspect of the disclosure, template Matching based candidate reordering can be performed on MMVD and Affine MMVD.

In some examples, MMVD offsets are extended to more positions for MMVD and affine MMVD modes.

Figure 25:
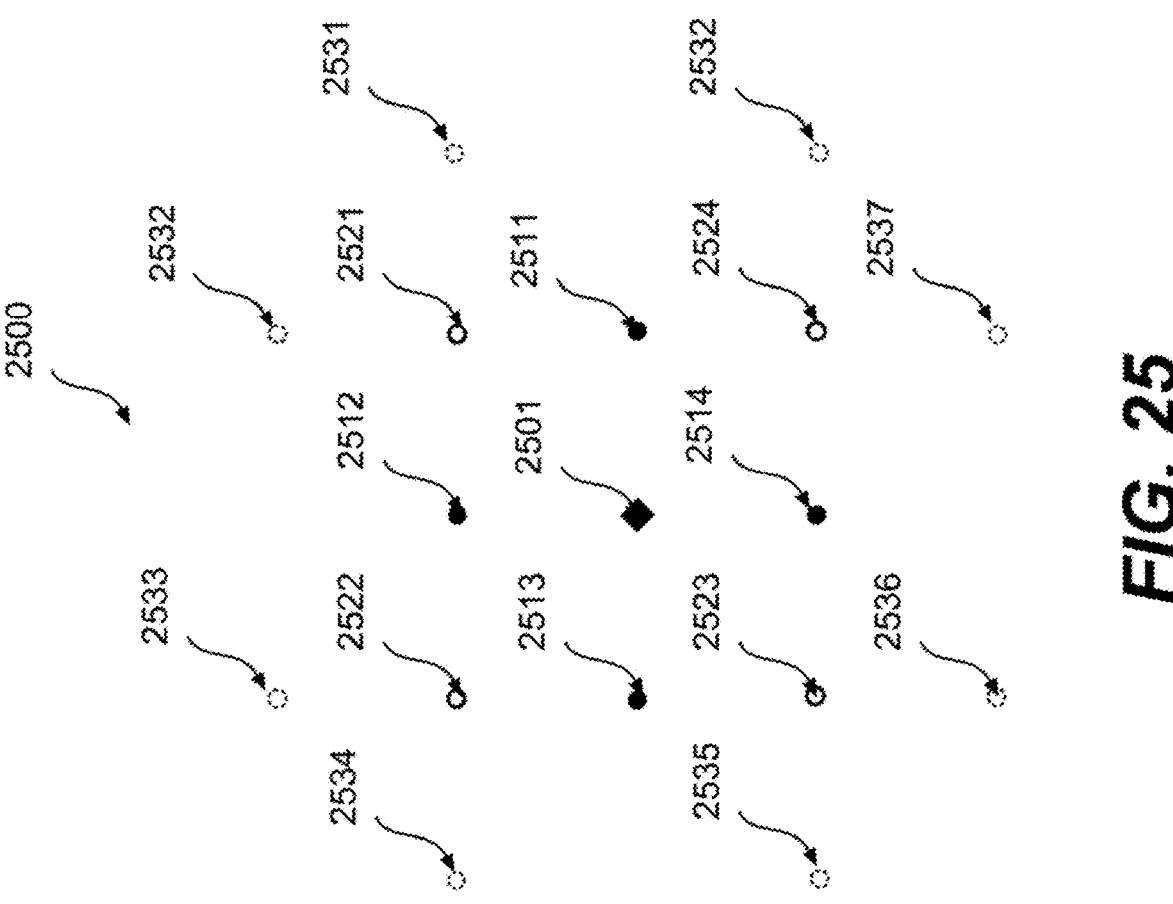
FIG. 25 shows a diagram illustrating refinement directions in some examples.

FIG. 25 shows a diagram illustrating directions in which refinement positions can be added for MMVD. In FIG. 25, additional refinement positions along k×π/8 diagonal angles are added, where k is an integer number. A position (2501) corresponds to a base candidate and can be a starting point, positions (2511)-(2514) are respectively in the directions of 0, π/2, π, and 3π/2. More directions are added. For example, positions (2521)-(2524) are respectively in the directions of π/4, 3Σ/4, and 5Σ/4, and 7π/4; and positions (2531)-(2538) are respectively in the directions of π/8, 3π/8, 5π/8, 7π/8, 9π/8, 11π/8, 13π/8, and 15π/8. Thus, the number of directions is increased from 4 to 16. Further, in an example, each direction can have 6 MMVD refinement positions. The total number of possible MMVD refinement positions is 16×6.

According to an aspect of the disclosure, SAD cost between the current template (e.g., one row above and one column left to the current block) and reference template can be calculated for each refinement position. Based on the SAD costs of the refinement positions, all the possible MMVD refinement positions (16×6) for each base candidate are reordered. Then, a top portion of the refinement positions, such as the top ⅛ refinement positions (e.g., 12), such as with the smallest template SAD costs are kept as available positions, consequently for MMVD index coding. The MMVD index is binarized by the rice code with the parameter equal to 2.

In some examples, refinement positions for affine MMVD can be increased, and template matching based candidate reordering can be applied for affine MMVD reordering. For example, affine MMVD refinement positions are in the directions along k×π/4 diagonal angles, such as in the 8 directions respectively of 0, π/4, π/2, 3π/4, π, 5π/4, 3π/2 and 7π/4. Each direction can have 6 affine MMVD refinement positions. The total number of possible affine MMVD refinement positions is 8×6. In an example, SAD cost between the current template (e.g., one row above and one column left to the current block) and reference template can be calculated for each refinement position. Based on the SAD costs of the refinement positions, all the possible affine MMVD refinement positions (8×6) for each base candidate are reordered. Then, a top portion of the refinement positions, such as the top ½ refinement positions (e.g., 24), such as with the smallest template SAD costs are kept as available positions, consequently for affine MMVD index coding.

In some examples, MVD sign prediction techniques are used. In an example, possible MVD sign combinations (e.g., various combinations of signs in x direction and y direction) are sorted according to the template matching costs of the possible MVD sign combinations and an index corresponding to the true MVD sign combination is derived and context coded. According to the MVD sign prediction techniques, the true MVD sign combination has a high possibility in a front portion of the sorted order. Thus, suitable signaling techniques can be used to signaling the index with low signaling cost.

In an example, at decoder side, the true MVD sign can be derived. For example, the magnitude of MVD components can be parsed, and a context-coded MVD sign prediction index is parsed from the bitstream carrying the video. Further, MV candidates can be formed by creating combinations from possible MVD sign combinations and magnitude of the MVD components and the MV candidates can be added to an MV predictor list. Template matching costs for the MV candidates in the MV predictor list can be calculated. The MV candidates in the MV predictor list can be sorted according to the template matching costs. Then, context-coded MVD sign prediction index is used to pick the true MVD sign combination from the MV predictor list. The MVD sign prediction techniques can be applied to various modes involving MVD, such as inter AMVP, affine AMVP, MMVD and affine MMVD modes.

In some examples, techniques referred to as history-parameter-based affine model inheritance can be used. Specifically, in some examples, a first history-parameter table (HPT) and a second HPT are established.

Figure 26:
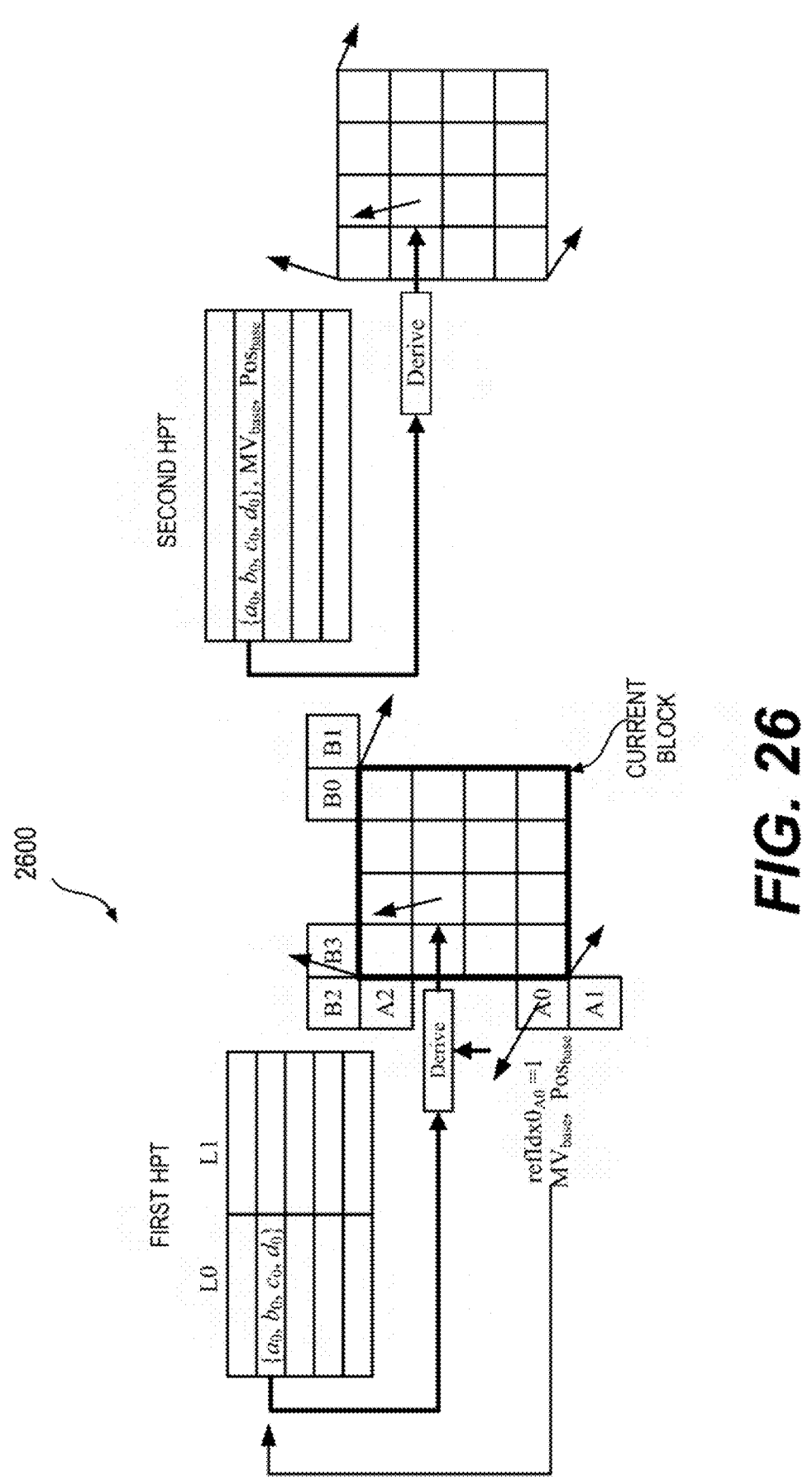
FIG. 26 shows a diagram illustrating a first history-parameter table and a second history-parameter table in some examples.

FIG. 26 shows a diagram (2600) illustrating a first HPT and a second HPT in some examples.

As shown in FIG. 26, an entry of the first HPT stores a set of affine parameters for an affine model, such as a, b, c and d, each of affine parameters is represented by a 16-bit signed integer. Entries in first HPT is categorized by reference list (e.g., reference picture list L0 or reference picture list L1) and reference index. Five reference indices are supported for each reference list in the first HPT. In a formular way, in an example, the category of the first HPT (denoted as HPTCat) is calculated as Eq. (42):

$$HPTCat(RefList, RefIdx) = 5 \times RefList + min(RefIdx, 4) \qquad Eq. (42)$$

wherein RefList represents a reference picture list (0 or 1), and RefIdx represents a reference index.

For each category, at most seven entries can be stored, resulting in 70 entries totally in the first HPT. At the beginning of each CTU row, the number of entries for each category is initialized as zero. After decoding an affine-coded CU with reference list $RefList_{cur}$ and $RefIdx_{cur}$, the affine parameters are utilized to update entries in the category $HPTCat(RefList_{cur}, RefIdx_{cur})$ in a way similar to HMVP table updating.

In some examples, a history-affine-parameter-based candidate (HAPC) is derived from one of the seven neighbouring 4×4 blocks denoted as A0, A1, A2, B0, B1, B2 or B3 in FIG. 26 and a set of affine parameters stored in a corresponding entry in the first HPT. The MV of a neighbouring 4×4 block served as the base MV. In a formulating way, the MV of the current block at position (x, y) is calculated as Eq. (43):

$$\begin{cases} mv^h(x, y) = a(x - x_{base}) + c(y - y_{base}) + mv^h_{base} \\ mv^v(x, y) = b(x - x_{base}) + d(y - y_{base}) + mv^v_{base} \end{cases} \qquad Eq. (43)$$

where $(mv^h_{base}, mv^v_{base})$ represents the MV of the neighboring 4×4 block, $(x_{base}, y_{base})$ represents the center position of the neighboring 4×4 block. (x, y) can be the top-left, top-right and bottom-left corner of the current block to obtain the corner-position MVs (CPMVs) for the current block, or (x, y) can be the center of the current block to obtain a regular MV for the current block.

The second history-parameter table (HPT) with base MV information is also appended. The second HPT can include nine entries, and an entry can include a base MV, a reference index and four affine parameters for each reference list, and a base position. In an example, an additional merge HAPC can be generated from the base MV information and the corresponding affine model (e.g., the affine parameters) stored in an entry of the second HPT.

Further, in some examples, pair-wised affine merge candidates are generated by two affine merge candidates which are history-derived or not history-derived. In an example, a pair-wised affine merge candidates is generated by averaging the CPMVs of existing affine merge candidates in a candidate list.

In some examples, as a response to new HAPCs being introduced, the size of sub-block-based merge candidate list is increased from 5 to 15, which can all be involved in the ARMC process.

In the above description, the HPTs (e.g., the first HPT and the second HPT) are updated online. Besides the HPT updated one line, HPTs stored in the CTU above/above-right to the current CTU can be used by blocks in the current CTU in some examples. After coding/decoding a CTU, the HPTs may be stored in the line buffer for the usage in the next CTU row.

Figure 27:
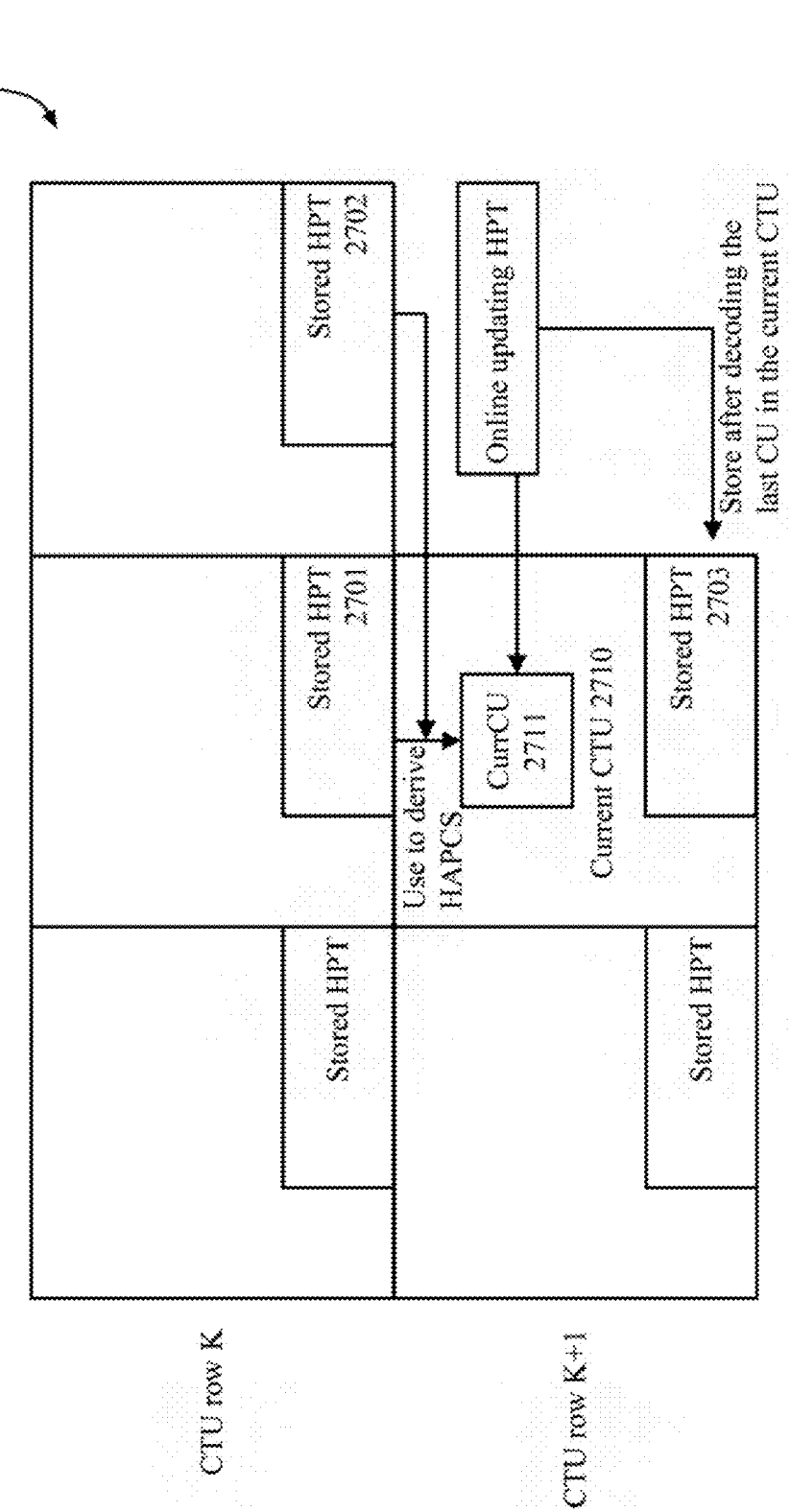
FIG. 27 shows a diagram illustrating history parameter tables stored in line buffer in some examples.

FIG. 27 shows a diagram illustrating history parameter tables stored in line buffer in some examples. In FIG. 27, a picture (2700) is partitioned into CTUs. FIG. 27 shows a CTU row k and a CTU row k+1. The current CTU (2710) is in the CTU row k+1. For the coding of a current block (2711), HPTs (2701) stored in the CTU above the current CTU (2710), and the HPTs (2702) stored in the CTU above-right to the current CTU (2710) can be used by blocks in the current CTU in some examples. The HPTs (e.g., the first HPT and the second HPT) are updated online, and are stored in the line buffer of the current CTU (2710) after the decoding of the last coding block in the current CTU.

According to an aspect of the disclosure, non-adjacent spatial neighbors can be used for affine mode.

In the affine mode with non-adjacent spatial neighbors (NA-AFF), the non-adjacent spatial neighbors can be obtained.

Figures 28A, 28B:
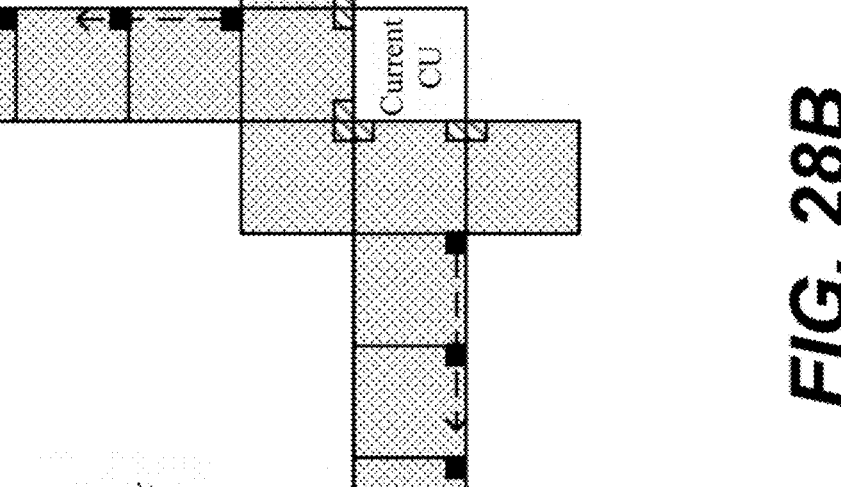
FIGS. 28A-28B illustrate to generate additional inherited/constructed affine merge/AMVP candidates in some examples.

FIGS. 28A-28B show patterns of obtaining non-adjacent spatial neighbors in some examples. Same as the existing non-adjacent regular merge candidates, the distances between non-adjacent spatial neighbors and current CU in the NA-AFF are also defined based on the width and height of current CU.

The motion information of the non-adjacent spatial neighbors is utilized to generate additional inherited and constructed affine merge/AMVP candidates. FIG. 28A illustrates to generate additional inherited affine merge/AMVP candidates, and FIG. 28B illustrates to generate additional constructed affine merge/AMVP candidates.

Specifically, as shown by FIG. 28A, for inherited candidates, the same derivation process of the inherited affine merge/AMVP candidates in the VVC is kept unchanged except that the CPMVs are inherited from non-adjacent spatial neighbors. The non-adjacent spatial neighbors are checked based on their distances to the current block, i.e., from near to far. At a specific distance, only the first available neighbor (that is coded with the affine mode) from each side (e.g., the left and above) of the current block is included for inherited candidate derivation. As indicated by the dash arrows in FIG. 28A, the checking orders of the neighbors on the left and above sides are bottom-to-up and right-to-left, respectively.

For the first type of constructed candidates, as shown by FIG. 28B, the positions of one left and above non-adjacent spatial neighbors are firstly determined independently. After that, the location of the top-left neighbor can be determined accordingly which can enclose a rectangular virtual block together with the left and above non-adjacent neighbors.

Figure 29:
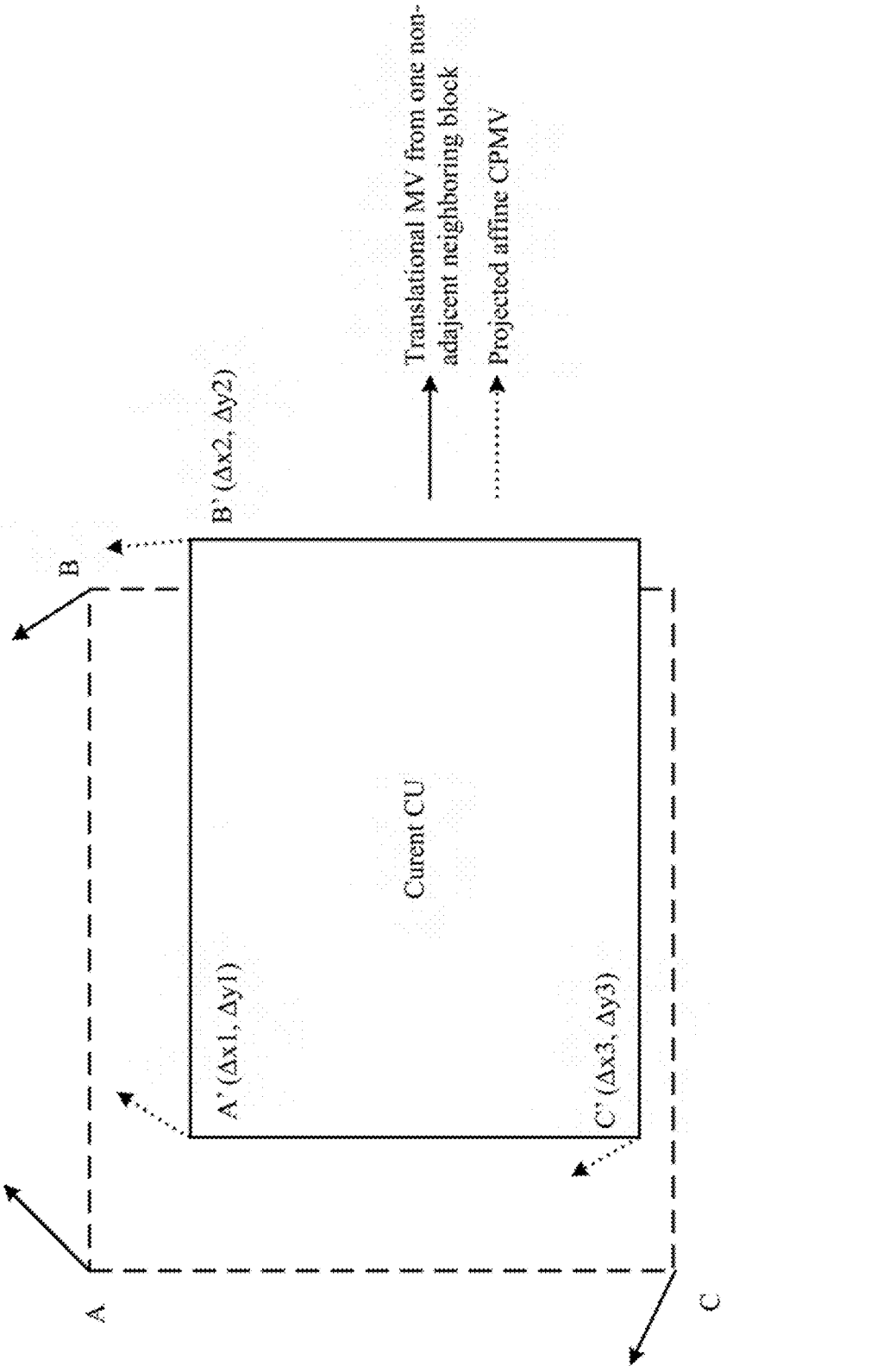
FIG. 29 illustrates to generate constructed affine merge/AMVP candidates from non adjacent neighbors in some examples.

Then, as shown in the FIG. 29, the motion information of the three non-adjacent neighbors is used to form the CPMVs at the top-left (A), top-right (B) and bottom-left (C) of the virtual block, which is then projected to the current CU to generate the corresponding constructed candidates.

In some examples, for the second type of constructed candidates, the derivation process is similar as the construction scheme in history-based affine model inheritance (HAMI). However, instead of using history-based look-up table, the non-translational affine parameters are inherited from the non-adjacent spatial neighbors. Specifically, the second type of affine constructed candidates are generated from the combination of 1) the translational affine parameters of adjacent neighboring 4×4 blocks; and 2) the non-translational affine parameters inherited from the non-adjacent spatial neighbors as defined in FIG. 28A.

In some examples, the NA-AFF candidates are inserted into the existing affine merge candidate list and affine AMVP candidate list according to certain orders.

In an example, in the affine merge mode, the order includes: 1. SbTMVP candidate, if available; 2. inherited from adjacent neighbors; 3. inherited from non-adjacent neighbors; 4. constructed from adjacent neighbors; 5. the second type of constructed affine candidates from non-adjacent neighbors; 6. the first type of constructed affine candidates from non-adjacent neighbors; 7. zero MVs.

In another example, in the affine AMVP mode, the order includes: 1. inherited from adjacent neighbors; 2. constructed from adjacent neighbors; 3. translational MVs from adjacent neighbors; 4. translational MVs from temporal neighbors; 5. inherited from non-adjacent neighbors; 6. the first type of constructed affine candidates from non-adjacent neighbors; 7. zero MVs.

Due to the inclusion of the additional candidates generated by NA-AFF, the size of the affine merge candidate list is increased from 5 to 15. The subgroup size of ARMC for the affine merge mode is increased from 3 to 15.

In some examples (e.g., ECM-5.0 software), NA-AFF is implemented without adding constraints for memory usage.

Some video coding standards, such as HEVC and AVC/H.264, use a fixed motion vector resolution of quarter luma sample. According to an aspect of the disclosure, an optimum trade-off between displacement vector rate and prediction error rate can be chosen to achieve overall rate-distortion optimality. Some video coding standards, such as VVC, allow to select the motion vector resolution at coding block level and, therefore, to trade-off bit rate versus fidelity for the signaling of the motion parameters. Specifically, VVC uses adaptive motion vector resolution (AMVR) when the AMVR mode is enabled. The AMVR mode is signaled at the coding block level if at least one component (e.g., x component and/or y component) of an MVD is not equal to zero. The motion vector predictor is rounded to a given resolution such that the resulting motion vector can fall on a grid of the given resolution.

According to an aspect of the disclosure, in some scenarios for affine coded block, all CPVMs are the same for a reference picture, which makes the affine model for the reference picture to be equivalent to a translational motion model. In an example, in an affine bi-prediction, CPMVs for a first reference picture are the same, CPMVs for a second reference picture are different. In another example, a motion vector predictor for the current block is in affine mode and has multiple control points with different CPMVs, however, when the CPMVs of the motion vector predictor are combined with MVDs, the resulting MVs for the control points of the current block can have the same MV value. In some related affine MVD coding techniques, all control points (2 or 3 depending on 4-parameter or 6-parameter affine type) are MVD coded. In each MVD coding, horizontal and vertical components are coded separately. The related affine MVD coding techniques can have high signaling overhead compared to translational MVD coding.

Some aspects of the disclosure provide techniques to combine an affine motion and a translational motion into an affine merge candidate that is referred to as an affine-transitional merge candidate. In some examples, the affine-transitional merge candidate is a bi-prediction candidate that provides prediction according to two reference pictures (e.g., a first reference picture from the reference picture list L0 and a second reference picture from the reference picture list L1), one motion information of affine uni-prediction for one reference list (e.g. LX, where X is 0 or 1) and one motion information of translational uni-prediction for the other reference list (e.g. L(1−X)) are combined into the affine-transitional merge candidate. In some examples, for an affine-transitional merge candidate, a reference picture that provides prediction according to affine motion information is referred to as affine reference picture, and a reference picture that provides prediction according to the translational motion information is referred to as translational reference picture. In some examples, for an affine-transitional merge candidate, a reference list that provides prediction according to affine motion information is referred to as affine reference list, and a reference list that provides prediction according to the translational motion information is referred to as translational reference list. In an example, for the reference picture using translational motion vector (MV), an affine model with the control point motion vectors (CPMVs) being set to the same MV value can be used.

According to an aspect of the disclosure, for the affine-transitional merge candidate, the derivation of the affine motion information part can be from existing affine merge candidates, such as existing uni-prediction affine merge candidates, existing bi-prediction affine merge candidates and the like, or a combination of existing uni-prediction affine merge candidates and existing bi-prediction affine merge candidates. In an embodiment, the affine motion information of the affine-transitional merge candidate is derived from one or more existing affine merge candidates with uni-prediction with available affine motion information for a reference list that corresponds to the affine reference list of the affine-transitional merge candidate. In another embodiment, the affine motion information of the affine-transitional merge candidate is derived from existing affine merge candidates with bi-prediction, and the affine motion information of the existing merge candidates for a reference list corresponding to the affine reference list of the affine-transitional merge candidate is used for the derivation.

According to an aspect of the disclosure, for the affine-transitional merge candidate, the derivation of the translational motion information part can be from various sources, and can be from a combination of multiple sources.

In an embodiment, the translational motion information of the affine-transitional merge candidate is derived from existing translational merge candidates with uni-prediction with available translational motion information for a reference list corresponding to the translational reference list.

In another embodiment, the translational motion information of the affine-transitional merge candidate is derived from existing translational merge candidates with bi-prediction, and the transitional motion information of the existing translational merge candidates for a reference list corresponding the translational reference list of the affine-transitional merge candidate is used for the derivation.

In another embodiment, the translational motion information of the affine-transitional merge candidate is derived from the current translational merge candidates list based on a pre-defined rule, which can be based on for example index value, index parity, index position, etc. In an example, the derivation depends on the parity of the merge index. For example, for an even merge index, the translation motion information for the candidate from the reference list L0 (or L1) be used for the derivation, and for an odd merge index, the translational motion information of the candidate from the reference list L1 (or L0) can be used for the derivation.

In a case that the candidate from the reference list determined according to the pre-defined rule does not exist, the other reference list can be used to derive the translational motion information.

In another embodiment, the translational motion information of the affine-transitional merge candidate is derived from existing affine merge candidates. In an example, the motion vector of a predetermined control point, such as the first control point motion vector (CPMV) of an existing affine merge candidate can be used as the translational motion information of the affine-transitional merge candidate.

In another embodiment, the translational motion information of the affine-transitional merge candidate is derived from existing affine merge candidates. In an example, an average of multiple control point motion vectors (CPMVs) can be used as the translational motion information of the affine-transitional merge candidate.

In another embodiment, the translational motion information of the affine-transitional merge candidate is derived from existing affine merge candidates. In an example, and the MV of a center position (e.g., position (W/2, H/2), where W is the block width and H is the block heigh in luma samples of the current block) of the current block derived from an affine model of the affine merge candidate can be used as the translational motion information of the affine-transitional merge candidate.

According to an aspect of the disclosure, the affine-transitional merge candidate can be added to an existing subblock merge candidate list (e.g., subblock merge list as in VVC). In an example, the subblock merge candidate list includes affine merge candidates and SbTMVP candidates. In another example, the subblock merge candidate list includes affine merge candidates, but not SbTMVP candidates. The affine-translational merge candidates can be added into the subblock based merge candidate list at various positions. In an example, the affine-translational merge candidates are added into the subblock based merge candidate list after the inherited affine merge candidates. In an example, only the existing inherited affine merge candidates can be used as source of affine motion to derive the affine motion of the affine-translational merge candidates.

In another example, the affine-translational merge candidates are added into the subblock based merge candidate list after the constructed affine merge candidates. In an example, only the existing affine merge candidates before the affine-translational merge candidates can be used as source of affine motion to derive the affine motion of the affine-translational merge candidates.

In another example, the affine-translational merge candidates are added into the subblock based merge candidate list after all affine merge candidates except zero MV candidates. In an example, only the existing affine merge candidates before the affine-translational merge candidates can be used as source of affine motion to derive the affine motion of the affine-translational merge candidates.

According to an aspect of the disclosure, the affine-translational merge candidates are grouped into a new merge list that is referred to as an affine-translational merge candidate list, and a flag denoted by affine_trans_merge_flag is signaled to indicate whether the affine-translational merge candidate list is selected or not.

In an example, when a current mode is signaled to be sub-block based merge mode, the flag affine_trans_merge_flag is further signaled. When the flag affine_trans_merge_flag is true, an index is signaled to indicate which affine-translation merge candidate is used from the affine-translation merge candidate list. When the flag affine_trans_merge_flag is false, a regular sub-block based merge candidate list is used, and a candidate is suitably selected from the regular subblock based merge candidate list.

In an example, the affine-translational merge candidate list is reordered based on template matching costs of the affine-translational merge candidates in response to a template-matching flag in a high level syntax, such as SPS, PPS, and slice header.

In another example, the affine-translational merge candidate list is derived no matter the template-matching based reordering of the affine-translational merge candidate list is enabled or disabled. In another example, the affine-translational merge candidate list is derived when the template-matching based reordering of the affine-translational merge candidate list is disable.

In some embodiments, there can be up to N of the affine-translational merge candidates to be added to a candidate list, such as the regular subblock based merge candidate list, the affine-translational merge candidate list or the like. In an example, N is a predefined value (e.g., N is set to equal to 2 in an example). In another example, N is signaled by a syntax at a high level, such as at sequence level, picture level, slice level, etc.

In some embodiments, only the first M existing affine merge candidates can be used to derive the affine-translational merge candidates. In an example, M is a predefined value. In another example, M is signaled by a syntax at a high level, such as at sequence level, picture level, slice level, etc.

In some embodiments, only the first L existing translational merge candidates can be used to derive the affine-translational merge candidates. In an example, L is a predefined value. In another example, L is signaled by a syntax at a high level, such as at sequence level, picture level, slice level, etc.

In an embodiment, the affine-translational merge candidate is only used when bi-prediction is allowed in current picture.

In another embodiment, the affine-translational merge candidate is only used for pictures with all reference pictures temporally before the current picture, such as in a low-delay configuration in VVC.

In another embodiment, whether to apply the techniques for processing the affine-translational merge candidate is controlled by a high level syntax, such as at sequence level (e.g., by SPS), picture level (e.g., by picture header or PPS), slice level (e.g. by slice header), tile/tile-group level, etc.

In some embodiments, when local illumination compensation (LIC) tool is enabled but prohibited for bi-prediction, an affine-translational merge candidate may have LIC flag associated with the affine-translational merge candidate set to be false.

According to an aspect of the disclosure, when bi-prediction with CU level weighting (BCW) tool is enabled, the affine-translational merge candidate can be processed accordingly.

In an embodiment, the BCW index of a current block may be set to default value indicative of equal weighting on reference list L0 and L1 when the affine-translational merge candidate is involved. Thus, equal weighting is applied to the affine motion based prediction and the translational motion based prediction.

In another embodiment, when only one of the source of affine motion information and the source of translational information of an affine-translational merge candidate has BCW index indicating non-equal weighting, the BCW index is used for the affine-translational merge candidate to apply corresponding non equal weights to the affine motion based prediction and the translational motion based prediction.

In another embodiment, when both of the source of affine motion information and the source of translational information of an affine-translational merge candidate has BCW index indicating non-equal weighting, a BCW index of the source of affine motion information is used for the affine-translational merge candidate to apply corresponding non equal weights to the affine motion based prediction and the translational motion based prediction.

Figure 30:
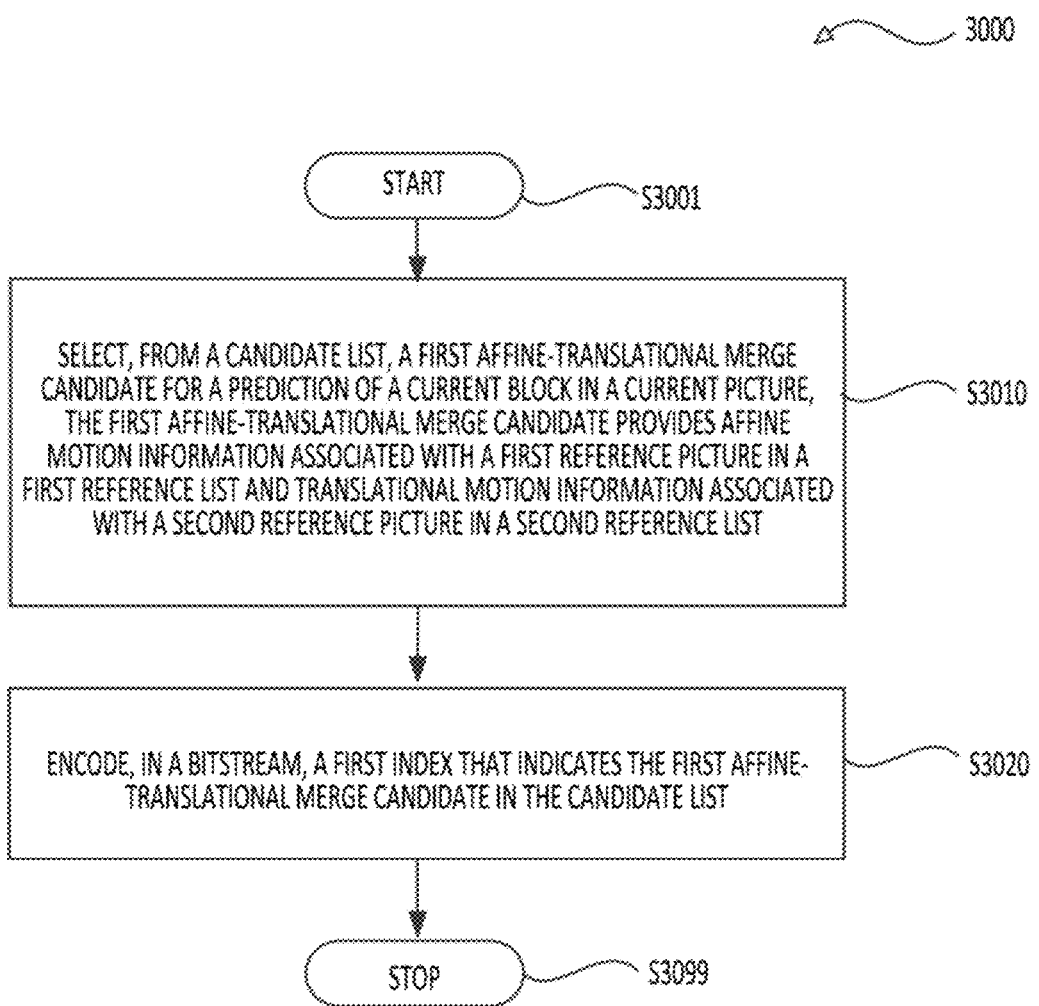
FIG. 30 shows a flow chart outlining a process according to some embodiments of the disclosure.

FIG. 30 shows a flow chart outlining a process (3000) according to an embodiment of the disclosure. The process (3000) can be used in a video encoder. In various embodiments, the process (3000) is executed by processing circuitry, such as the processing circuitry in the terminal devices (310), (320), (330) and (340), the processing circuitry that performs functions of the video encoder (403), the processing circuitry that performs functions of the video encoder (603), the processing circuitry that performs functions of the video encoder (703), and the like. In some embodiments, the process (3000) is implemented in software instructions, thus when the processing circuitry executes the software instructions, the processing circuitry performs the process (3000). The process starts at (S3001) and proceeds to (S3010).

At (S3010), a first affine-translational merge candidate for a prediction of a current block in a current picture is selected from a candidate list. The first affine-translational merge candidate provides affine motion information associated with a first reference picture in a first reference list and translational motion information associated with a second reference picture in a second reference list.

At (S3020), a first index that indicates the first affine-translational merge candidate in the candidate list is encoded into a bitstream carrying a video including the current picture, the first reference picture and the second reference picture.

In some examples, the affine motion information and the translational motion information of the first affine-translational merge candidate are separately derived. The first affine-translational merge candidate is inserted in the candidate list.

In an example, the affine motion information is derived according to first affine motion information of a first affine merge candidate with uni-prediction. In another example, the affine motion information is derived according to according to second affine motion information of a second affine merge candidate with bi-prediction, the second affine motion information is associated with the first reference list.

In an example, the translational motion information is derived according to first translational motion information of a first translational merge candidate with uni-prediction. In another example, the translational motion information is derived according to second translational motion information of a second translational merge candidate with bi-prediction, the second translational motion information is associated with the second reference list.

In an example, to derive the translational motion information, for a merge candidate with a merge index in a translational merge candidate list, a first list is selected from the first reference list and the second reference list based on the merge index according to a predefined rule. The translational motion information is derived based on first translational motion information of the merge candidate associated with the first list in response to an existence of the first translational motion information, and is derived based on second translational motion information of the merge candidate associated with another list different from the first list in response to an non existence of the first translational motion information.

In some examples, the translational motion information can be derived from affine merge candidates. In an example, the translational motion information is derived based on a control point motion vector of an affine merge candidate. In another example, the translational motion information is derived based on an average of a plurality of control point motion vectors of the affine merge candidate. In another example, the translational motion information is derived based on a motion vector at a center of the current block, the motion vector is determined according to an affine model for the affine merge candidate.

In an example, the first affine-translational merge candidate is inserted in an existing subblock based merge candidate list after a last inherited affine merge candidate. In another example, the first affine-translational merge candidate is inserted in the existing subblock based merge candidate list after a last constructed affine merge candidate. In another example, the first affine-translational merge candidate is inserted in the existing subblock based merge candidate list after a last affine merge candidate and before a zero motion vector candidate.

In some examples, the first affine-translational merge candidate is inserted into an affine-translational merge list separate from a subblock based merge candidate list. In an example, a flag that indicates a selection of the affine-translational merge list is encoded in the bitstream.

In some examples, candidates in the affine-translational merge list are reordered according to template matching costs of the candidates.

In some examples, the first affine-translational merge candidate is inserted in the candidate list in response to a counting number of affine-translational candidates in the candidate list is lower than a value. The value can be predefined or can be signaled from the encoder side to the decoder side at a high level.

In some examples, the affine motion information is derived from a subset of affine merge candidates in front of other affine merge candidates in an affine merge candidate list, a counting number of affine merge candidates in the subset is equal to a value. The value can be predefined or can be signaled from the encoder side to the decoder side at a high level.

In some examples, the translational motion information is derived from a subset of translational merge candidates in front of other translational merge candidate in a translational merge candidate list, a counting number of the translational merge candidates in the subset is equal to a value. The value can be predefined or can be signaled from the encoder side to the decoder side at a high level.

In some examples, a high level syntax that indicates an allowance of affine-translational merge candidates for the prediction of the current block is encoded into the bitstream.

Then, the process proceeds to (S3099) and terminates.

The process (3000) can be suitably adapted. Step(s) in the process (3000) can be modified and/or omitted. Additional step(s) can be added. Any suitable order of implementation can be used.

FIG. 31 shows a flow chart outlining a process (3100) according to an embodiment of the disclosure. The process (3100) can be used in a video decoder. In various embodiments, the process (3100) is executed by processing circuitry, such as the processing circuitry in the terminal devices (310), (320), (330) and (340), the processing circuitry that performs functions of the video decoder (410), the processing circuitry that performs functions of the video decoder (510), and the like. In some embodiments, the process (3100) is implemented in software instructions, thus when the processing circuitry executes the software instructions, the processing circuitry performs the process (3100). The process starts at (S3101) and proceeds to (S3110).

At (S3110), a first affine-translational merge candidate for a prediction of a current block in a current picture is determined from a candidate list. In an example, a coded video bitstream including information associated with the current block in the current picture is received. The first affine-translational merge candidate provides affine motion information associated with a first reference picture in a first reference list and translational motion information associated with a second reference picture in a second reference list.

At (S3120), a first prediction for a sample in the current block is generated according to the affine motion information associated with the first reference picture.

At (S3130), a second prediction for the sample in the current block is generated according to the translational motion information associated with the second reference picture.

At (S3140), the sample of the current block is reconstructed according to a combination of the first prediction and the second prediction.

In some examples, the affine motion information and the translational motion information of the first affine-translational merge candidate are derived, and the first affine-translational merge candidate is inserted in the candidate list.

In an example, the affine motion information is derived according to first affine motion information of a first affine merge candidate with uni-prediction. In another example, the affine motion information is derived according to according to second affine motion information of a second affine merge candidate with bi-prediction, the second affine motion information is associated with the first reference list.

In an example, the translational motion information is derived according to first translational motion information of a first translational merge candidate with uni-prediction. In another example, the translational motion information is derived according to second translational motion information of a second translational merge candidate with bi-prediction, the second translational motion information is associated with the second reference list.

In an example, to derive the translational motion information, for a merge candidate with a merge index in a translational merge candidate list, a first list is selected from the first reference list and the second reference list based on the merge index according to a predefined rule. The translational motion information is derived based on first translational motion information of the merge candidate associated with the first list in response to an existence of the first translational motion information, and is derived based on second translation motion information of the merge candidate associated with another list different from the first list in response to an non existence of the first translational motion information.

In some examples, the translational motion information can be derived from affine merge candidates. In an example, the translational motion information is derived based on a control point motion vector of an affine merge candidate. In another example, the translational motion information is derived based on an average of a plurality of control point motion vectors of the affine merge candidate. In another example, the translational motion information is derived based on a motion vector at a center of the current block, the motion vector is determined according to an affine model for the affine merge candidate.

In an example, the first affine-translational merge candidate is inserted in an existing subblock based merge candidate list after a last inherited affine merge candidate. In another example, the first affine-translational merge candidate is inserted in the existing subblock based merge candidate list after a last constructed affine merge candidate. In another example, the first affine-translational merge candidate is inserted in the existing subblock based merge candidate list after a last affine merge candidate and before a zero motion vector candidate.

In an example, the first affine-translational merge candidate is inserted into an affine-translational merge list separate from the existing subblock based merge candidate list. In an example, in response to a decoded flag (e.g., decoded from the coded video bitstream) indicating a selection of the affine-translational merge list, the first affine-translational merge candidate is selected from the affine-translational merge list according to a decoded index (e.g., decoded from the coded video bitstream). In response to the decoded flag indicating a selection of the subblock based merge candidate list, a merge candidate is selected from the subblock based merge candidate list according to the decoded index.

In some examples, candidates in the affine-translational merge list are reordered according to template matching costs of the candidates.

In some examples, the first affine-translational merge candidate is inserted in the candidate list in response to a counting number of affine-translational merge candidates in the candidate list is lower than a value. The value can be predefined or can be signaled from the encoder side to the decoder side at a high level.

In some examples, the affine motion information is derived from a subset of affine merge candidates in front of other affine merge candidates in an affine merge candidate list, a counting number of affine merge candidates in the subset is equal to a value. The value can be predefined or can be signaled from the encoder side to the decoder side at a high level.

In some examples, the translational motion information is derived from a subset of translational merge candidates in front of other translational merge candidate in a translational merge candidate list, a counting number of the translational merge candidates in the subset is equal to a value. The value can be predefined or can be signaled from the encoder side to the decoder side at a high level.

In some examples, a determination that bi-prediction is allowed in the current picture is made and the first affine-translational merge candidate for the prediction of the current block is then determined in response to the determination.

In some examples, a determination that reference pictures of the current picture are temporally before the current picture is made, and the first affine-translational merge candidate for the prediction of the current block is determined in response to the determination.

In some examples, a high level syntax that indicates an allowance of the first affine-translational merge candidate for the prediction of the current block is determined (e.g., decoded from the bitstream).

In some examples, in response to local illumination compensation (LIC) being enabled but prohibited for bi-prediction, a LIC flag associated with the first affine-translational merge candidate is set to false.

In an example, a bi-prediction with coding unit level weighting (BCW) index is set to a default value for combining the first prediction and the second prediction with equal weighting.

In another example, only one of the affine motion information and the translational motion information has a bi-prediction with coding unit level weighting (BCW) index. The first prediction and the second prediction are combined according to the BCW index.

In another example, a first BCW index is associated with the affine motion information and a second BCW index is associated with the translational motion information. The first prediction and the second prediction are combined according to the first BCW index.

Then, the process proceeds to (S3199) and terminates.

The process (3100) can be suitably adapted. Step(s) in the process (3100) can be modified and/or omitted. Additional step(s) can be added. Any suitable order of implementation can be used.

The techniques described above, can be implemented as computer software using computer-readable instructions and physically stored in one or more computer-readable media. For example, FIG. 32 shows a computer system (3200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 32:
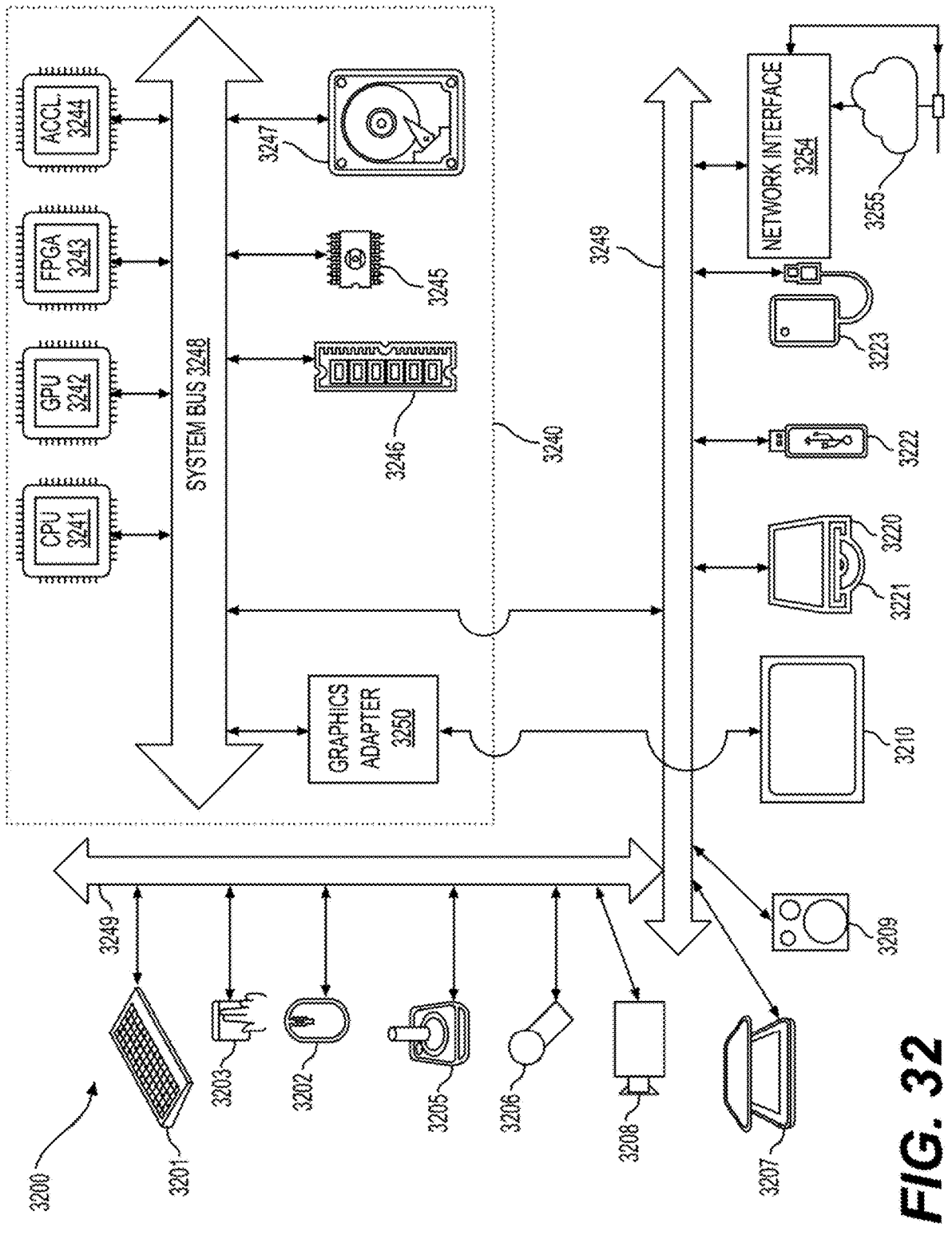
FIG. 32 is a schematic illustration of a computer system in accordance with an embodiment.

The components shown in FIG. 32 for computer system (3200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (3200).

Computer system (3200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (3201), mouse (3202), trackpad (3203), touch screen (3210), data-glove (not shown), joystick (3205), microphone (3206), scanner (3207), camera (3208).

Computer system (3200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (3210), data-glove (not shown), or joystick (3205), but there can also be tactile feedback devices that do not serve as input devices), audio output devices (such as: speakers (3209), headphones (not depicted)), visual output devices (such as screens (3210) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (3200) can also include human accessible storage devices and their associated media such as optical media including CD/DVD ROM/RW (3220) with CD/DVD or the like media (3221), thumb-drive (3222), removable hard drive or solid state drive (3223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (3200) can also include an interface (3254) to one or more communication networks (3255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (3249) (such as, for example USB ports of the computer system (3200)); others are commonly integrated into the core of the computer system (3200) by attachment to a system bus as described below (for example Ethernet interface into a PC computer system or cellular network interface into a smartphone computer system). Using any of these networks, computer system (3200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (3240) of the computer system (3200).

The core (3240) can include one or more Central Processing Units (CPU) (3241), Graphics Processing Units (GPU) (3242), specialized programmable processing units in the form of Field Programmable Gate Areas (FPGA) (3243), hardware accelerators for certain tasks (3244), graphics adapters (3250), and so forth. These devices, along with Read-only memory (ROM) (3245), Random-access memory (3246), internal mass storage such as internal non-user accessible hard drives, SSDs, and the like (3247), may be connected through a system bus (3248). In some computer systems, the system bus (3248) can be accessible in the form of one or more physical plugs to enable extensions by additional CPUs, GPU, and the like. The peripheral devices can be attached either directly to the core's system bus (3248), or through a peripheral bus (3249). In an example, the screen (3210) can be connected to the graphics adapter (3250). Architectures for a peripheral bus include PCI, USB, and the like.

CPUs (3241), GPUs (3242), FPGAs (3243), and accelerators (3244) can execute certain instructions that, in combination, can make up the aforementioned computer code. That computer code can be stored in ROM (3245) or RAM (3246). Transitional data can be also be stored in RAM (3246), whereas permanent data can be stored for example, in the internal mass storage (3247). Fast storage and retrieve to any of the memory devices can be enabled through the use of cache memory, that can be closely associated with one or more CPU (3241), GPU (3242), mass storage (3247), ROM (3245), RAM (3246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (3200), and specifically the core (3240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (3240) that are of non-transitory nature, such as core-internal mass storage (3247) or ROM (3245). The software implementing various embodiments of the present disclosure can be stored in such devices and executed by core (3240). A computer-readable medium can include one or more memory devices or chips, according to particular needs. The software can cause the core (3240) and specifically the processors therein (including CPU, GPU, FPGA, and the like) to execute particular processes or particular parts of particular processes described herein, including defining data structures stored in RAM (3246) and modifying such data structures according to the processes defined by the software. In addition or as an alternative, the computer system can provide functionality as a result of logic hardwired or otherwise embodied in a circuit (for example: accelerator (3244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video processing in a decoder, comprising:
   receiving a coded video bitstream comprising a current block in a current picture;
   determining, from a candidate list, a first affine-translational merge candidate for a prediction of the current block in the current picture when a high level syntax in the coded video bitstream is determined to indicate that the first affine-translational merge candidate for the prediction of the current block is allowed, the first affine-translational merge candidate providing affine motion information associated with a first reference picture in a first reference list and translational motion information associated with a second reference picture in a second reference list, the first affine-translational merge candidate providing different types of motion information associated with different reference pictures, the first reference picture being different from the second reference picture, the translational motion information associated with the second reference picture being non-symmetric to the affine motion information associated with the first reference picture;
   generating a first prediction for a sample in the current block according to the affine motion information associated with the first reference picture;
   generating a second prediction for the sample in the current block according to the translational motion information associated with the second reference picture; and

reconstructing the sample of the current block according to a combination of the first prediction and the second prediction.

2. The method of claim 1, further comprising:
deriving the affine motion information and the translational motion information of the first affine-translational merge candidate; and
inserting the first affine-translational merge candidate in the candidate list.

3. The method of claim 2, wherein the deriving the affine motion information comprises at least one of:
deriving the affine motion information according to first affine motion information of a first affine merge candidate with uni-prediction; and
deriving the affine motion information according to second affine motion information of a second affine merge candidate with bi-prediction, the second affine motion information being associated with the first reference list.

4. The method of claim 2, wherein the deriving the translational motion information comprises at least one of:
deriving the translational motion information according to first translational motion information of a first translational merge candidate with uni-prediction; and
deriving the translational motion information according to second translational motion information of a second translational merge candidate with bi-prediction, the second translational motion information being associated with the second reference list.

5. The method of claim 2, wherein the deriving the translational motion information comprises:
for a merge candidate with a merge index in a translational merge candidate list,
selecting a first list from the first reference list and the second reference list based on the merge index according to a predefined rule;
deriving the translational motion information based on first translational motion information of the merge candidate associated with the first list when the first translational motion information exists; and
deriving the translational motion information based on second translational motion information of the merge candidate associated with another list different from the first list when the first translational motion information does not exist.

6. The method of claim 2, wherein the deriving the translational motion information comprises at least one of:
deriving the translational motion information based on a control point motion vector of an affine merge candidate;
deriving the translational motion information based on an average of a plurality of control point motion vectors of the affine merge candidate; and
deriving the translational motion information based on a motion vector at a center of the current block, the motion vector being determined according to an affine model from the affine merge candidate.

7. The method of claim 2, wherein the inserting the first affine-translational merge candidate in the candidate list further comprises at least one of:
inserting the first affine-translational merge candidate in an existing subblock based merge candidate list after a last inherited affine merge candidate;
inserting the first affine-translational merge candidate in the existing subblock based merge candidate list after a last constructed affine merge candidate; and inserting the first affine-translational merge candidate in the existing subblock based merge candidate list after a last affine merge candidate and before a zero motion vector candidate.

8. The method of claim 2, further comprising:
inserting the first affine-translational merge candidate into an affine-translational merge list separate from a subblock based merge candidate list.

9. The method of claim 8, wherein the determining the first affine-translational merge candidate comprises:
when a decoded flag from the coded video bitstream indicates a selection of the affine-translational merge list, selecting the first affine-translational merge candidate from the affine-translational merge list according to a decoded index from the coded video bitstream.

10. The method of claim 8, further comprising:
reordering candidates in the affine-translational merge list according to template matching costs of the candidates.

11. The method of claim 2, wherein the inserting the first affine-translational merge candidate in the candidate list further comprises:
inserting the first affine-translational merge candidate in the candidate list when a counting number of affine-translational merge candidates in the candidate list is lower than a predefined value.

12. The method of claim 2, wherein the deriving the affine motion information comprises:
deriving the affine motion information from a subset of affine merge candidates that is in front of other affine merge candidates in an affine merge candidate list, a counting number of affine merge candidates in the subset being equal to a predefined value.

13. The method of claim 2, wherein the deriving the translational motion information comprises:
deriving the translational motion information from a subset of translational merge candidates that is in front of other translational merge candidates in a translational merge candidate list, a counting number of the translational merge candidates in the subset being equal to a predefined value.

14. The method of claim 1, further comprising:
making a determination that bi-prediction is allowed in the current picture; and
determining the first affine-translational merge candidate for the prediction of the current block when the determination is made.

15. The method of claim 1, further comprising:
making a determination that reference pictures of the current picture are temporally before the current picture; and
determining the first affine-translational merge candidate for the prediction of the current block when the determination is made.

16. The method of claim 1, further comprising:
when local illumination compensation (LIC) is enabled, setting a LIC flag associated with the first affine-translational merge candidate to false.

17. The method of claim 1, wherein the reconstructing the sample of the current block further comprises:
setting a bi-prediction with coding unit level weighting (BCW) index to a default value for combining the first prediction and the second prediction with equal weighting.

18. The method of claim 1, wherein the reconstructing the sample of the current block further comprises:

determining that one of the affine motion information and the translational motion information has a bi-prediction with coding unit level weighting (BCW) index; and combining the first prediction and the second prediction according to the BCW index.

19. The method of claim 1, wherein the reconstructing the sample of the current block further comprises:

determining that a first bi-prediction with coding unit level weighting (BCW) index is associated with the affine motion information and a second BCW index is associated with the translational motion information; and combining the first prediction and the second prediction according to the first BCW index.

\* \* \* \* \*